US012448654B2

(12) United States Patent
Song et al.

(10) Patent No.: US 12,448,654 B2
(45) Date of Patent: Oct. 21, 2025

(54) COMPOSITIONS AND METHODS FOR DETECTING PANCREATIC CANCER

(71) Applicant: The Johns Hopkins University, Baltimore, MD (US)

(72) Inventors: Jin Song, Baltimore, MD (US); Zhen Zhang, Baltimore, MD (US); Daniel Wan-Yui Chan, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/749,771

(22) Filed: Jun. 21, 2024

(65) Prior Publication Data

US 2025/0043361 A1 Feb. 6, 2025

Related U.S. Application Data

(63) Continuation of application No. 17/013,989, filed on Sep. 8, 2020, now Pat. No. 12,037,647, which is a continuation of application No. 16/737,084, filed on Jan. 8, 2020, now abandoned, which is a continuation of application No. 15/747,780, filed as application No. PCT/US2016/043833 on Jul. 25, 2016, now abandoned.

(60) Provisional application No. 62/197,946, filed on Jul. 28, 2015.

(51) Int. Cl.
*G01N 33/00* (2006.01)
*C07K 14/47* (2006.01)
*C12Q 1/6886* (2018.01)
*G01N 33/574* (2006.01)

(52) U.S. Cl.
CPC ........ *C12Q 1/6886* (2013.01); *C07K 14/4748* (2013.01); *G01N 33/57438* (2013.01); *C12Q 2600/158* (2013.01)

(58) Field of Classification Search
CPC ............ C12Q 1/6886; C12Q 2600/158; C07K 14/4748; G01N 33/57438
See application file for complete search history.

(56) References Cited

U.S. PATENT DOCUMENTS 12,037,647 B2 7/2024 Song et al.

OTHER PUBLICATIONS

Song et al, Cancer Epidemiol Biomarkers Prev 28: 174-182, year 2019 (Year: 2019).*
"Serum markers in patients with resectable pancreatic adenocarcinoma: macrophage inhibitory cytokine I versus CA19-9", Koopmann J, Rosenzweig CN, Zhang Z et al., Clinical cancer research, vol. 12, No. 2, pp. 442-446.
"A multiplexed bead assay for profiling glycosylation patterns on serum protein biomarkers of pancreatic cancer", Li C, Zolotarevsky E, Thompson I et al., Electrophoresis, vol. 32, No. 15, pp. 2028-2035.
"CEACAM1, a Novel Serum Biomarker for Pancreatic Cancer", Simeone DM, Ji B, Banerjee M et al., Pancreas, vol. 34, No. 4, pp. 436-443.
"Evaluation of Osteopontin as Biomarker for Pancreatic Adenocarcinoma", Koopmann J, Fedarko NS, Jain A, et al. Cancer Epidemiol Biomarkers Prev, vol. 13, No. 3, pp. 487-491.
"Melanoma Inhibitory Activity (MIA) increases the invasiveness of pancreatic cancer cells", El Fitori J, Kleeff J, Giese NA et al., Cancer Cell Int, vol. 5, No. 1, pp. 1-8.
"Molecular Analysis of Precursor Lesions in Familial Pancreatic Cancer", Cmogorac-Jurcevic T, Chelala C, Barry S et al., PLoS One, vol. 8, No. 1, pp. 1-14.
"Serum heat shock protein 27 is increased in chronic pancreatitis and pancreatic carcinoma", Liao WC, Wu MS, Wang HP et al., Pancreas, vol. 38, No. 4, pp. 422-426.
"Periostin, a matrix specific protein, is associated with proliferation and invasion of pancreatic cancer," Ben QW, Jin XL, Liu J et al., Oncol Rep, vol. 25, No. 3, pp. 709-716.
"Quantitative Glycoproteomics Analysis Reveals Changes in N-Glycosylation Level Associated with Pancreatic Ductal Adenocarcinoma", Pan S, Chen R, Tamura Y et al., J Proteome Res, vol. 13, No. 3, pp. 1293-1306.
Weber et al.(Cancer Genomics and proteomics 8:263-288 2011 (Year: 2011).
Soikkeli et al (American J Pathology 177: 387-403, 2010 (Year: 2010).
Pan et al (J Proteome Res 10: 2359-2376, 2011) (Year: 2011).
Simeone et al, Pancreas 34:436;443, 2007, IDS 11, Nov. 4, 2020 (Year: 2007).
Fitori et al, Can Cell International 5:1-8, Feb. 2005, IDS #3, Nov. 4, 2020 (Year: 2005).
Koopmann et al (Clin Cancer Res 12: 442-446, 2006, IDS #6, Nov. 4, 2020 (Year: 2006).
Kosanam et al, Mole and Cell proteomic 12: 2820-32. 2013, IDS #7, Nov. 4, 2020(Year: 2013).
Liao et a, Pancreas 2009, 38:422-426, IDS #9, Nov. 4, 2020 (Year: 2009).

(Continued)

*Primary Examiner* — Lei Yao
(74) *Attorney, Agent, or Firm* — Fox Rothschild LLP

(57) ABSTRACT

Provided herein are methods of detecting pancreatic cancer in a subject, the method comprising measuring in a sample from the subject a level of CA19-9 polysaccharide relative to a reference, and a level of a polynucleotide or polypeptide of at least one marker selected from the group consisting of: OPN, MIA, CEACAM-1, MIC-I, SPONI, HSP27, POSTN, and LGALS3BP relative to a reference, wherein an increased level of the CA19-9 polysaccharide relative to a reference and an increased level of the polynucleotide or polypeptide relative to a reference indicates presence of pancreatic cancer in the subject.

6 Claims, 15 Drawing Sheets
Specification includes a Sequence Listing.

(56) References Cited

OTHER PUBLICATIONS

Biol. (2013) Ballehaninna, Doi U., "Biomarkers 10.1007/s13277-013-1033-3, for pancreatic pp. 1-14 cancer: promising new markers and options beyong CA 19-9" Tumor Biol. (2013) DOI 10.1007/s13277-013-1033-3, pp. 1-14.

Benton, PP-W., 180-182 et al., "Screening Agt recombinant clones by hybridization to single plaques in situ" Science (1977) vol. 196, pp. 180-182.

Fitori, J_, International et al., (2005) "Melanoma vol. 5, No_ inhibitory 3 activity (MIA) increases the invasiveness of pancreatic cancer cells", Cancer Cell International (2005) vol. 5, No. 3.

Grunstein, Nat. Acad. M., Sci., et al., (1975) "Colony vol. 72, No. hybridization: 10, PP-a method 3961-3965 for the isolation of cloned DNAs that contain a specific gene" Proc. Nat. Acad. Sci., (1975) vol. 72, No. 10, pp. 3961-3965.

Kimmel, A., Methods in "Identification Enzymology and (1987) characterization vol. 152 of specific clones: strategy for confirming the validity of presumptive clones", Methods in Enzymology (1987) vol. 152.

Koopmann, Epidemiology, J_, et Biomarkers al., & "Evaluation Prevention, of osteopontin (2004) vol. as 13, No_biomarker 3 for pancreatic adenocarcinoma", Cancer Epidemiology, Biomarkers & Prevention, (2004) vol. 13, No. 3.

Kosanam, proteomic H., et analysis al., of "Laminin, pancreatic gamma 2 adenocarcinoma (LAMC2): a tissues", promising new Molecular & putative Cellular pancreatic Proteomics cancer (2013) biomarker 12:10_ 1074/ identified by proteomic analysis of pancreatic adenocarcinoma tissues, Molecular & Cellular Proeomics (2013) 12:10.1074/mcp_m112.023507, pp. 2820-2832.

Li, C., et al., "A multiplexed Bead assay for profiling glycosylation patterns on serum protein biomarkers of pancreatic cancer" Electrophoresis, multiplexed (2011) vol. 32, No. 15, pp. 2028-2035.

Liao, W., et al. "Serum heat shock protein 27 is increased in chronic pancreatitis and pancreatic carcinoma" Pancreas (2009) vol. 38, No. 4, pp. 422-426.

Wahl, G., et al., "Molecular hybridization of immobilized nucleic acids: theoretical concepts and practical considerations" Methods in Enzymology (1987) vol. 152.

Simeone, D., et al., "CEACAM1, a Novel Serum Biomarkers for Pancreatic Cancer" Pancreas (2007) vol. 34, No. 4, pp. 436-443.

\* cited by examiner

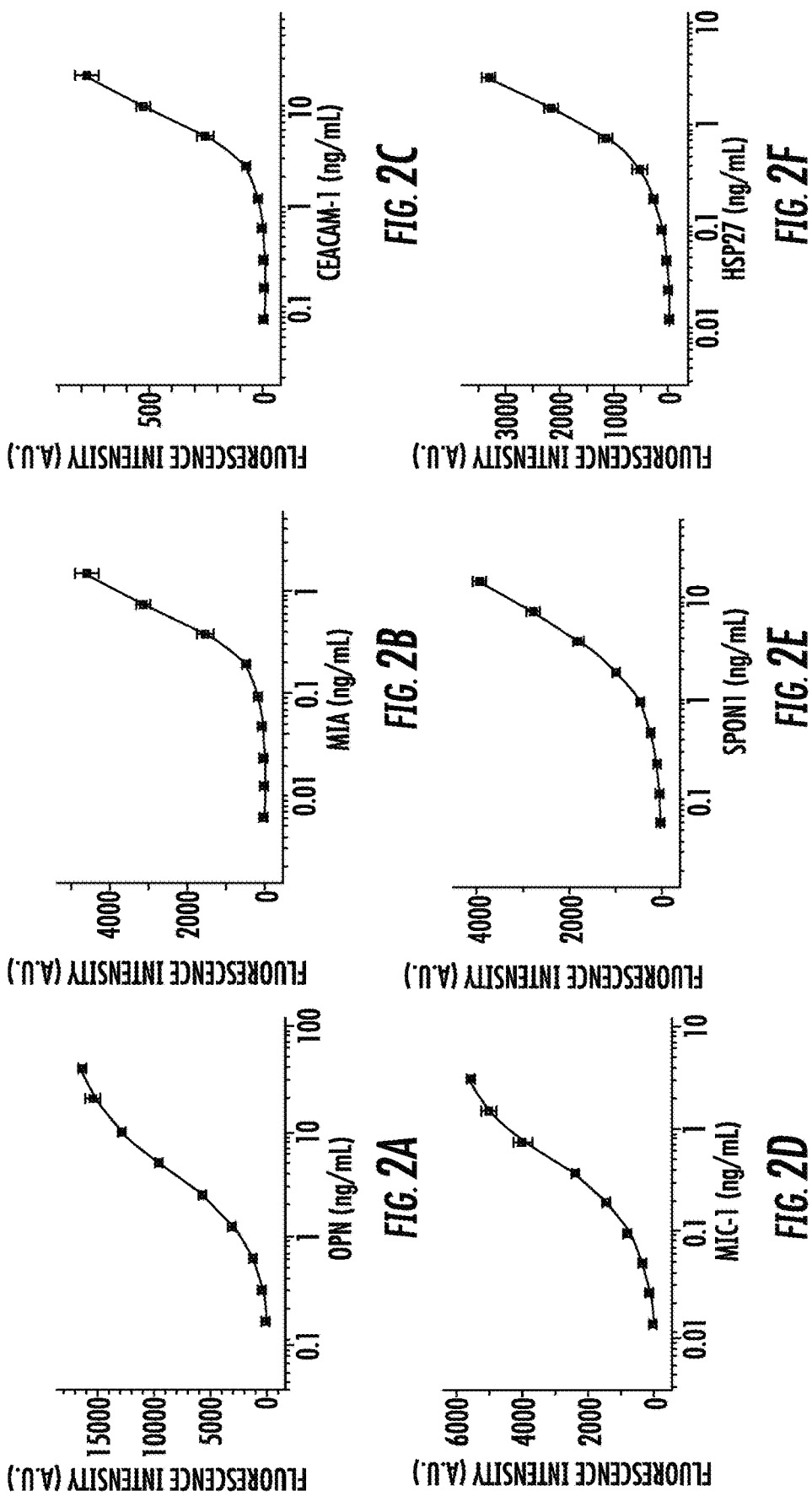

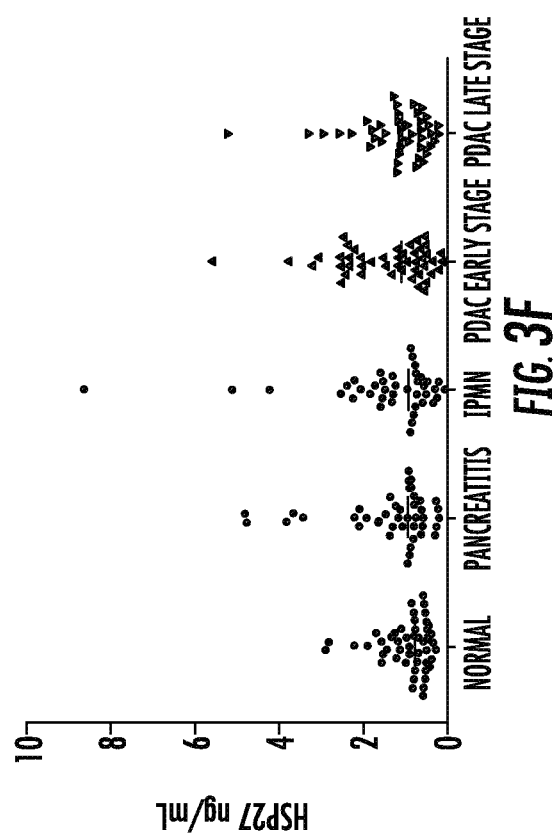
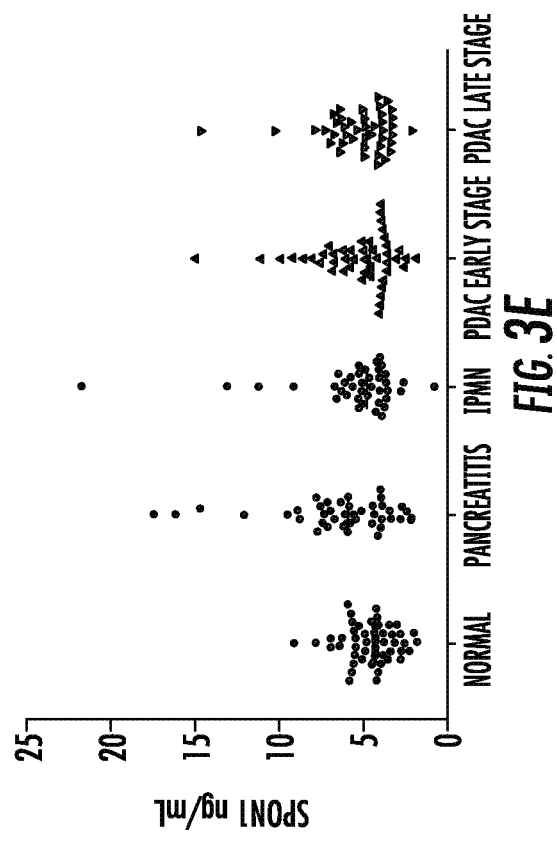
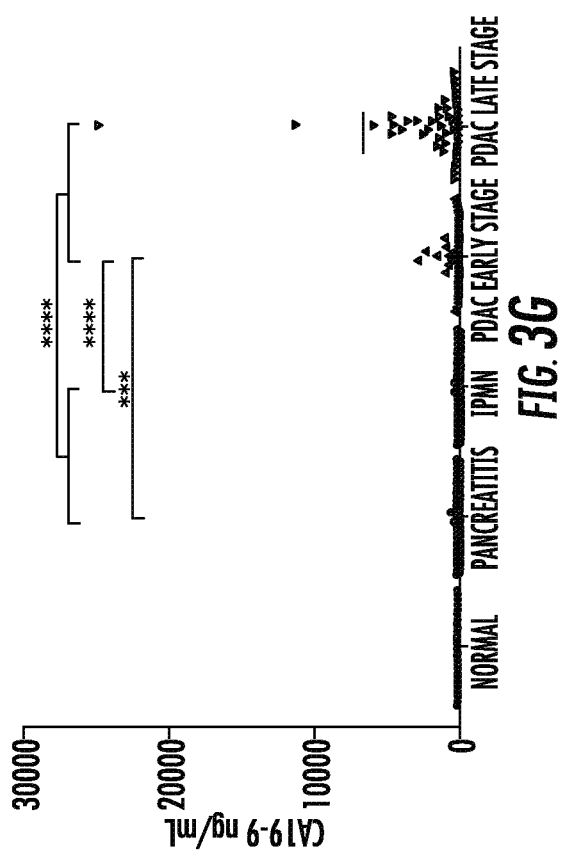
FIG. 3E
FIG. 3F
FIG. 3G

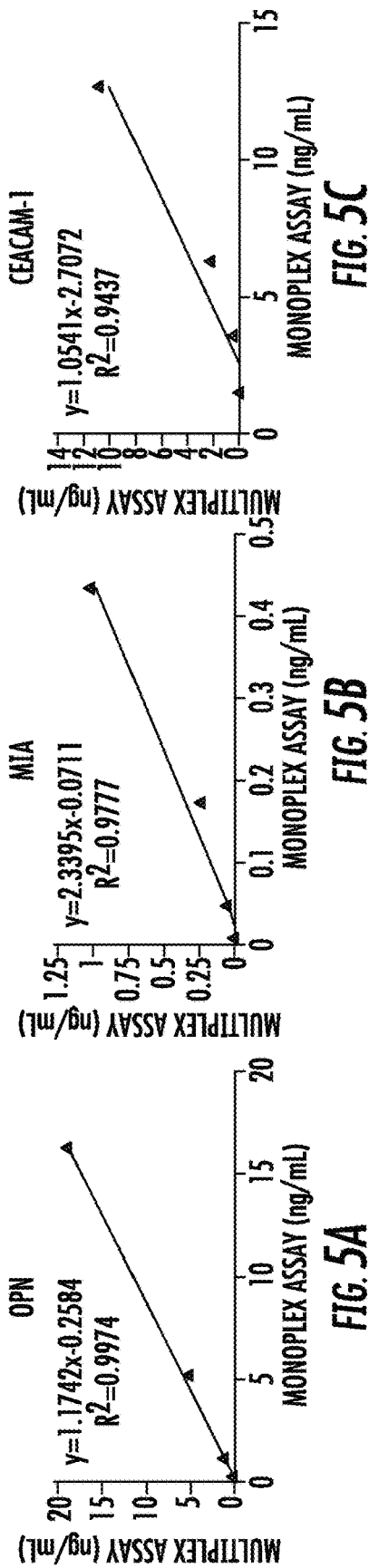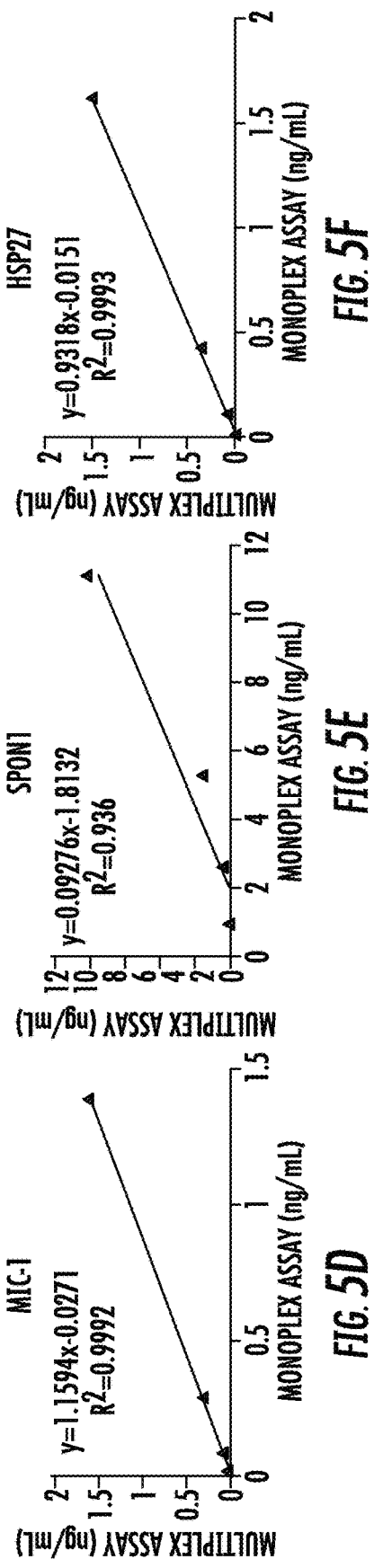

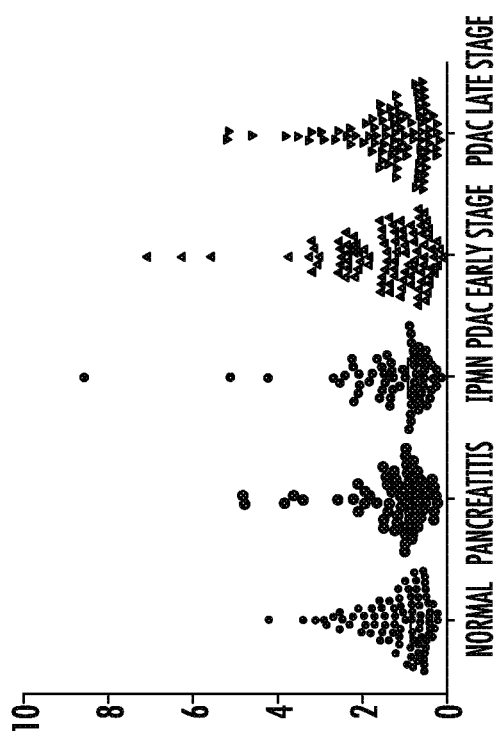
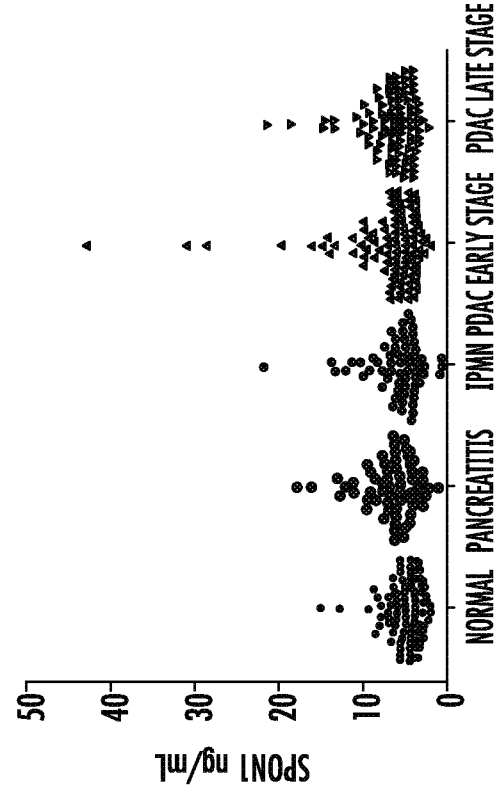
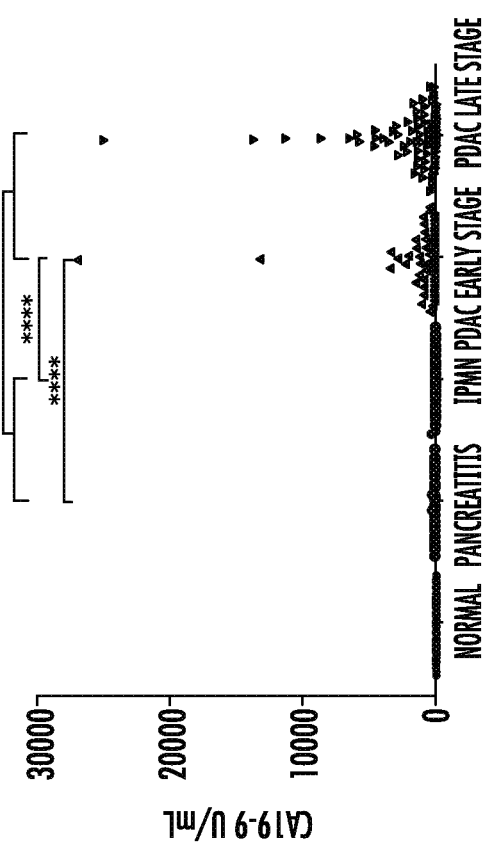
FIG. 6F
FIG. 6E
FIG. 6G

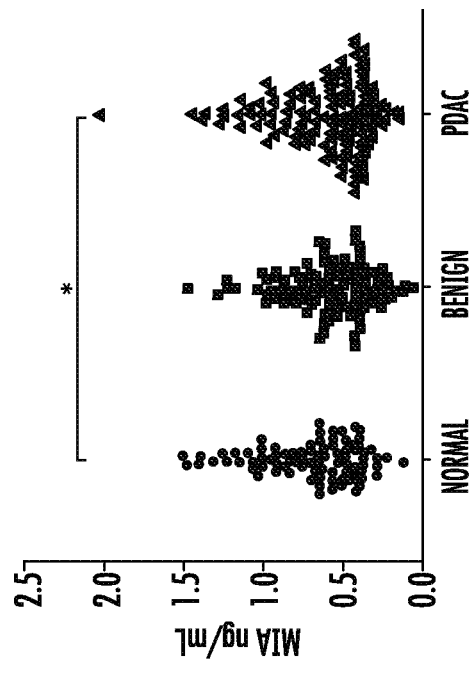
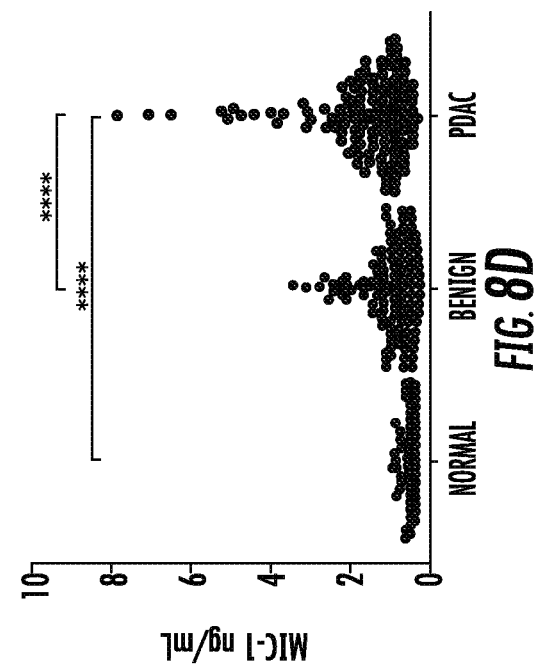
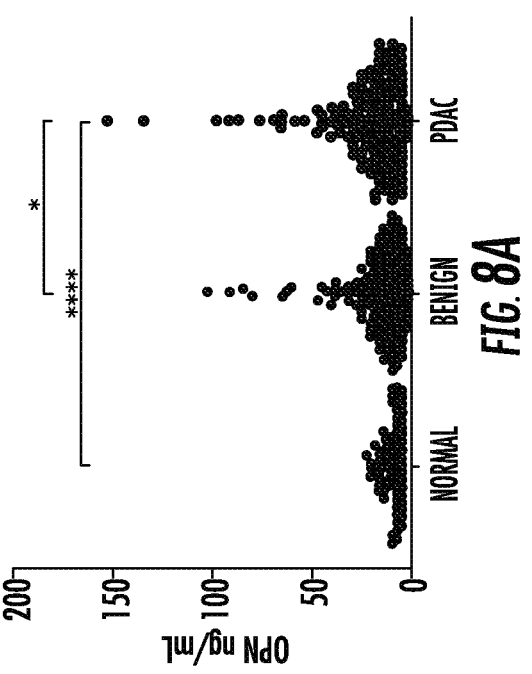
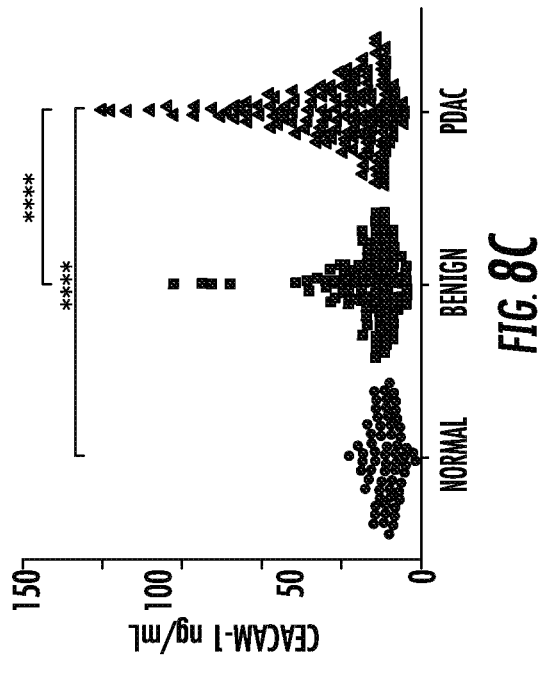
FIG. 8A
FIG. 8B
FIG. 8C
FIG. 8D

# COMPOSITIONS AND METHODS FOR DETECTING PANCREATIC CANCER

CROSS-REFERENCE TO RELATED APPLICATIONS

This application is a Continuation of U.S. patent application Ser. No. 17/013,989, filed Sep. 8, 2020, which is a Continuation of U.S. patent application Ser. No. 16/737,084, filed Jan. 8, 2020, which is a Continuation of U.S. patent application Ser. No. 15/747,780, filed Jan. 26, 2018, which is a 35 U.S.C. § 371 U.S. national entry of International Application PCT/US2016/043833, having an international filing date of Jul. 25, 2016, which claims the benefit of U.S. Provisional Application No. 62/197,946, filed Jul. 28, 2015, the content of each of the aforementioned applications is herein incorporated by reference in their entirety.

STATEMENT OF GOVERNMENT INTEREST

This invention was made with government support under grant number CA115102, awarded by the National Institute of Health. The government has certain rights in the invention.

INCORPORATION-BY-REFERENCE OF MATERIAL SUBMITTED ELECTRONICALLY

The instant application contains a Sequence Listing which has been submitted in XML format and is hereby incorporated by reference in its entirety. Said XML copy, created on Aug. 29, 2024, is named 348358_14121_SL.xml and is 35,714 bytes in size.

BACKGROUND OF THE INVENTION

Pancreatic cancer is the 4th leading cause of cancer death in the United States. The majority of patients present with unresectable disease leading to a median survival of 6 months and an overall 5-year survival of less than 5%. Because intervention at an early stage could greatly improve the prognosis of patients, methods for early detection of this disease are urgently required.

SUMMARY OF THE INVENTION

As described below, the present invention provides diagnostic compositions and methods for detecting pancreatic cancer in a subject. Compositions and articles defined by the invention were isolated or otherwise manufactured in connection with the examples provided below. Other features and advantages of the invention will be apparent from the detailed description, and from the claims.

In one aspect, the invention provides a method of detecting pancreatic cancer in a subject, the method comprising measuring in a sample from the subject a level of CA19-9 polysaccharide relative to a reference, and a level of a polynucleotide or polypeptide of at least one marker selected from the group consisting of: OPN, MIA, CEACAM-1, MIC-1, SPON1, HSP27, POSTN, and LGALS3BP relative to a reference, wherein an increased level of the CA19-9 polysaccharide relative to a reference and an increased level of the polynucleotide or polypeptide relative to a reference indicates presence of pancreatic cancer in the subject.

In another aspect, the invention provides a method of distinguishing a pancreatic ductal adenocarcinoma (PDAC) from a benign pancreatic condition, the method comprising measuring in a sample from the subject a level of CA19-9 polysaccharide relative to a reference, and a level of a polynucleotide or polypeptide of at least one marker selected from the group consisting of: OPN, MIA, CEACAM-1, MIC-1, SPON1, HSP27, POSTN, and LGALS3BP relative to a reference.

In another aspect, the invention provides a method of selecting a subject for pancreatic cancer treatment, the method comprising detecting in a sample from the subject an increased level of CA19-9 polysaccharide relative to a reference, and an increased level of a polynucleotide or polypeptide of at least one marker selected from the group consisting of: OPN, MIA, CEACAM-1, MIC-1, SPON1, HSP27, POSTN, and LGALS3BP relative to a reference.

In another aspect, the invention provides a method of characterizing pancreatic cancer status in a subject, the method comprising measuring in a sample from the subject a level of CA19-9 polysaccharide relative to a reference, and a level of a polynucleotide or polypeptide of at least one marker selected from the group consisting of: OPN, MIA, CEACAM-1, MIC-1, SPON1, HSP27, POSTN, and LGALS3BP relative to a reference, wherein an increased level of the CA19-9 polysaccharide relative to a reference and an increased level of the polynucleotide or polypeptide relative to a reference indicates presence of pancreatic cancer in the subject.

In various embodiments of any aspect delineated herein, the marker is selected from the group consisting of: MIA, SPON1, MIC-1, and CEACAM-1. In various embodiments of any aspect delineated herein, the measuring step comprises measuring in a sample from the subject levels of markers comprising or consisting of a CA19-9 polysaccharide, a HSP27 polynucleotide or polypeptide, and a MIA polynucleotide or polypeptide. In various embodiments of any aspect delineated herein, the measuring step comprises measuring in a sample from the subject levels of markers comprising or consisting of a CA19-9 polysaccharide, a CEACAM-1 polynucleotide or polypeptide, a MIC-1 polynucleotide or polypeptide, a SPON1 polynucleotide or polypeptide, and a MIA polynucleotide or polypeptide.

In another aspect, the invention provides a method of detecting pancreatic cancer and/or characterizing a pancreatic cancer status in a subject, the method comprising measuring in a serum sample from the subject levels of markers comprising or consisting of a CA19-9 polysaccharide, a HSP27 polypeptide, and a MIA polypeptide, using a multiplexed bead based immunoassay, wherein levels of each marker are measured relative to a reference, and wherein increased levels of the markers indicate presence of pancreatic cancer.

In another aspect, the invention provides a method of detecting pancreatic cancer and/or characterizing a pancreatic cancer status in a subject, the method comprising measuring in a serum sample from the subject levels of markers comprising or consisting of a CA19-9 polysaccharide, a CEACAM-1 polypeptide, a MIC-1 polypeptide, a SPON1 polypeptide, and a MIA polypeptide, using a multiplexed bead based immunoassay, wherein levels of each marker are measured relative to a reference, and wherein increased levels of the markers indicate presence of pancreatic cancer.

In another aspect, the invention provides a method of detecting pancreatic cancer and/or characterizing a pancreatic cancer status in a subject, the method comprising measuring in a serum sample from the subject levels of markers comprising or consisting of a CA19-9 polysaccharide and a MIA polypeptide using a multiplexed bead based immunoassay, wherein levels of each marker are measured relative to a reference, and wherein increased levels of the markers indicate presence of pancreatic cancer.

In another aspect, the invention provides a method of detecting pancreatic cancer and/or characterizing a pancreatic cancer status in a subject, the method comprising measuring in a serum sample from the subject levels of markers comprising or consisting of a CA19-9 polysaccharide and a MIC-1 polypeptide using a multiplexed bead based immunoassay, wherein levels of each marker are measured relative to a reference, and wherein increased levels of the markers indicate presence of pancreatic cancer.

In another aspect, the invention provides a method of detecting pancreatic cancer and/or characterizing a pancreatic cancer status in a subject, the method comprising measuring in a serum sample from the subject levels of markers comprising or consisting of a CA19-9 polysaccharide and a CEACAM-1 polypeptide using a multiplexed bead based immunoassay, wherein levels of each marker are measured relative to a reference, and wherein increased levels of the markers indicate presence of pancreatic cancer.

In another aspect, the invention provides a method of detecting pancreatic cancer and/or characterizing a pancreatic cancer status in a subject, the method comprising measuring in a serum sample from the subject levels of markers comprising or consisting of a CA19-9 polysaccharide and a SPON1 polypeptide using a multiplexed bead based immunoassay, wherein levels of each marker are measured relative to a reference, and wherein increased levels of the markers indicate presence of pancreatic cancer.

In various embodiments of any aspect delineated herein, the sample is a serum sample. In various embodiments of any aspect delineated herein, the level of polysaccharide or polypeptide is measured using a bead based immunoassay or an ELISA. In various embodiments of any aspect delineated herein, the pancreatic cancer status is non-pancreatic cancer, pancreatitis, intraductal papillary mucinous neoplasm (IPMN), early stage pancreatic ductal adenocarcinoma (PDAC), or late stage pancreatic ductal adenocarcinoma (PDAC). In various embodiments of any aspect delineated herein, the benign pancreatic condition is pancreatitis or intraductal papillary mucinous neoplasm (IPMN).

In various embodiments of any aspect delineated herein, the pancreatic cancer treatment is chemotherapy or surgery. In various embodiments of any aspect delineated herein, the subject is a human.

In another aspect, the invention provides a diagnostic composition comprising a capture reagent detecting a CA19-9 polysaccharide and a capture reagent detecting at least one marker selected from the group consisting of: a MIA polynucleotide or polypeptide, a MIC-1 polynucleotide or polypeptide, a CEACAM-1 polynucleotide or polypeptide, a OPN polynucleotide or polypeptide, a SPON1 polynucleotide or polypeptide, a HSP27 polynucleotide or polypeptide, a POSTN polynucleotide or polypeptide, and a LGALS3BP polynucleotide or polypeptide.

In various embodiments of any aspect delineated herein, the capture reagent detecting a CA19-9 polysaccharide is an anti-CA19-9 antibody or an antigen-binding fragment thereof. In various embodiments, the capture reagents are fixed to a substrate. In further embodiments, the substrate is a magnetic bead.

In various embodiments of any aspect delineated herein, the diagnostic composition comprises an anti-CA19-9 antibody or an antigen-binding fragment thereof, and at least one antibody or antigen-binding fragment thereof selected from the group consisting of: an anti-MIC-1 antibody, an anti-CEACAM-1 antibody, an anti-MIA antibody, and an anti-SPON1 antibody. In various embodiments of any aspect delineated herein, the diagnostic composition comprises an anti-CA19-9 antibody or an antigen-binding fragment thereof, an anti-HSP27 antibody or an antigen-binding fragment thereof, and an anti-MIA antibody or an antigen-binding fragment thereof.

In another aspect, the invention provides a kit comprising a diagnostic composition according to any other aspect delineated herein. In various embodiments of any aspect delineated herein, the level of polysaccharide or polypeptide is measured using a kit according to any other aspect delineated herein.

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

By "agent" is meant any small molecule chemical compound, antibody, nucleic acid molecule, or polypeptide, or fragments thereof.

By "ameliorate" is meant decrease, suppress, attenuate, diminish, arrest, or stabilize the development or progression of a disease.

By "alteration" is meant a change (increase or decrease) in the expression levels or activity of a gene or polypeptide as detected by standard art known methods such as those described herein. As used herein, an alteration includes a 10% change in expression levels, preferably a 25% change, more preferably a 40% change, and most preferably a 50% or greater change in expression levels."

By "analog" is meant a molecule that is not identical, but has analogous functional or structural features. For example, a polypeptide analog retains the biological activity of a corresponding naturally-occurring polypeptide, while having certain biochemical modifications that enhance the analog's function relative to a naturally occurring polypeptide. Such biochemical modifications could increase the analog's protease resistance, membrane permeability, or half-life, without altering, for example, ligand binding. An analog may include an unnatural amino acid.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

"Detect" refers to identifying the presence, absence or amount of the analyte to be detected.

By "detectable label" is meant a composition that when linked to a molecule of interest renders the latter detectable, via spectroscopic, photochemical, biochemical, immunochemical, or chemical means. For example, useful labels include radioactive isotopes, magnetic beads, metallic beads, colloidal particles, fluorescent dyes, electron-dense reagents, enzymes (for example, as commonly used in an ELISA), biotin, digoxigenin, or haptens.

By "CA19-9 polysaccharide" is meant a polysaccharide having the sequence Neu5Acα2,3Galβ1,3 (Fucα1,4) GlcNAc (a sialyl Lewis (a) antigen) and having antigenic activity. The CA19-9 polysaccharide may be attached to a polypeptide a to form a glycoprotein (i.e. a polypeptide modified by the addition of carbohydrate residues).

By "CEACAM-1 polypeptide" is meant a polypeptide or fragment thereof having at least about 85% amino acid identity to NCBI Accession No. NP_001192273, NP_001171745, NP_001171744, NP_001171742, NP_001020083, or NP_001703 (various isoforms) and having cell adhesion mediation activity. The sequence at NCBI Accession No. NP_001192273 (SEQ ID NO: 1) is shown below:

```
  1 mghlsaplhr vrvpwqglll taslltfwnp pttaqlttes
    mpfnvaegke vlllvhnlpq 61 qlfgyswykg ervdgnrqiv gyaigtqqat pgpansgret
    iypnaslliq nvtqndtgfy 121 tlqviksdlv neeatgqfhv ypelpkpsis snnsnpvedk
    davaftcepe tqdttylwwi 181 nnqslpvspr lqlsngnrtl tllsvtrndt gpyeceiqnp
    vsanrsdpvt Invtygpdtp 241 tispsdtyyr pganlslscy aasnppaqys wlingtfqqs
    tqelfipnit vnnsgsytch 301 annsvtgcnr ttvktiivte lspvvakpqi kaskttvtgd
    kdsvnltcst ndtgisirwf 361 fknqslpsse rmklsqgntt lsinpvkred agtywcevfn
    pisknqsdpi mlnvnynalp 421 qenglspgai agivigvval valiavalac flhfgktgrt
    tpmthltr
```

By "HSP27 polypeptide" is meant a polypeptide or fragment thereof having at least about 85% amino acid identity to GenBank Accession No. BAB17232 and having chaperone and cellular stress protection activities. The sequence at GenBank Accession No. BAB17232 (SEQ ID NO: 2) is shown below.

```
  1 mterrvpfsl lrgpswdpfr dwyphsrlfd qafglprlpe ewsqwlggss wpgyvrplpp 61 aaiespavaa paysralsrq lssgvseirh tadrwrvsld vnhfapdelt vktkdgvvei 121 tgkheerqde hgyisrcftr kytlppgvdp tqvssslspe gtltveapmp klatqsneit 181 ipvtfesraq lggpeaaksd etaak
```

By "LGALS3BP polypeptide" is meant a polypeptide or fragment thereof having at least about 85% amino acid identity to NCBI Accession No. NP_005558 and having beta-galactoside binding activity. The sequence at NCBI Accession No. NP_005558 (SEQ ID NO: 3) is shown below.

```
  1 mtpprlfwvw llvagtqgvn dgdmrladgg atnqgrveif yrgqwgtvcd nlwdltdasv 61 vcralgfena tqalgraafg qgsgpimlde vqctgteasl adckslgwlk sncrherdag 121 vvctnetrst htldlsrels ealgqifdsq rgcdlsisvn vqgedalgfc ghtviltanl 181 eaqalwkepg snvtmsvdae cvpmvrdllr yfysrridit lssvkcfhkl asaygarqlq 241 gycaslfail lpqdpsfqmp ldlyayavat gdalleklcl qflawnfeal tqaeawpsvp 301 tdllqlllpr sdlavpsela llkavdtwsw gerasheeve glvekirfpm mlpeelfelq 361 fnlslywshe alfqkktlqa lefhtvpfql larykglnlt edtykpriyt sptwsafvtd 421 sswsarksql vyqsrrgplv kyssdyfqap sdyryypyqs fqtpqhpsfl fqdkrvswsl 481 vylptiqscw nygfscssde lpvlgltksg gsdrtiayen kalmlceglf vadvtdfegw 541 kaaipsaldt nsskstssfp cpaghfngfr tvirpfyltn ssgvd
```

By "MIA polypeptide" is meant a polypeptide or fragment thereof having at least about 85% amino acid identity to NCBI Accession No. NP_001189482 or NP_006524 (various isoforms) and having melanoma inhibitory activity. The sequence at NCBI Accession No. NP_001189482 (SEQ ID NO: 4) is shown below:

```
  1 marslvclgv iillsafsgp gvrggpmpkl adrklcadqe cshpismava lqdymapdcr 61 fltihrgqvv yvfsklkgrg rlfwggsvqg dyygdlaarl gyfpssivre dqtlkpgkvd 121 vktdkwdfyc q
```

By "MIC-1 polypeptide" is meant a polypeptide or fragment thereof having at least about 85% amino acid identity to GenBank Accession No. AAB88673 and having macrophage inhibitory activity. The sequence at GenBank Accession No. AAB88673 (SEQ ID: NO: 5) is shown below.

```
  1 mpgqelrtln gsqmllvllv lswlphggal slaeasrasf pgpselhted srfrelrkry 61 edlltrlran qswedsntdl vpapavrilt pevrlgsggh lhlrisraal peglpeasrl 121 hralfrlspt asrswdvtrp lrrqlslarp qapalhlrls pppsqsdqll aesssarpql 181 elhlrpqaar grrrararng dhcplgpgrc crlhtvrasl edlgwadwvl sprevqvtmc 241 igacpsqfra anmhaqikts lhrlkpdtvp apccvpasyn pmvliqktdt gvslqtyddl 301 lakdchci
```

By "OPN polypeptide" is meant a polypeptide or fragment thereof having at least about 85% amino acid identity to NCBI Accession No. NP_001035149, NP_001035147, NP_000573.1, or NP_001238759.1 (various isoforms) and having hydroxyapatite binding activity. The sequence at NCBI Accession No. NP_001035149 (SEQ ID NO: 6) is shown below:

```
  1mriavicfcl lgitcaipvk qadsgsseek qnavsseetn dfkqetlpsk sneshdhmdd

61mddedddhv dsqdsidsnd sddvddtdds hqsdeshhsd esdelvtdfp tdlpatevft

121pvvptvdtyd grgdsvvygl rskskkfrrp diqypdatde ditshmesee lngaykaipv

181aqdlnapsdw dsrgkdsyet sqlddqsaet hshkqsrlyk rkandesneh sdvidsqels

241kvsrefhshe fhshedmlvv dpkskeedkh lkfrisheld sassevn
```

By "POSTN polypeptide" is meant a polypeptide or fragment thereof having at least about 85% amino acid identity to GenBank Accession No. AAI06710 or AAI06711 (various isoforms) and having cell adhesion mediation activity. The sequence at GenBank Accession No. AAI06710 (SEQ ID NO: 7) is shown below.

```
  1 mipflpmfsl llllivnpin annhydkila hsrirgrdqg pnvcalqqil gtkkkyfstc 61 knwykksicg qkttvlyecc pgymrmegmk gcpavlpidh vygtlgivga tttqrysdas 121 klreeiegkg sftyfapsne awdnldsdir rglesnvnve llnalhshmi nkrmltkdlk 181 ngmiipsmyn nlglfinhyp ngvvtvncar iihgnqiatn gvvhvidrvl tqigtsiqdf 241 ieaeddlssf raaaitsdil ealgrdghft lfaptneafe klprgvleri mgdkvaseal 301 mkyhilntlq csesimggav fetlegntie igcdgdsitv ngikmvnkkd ivtnngvihl 361 idqvlipdsa kqvielagkq qttftdlvaq lglasalrpd geytllapvn nafsddtlsm 421 dqrllklilq nhilkvkvgl nelyngqile tiggkqlrvf vyrtavcien scmekgskqg 481 rngaihifre iikpaekslh eklkqdkrfs tflslleaad lkelltqpgd wtlfvptnda
```

```
541 fkgmtseeke ilirdknalq niilyhltpg vfigkgfepg vtnilkttqg skiflkevnd 601 tllvnelksk esdimttngv ihvvdkllyp adtpvgndql leilnkliky iqikfvrgst 661 fkeipvtvyk piikkytkii dgvpveitek etreeriitg peikytrist gggeteetlk 721 kllqeevtkv tkfieggdgh lfedeeikrl lqgdtpvrkl qankkvqgsr rrlregrsq
```

By "SPON1 polypeptide" is meant a polypeptide or fragment thereof having at least about 85% amino acid identity to NCBI Accession No. NP_006099 and having cell adhesion promotion activity. The sequence at NCBI Accession No. NP_006099 (SEQ ID NO: 8) is shown below.

```
  1 mrlspaplkl srtpallala lplaaalafs detldkvpks egycsrilra qgtrregyte 61 fslrvegdpd fykpgtsyrv tlsaappsyf rgftlialre nregdkeedh agtfqiidee 121 etqfmsncpv avtestprrr triqvfwiap pagtgcvilk asivqkriiy fqdegsltkk 181 lceqdstfdg vtdkpildcc acgtakyrlt fygnwsekth pkdyprranh wsaiiggshs 241 knyvlweygg yasegvkqva elgspvkmee eirqqsdevl tvikakaqwp awqplnvraa 301 psaefsvdrt rhlmsfltmm gpspdwnvgl saedlctkec gwvqkvvqdl ipwdagtdsg 361 vtyespnkpt ipqekirplt sldhpqspfy dpeggsitqv arvvieriar kgeqcnivpd 421 nvddivadla peekdeddtp etciysnwsp wsacsssted kgkrmrqrml kaqldlsvpc 481 pdtqdfqpcm gpgcsdedgs tctmsewitw spcsiscgmg mrsreryvkq fpedgsvctl 541 pteetekctv neecspsscl mtewgewdec satcgmgmkk rhrmikmnpa dgsmckaets 601 qaekcmmpec htipcllspw sewsdcsvtc gkgmrtrqrm lkslaelgdc nedleqvekc 661 mlpecpidce ltewsqwsec nkscgkghvi rtrmiqmepq fggapcpetv qrkkcrirkc 721 lrnpsiqklr wrearesrrs eqlkeesege qfpgcrmrpw tawsectklc gggiqerymt 781 vkkrfkssqf tsckdkkeir acnvhpc
```

By "CEACAM-1 polynucleotide" is meant a polynucleotide encoding a CEACAM-1 polypeptide. An exemplary CEACAM-1 polynucleotide sequence is provided at NCBI Accession No. NM_001205344 (SEQ ID NO: 9). SEQ ID NO: 9 is provided below.

```
  1 aaagctctgg gccccaggga ggaggctcag cacagagagt ggaaaacagc agaggtgaca 61 gagcagccgt gctcgaagcg ttcctggagc ccaagctctc ctccacaggt gaagacaggg 121 ccagcaggag acaccatggg gcacctctca gccccacttc acagagtgcg tgtaccctgg 181 caggggcttc tgctcacagc ctcacttcta accttctgga acccgcccac cactgcccag 241 ctcactactg aatccatgcc attcaatgtt gcagagggga aggaggttct tctccttgtc 301 cacaatctgc cccagcaact ttttggctac agctggtaca aggggaaag agtggatggc 361 aaccgtcaaa ttgtaggata tgcaatagga actcaacaag ctaccccagg gcccgcaaac 421 agcggtcgag agacaatata ccccaatgca tccctgctga tccagaacgt cacccagaat 481 gacacaggat tctacaccct acaagtcata aagtcagatc ttgtgaatga agaagcaact 541 ggacagttcc atgtataccc ggagctgccc aagccctcca tctccagcaa caactccaac 601 cctgtggagg acaaggatgc tgtggccttc acctgtgaac ctgagactca ggacacaacc 661 tacctgtggt ggataaacaa tcagagcctc ccggtcagtc ccaggctgca gctgtccaat 721 ggcaacagga ccctcactct actcagtgtc acaggaatg acacaggacc ctatgagtgt 781 gaaatacaga cccagtgag tgcgaaccgc agtgacccag tcaccttgaa tgtcacctat
```

-continued

```
 841 ggcccggaca cccccaccat ttcccsttca gacacctatt accgtccagg ggcaaacctc
 901 agcctctcct gctatgcagc ctctaaccca cctgcacagt actcctggct tatcaatgga
 961 acattccagc aaagcacaca agagctcttt atccctaaca tcactgtgaa taatagtgga
1021 tcctataccg gccacgccaa taactcagtc actggctgca acaggaccac agtcaagacg
1081 atcatagtca ctgagctaag tccagtagta gcaaagcccc aaatcaaagc cagcaagacc
1141 acagtcacag gagataagga ctctgtgaac ctgacctgct ccacaaatga cactggaatc
1201 tccatccgtt ggttcttcaa aaaccagagt ctcccgtcct cggagaggat gaagctgtcc
1261 cagggcaaca ccaccctcag cataaaccct gtcaagaggg aggatgctgg gacgtattgg
1321 tgtgaggtct tcaacccaat cagtaagaac caaagcgacc ccatcatgct gaacgtaaac
1381 tataatgctc taccacaaga aaatggcctc tcacctgggg ccattgctgg cattgtgatt
1441 ggagtagtgg ccctggttgc tctgatagca gtagccctgg catgttttct gcatttcggg
1501 aagaccggca ggaccactcc aatgacccac ctaacaagat gaatgaagtt acttattcta
1561 ccctgaactt tgaagcccag caacccacac aaccaacttc agcctcccca tccctaacag
1621 ccacagaaat aatttattca gaagtaaaaa agcagtaatg aaacctgtcc tgctcactgc
1681 agtgctgatg tatttcaagt ctctcaccct catcactagg agattccttt ccctgtagg
1741 ggtagagggg tggggacaga aacaactttc tcctactctt ccttcctaat aggcatctcc
1801 aggctgcctg gtcactgccc ctctctcagt gtcaatagat gaaagtacat tgggagtctg
1861 taggaaaccc aaccttcttg tcattgaaat ttggcaaagc tgactttggg aaagagggac
1921 cagaacttcc cctcccttcc cctttcccca acctggactt gttttaaact tgcctgttca
1981 gagcactcat tccttcccac ccccagtcct gtcctatcac tctaattcgg atttgccata
2041 gccttgaggt tatgtccttt tccattaagt acatgtgcca ggaaacaaga gagagagaaa
2101 gtaaaggcag taatgccttc tcctatttct ccaaagcctt gtgtgaactc accaaacaca
2161 agaaaatcaa atatataacc aatagtgaaa tgccacacct ttgtccactg tcagggttgt
2221 ctacctgtag gatcagggtc taagcaccct ggtgcttagc tagaatacca cctaatcctt
2281 ctggcaagcc tgtcttcaga gaacccacta gaagcaacta ggaaaatcac ttgccaaaat
2341 ccaaggcaat tcctgatgga aaatgcaaaa gcacatatat gttttaatat ctttatgggc
2401 tctgttcaag gcagtgctga gagggagggg ttatagcttc aggagggaac cagcttctga
2461 taaacacaat ctgctaggaa cttgggaaag gaatcagaga gctgcccttc agcgattatt
2521 taaattattg ttaaagaata cacaatttgg ggtattggga ttttttctcct tttctctgag
2581 acattccacc attttaattt ttgtaactgc ttatttatgt gaaaagggtt attttttactt
2641 agcttagcta tgtcagccaa tccgattgcc ttaggtgaaa gaaaccaccg aaatccctca
2701 ggtcccttgg tcaggagcct ctcaagattt tttttgtcag aggctccaaa tagaaaataa
2761 gaaaaggttt tcttcattca tggctagagc tagatttaac tcagtttcta ggcacctcag
2821 accaatcatc aactaccatt ctattccatg tttgcacctg tgcattttct gtttgccccc
2881 attcactttg tcaggaaacc ttggcctctg ctaaggtgta tttggtcctt gagaagtggg
2941 agcaccctac agggacacta tcactcatgc tggtggcatt gtttacagct agaaagctgc
3001 actggtgcta atgcccttg gggaaatggg gctgtgagga ggaggattat aacttaggcc
3061 tagcctcttt taacagcctc tgaaatttat cttttcttct atgggtcta taaatgtatc
3121 ttataataaa aaggaaggac aggaggaaga caggcaaatg tacttctcac ccagtcttct
3181 acacagatgg aatctctttg gggctaagag aaaggtttta ttctatattg cttacctgat
```

-continued

```
3241 ctcatgttag gcctaagagg ctttctccag gaggattagc ttggagttct ctatactcag 3301 gtacctcttt cagggttttc taaccctgac acggactgtg catactttcc ctcatccatg 3361 ctgtgctgtg ttatttaatt tttcctggct aagatcatgt ctgaattatg tatgaaaatt 3421 attctatgtt tttataataa aaataatata tcagacatcg aaaaaaaaaa
```

By "HSP27 polynucleotide" is meant a polynucleotide encoding a HSP27 polypeptide. An exemplary HSP27 polynucleotide sequence is provided at GenBank Accession No. AB020027 (SEQ ID NO: 10). SEQ ID NO: 10 is provided below.

```
  1 ggcacgagga gcagagtcag ccagcatgac cgagcgccgc gtccccttct cgctcctgcg 61 gggccccagc tgggacccct tccgcgactg gtacccgcat agccgcctct tcgaccaggc 121 cttcgggctg ccccggctgc cggaggagtg gtcgcagtgg ttaggcggca gcagctggcc 181 aggctacgtg cgcccctgc ccccgccgc catcgagagc cccgcagtgg ccgcgcccgc 241 ctacagccgc gcgctcagcc ggcaactcag cagcggggtc tcggagatcc ggcacactgc 301 ggaccgctgg cgcgtgtccc tggatgtcaa ccacttcgcc ccggacgagc tgacggtcaa 361 gaccaaggat ggcgtggtgg agatcaccgg caagcacgag gagcggcagg acgagcatgg 421 ctacatctcc cggtgcttca cgcggaaata cacgctgccc ccggtgtgg accccaccca 481 agtttcctcc tccctgtccc ctgagggcac actgaccgtg gaggccccca tgcccaagct 541 agccacgcag tccaacgaga tcaccatccc agtcaccttc gagtcgcggg cccagcttgg 601 gggcccagaa gctgcaaaat ccgatgagac tgccgccaag taaagcctta gcccggatgc 661 ccacccctgc tgccgccact ggctgtgcct ccccgccac ctgtgtgttc ttttgataca 721 tttatcttct gttttctca aataaagttc aaagcaacca cctg
```

By "LGALS3BP polynucleotide" is meant a polynucleotide encoding a LGALS3BP polypeptide. An exemplary LGALS3BP polynucleotide sequence is provided at GenBank Accession No. NM_005567 (SEQ ID NO: 11). SEQ ID NO: 11 is provided below.

```
  1 aatcgaaagt agactctttt ctgaagcatt tcctgggatc agcctgacca cgctccatac 61 tgggagaggc ttctgggtca aaggaccagt ctgcagaggg atcctgtggc tggaagcgag 121 gaggctccac acggccgttg cagctaccgc agccaggatc tgggcatcca ggcacggcca 181 tgacccctcc gaggctcttc tgggtgtggc tgctggttgc aggaacccaa ggcgtgaacg 241 atggtgacat gcggctggcc gatgggggcg ccaccaacca gggccgcgtg gagatcttct 301 acagaggcca gtggggcact gtgtgtgaca acctgtggga cctgactgat gccagcgtcg 361 tctgccggc cctgggcttc gagaacgcca cccaggctct gggcagagct gccttcgggc 421 aaggatcagg ccccatcatg ctggatgagg tccagtgcac gggaaccgag gcctcactgg 481 ccgactgcaa gtccctgggc tggctgaaga gcaactgcag gcacgagaga gacgctggtg 541 tggtctgcac caatgaaacc aggagcaccc acacctgga cctctccagg gagctctcgg 601 aggcccttgg ccagatcttt gacagccagc ggggctgcga cctgtccatc agcgtgaatg 661 tgcagggcga ggacgccctg ggcttctgtg ccacacggt catcctgact gccaacctgg 721 aggcccaggc cctgtggaag gagccgggca gcaatgtcac catgagtgtg gatgctgagt 781 gtgtgcccat ggtcagggac cttctcaggt acttctactc ccgaaggatt gacatcaccc 841 tgtcgtcagt caagtgcttc cacaagctgg cctctgccta tggggccagg cagctgcagg
```

-continued

```
 901 gctactgcgc aagcctcttt gccatcctcc tcccccagga cccctcgttc cagatgcccc
 961 tggacctgta tgcctatgca gtggccacag gggacgccct gctggagaag ctctgcctac
1021 agttcctggc ctggaacttc gaggccttga cgcaggccga ggcctggccc agtgtcccca
1081 cagacctgct ccaactgctg ctgcccagga gcgacctggc ggtgcccagc gagctggccc
1141 tactgaaggc cgtggacacc tggagctggg gggagcgtgc ctcccatgag gaggtggagg
1201 gcttggtgga agatccgc ttccccatga tgctccctga ggagctcttt gagctgcagt
1261 tcaacctgtc cctgtactgg agccacgagg ccctgttcca agaagact ctgcaggccc
1321 tggaattcca cactgtgccc ttccagttgc tggcccggta caaaggcctg aacctcaccg
1381 aggatcccta caagccccgg atttacacct cgcccacctg gagtgccttt gtgacagaca
1441 gttcctggag tgcacggaag tcacaactgg tctatcagtc cagacggggg cctttggtca
1501 aatattcttc tgattacttc caagccccct ctgactacag atactacccc taccagtcct
1561 tccagactcc acaacacccc agcttcctct tccaggacaa gagggtgtcc tggtccctgg
1621 tctacctccc caccatccag agctgctgga actacggctt ctcctgctcc tcggacgagc
1681 tccctgtcct gggcctcacc aagtctggcg gctcagatcg caccattgcc tacgaaaaca
1741 aagccctgat gctctgcgaa gggctcttcg tggcagacgt caccgatttc gagggctgga
1801 aggctgcgat tccagtgcc ctggacacca acagctcgaa gagcacctcc tccttcccct
1861 gcccggcagg gcacttcaac ggcttccgca cggtcatccg ccccttctac ctgaccaact
1921 cctcaggtgt ggactagacg gcgtggccca agggtggtga aaccggaga acccccaggac
1981 gccctcactg caggctcccc tcctcggctt ccttcctctc tgcaatgacc ttcaacaacc
2041 ggccaccaga tgtcgcccta ctcacctgag cgctcagctt caagaaatta ctggaaggct
2101 tccactaggg tccaccagga gttctcccac cacctcacca gtttccaggt ggtaagcacc
2161 aggacgccct cgaggttgct ctgggatccc cccacagccc ctggtcagtc tgcccttgtc
2221 actggtctga ggtcattaaa attacattga ggttcctaca aaaaaaaaaa aaaaaaa
```

By "MIA polynucleotide" is meant a polynucleotide encoding a MIA polypeptide. An exemplary MIA polynucleotide sequence is provided at NCBI Accession No. NM_001202553 (SEQ ID NO: 12). SEQ ID NO:12 is provided below.

```
  1 cttctgtggc cagaggggac agcggaggag cccagtccac gatggcccgg tccctggtgt
 61 gccttggtgt catcatcttg ctgtctgcct tctccggacc tggtgtcagg ggtggtccta
121 tgcccaagct ggctgaccgg aagctgtgtg cggaccagga gtgcagccac cctatctcca
181 tggctgtggc ccttcaggac tacatggccc ccgactgccg attcctgacc attcaccggg
241 gccaagtggt gtatgtcttc tccaagctga agggccgtgg gcggctcttc tggggaggca
301 gcgttcaggg agattactat ggagatctgg ctgctcgcct gggctatttc cccagtagca
361 ttgtccgaga ggaccagacc ctgaaacctg gcaaagtcga tgtgaagaca gacaaatggg
421 atttctactg ccagtgagct cagcctaccg ctggccctgc cgtttcccct ccttggcttt
481 atgcaaatac aatcagccca gtgcaaacgg aaaaaaaaaa aaaaaaaa
```

By "MIC-1 polynucleotide" is meant a polynucleotide encoding a MIC-1 polypeptide. An exemplary MIC-1 polynucleotide sequence is provided at GenBank Accession No. AF019770 (SEQ ID NO: 13). SEQ ID NO: 13 is provided below.

```
   1 gcggccgctg cacagccatg cccgggcaag aactcaggac gctgaatggc tctcagatgc
  61 tcctggtgtt gctggtgctc tcgtggctgc cgcatggggg cgccctgtct ctggccgagg
 121 cgagccgcgc aagtttcccg ggaccctcag agttgcacac cgaagactcc agattccgag
 181 agttgcggaa acgctacgag gacctgctaa ccaggctgcg ggccaaccag agctgggaag
 241 attcgaacac cgacctcgtc ccggcccctg cagtccggat actcacgcca gaagtgcggc
 301 tgggatccgg cggccacctg cacctgcgta tctctcgggc cgcccttccc gaggggctcc
 361 ccgaggcctc ccgccttcac cgggctctgt tccggctgtc cccgacggcg tcaaggtcgt
 421 gggacgtgac acgacctctg cggcgtcagc tcagccttgc aagacccag gcgcccgcgc
 481 tgcacctgcg actgtcgccg ccgccgtcgc agtcggacca actgctggca gaatcttcgt
 541 ccgcacggcc ccagctggag ttgcacttgc ggccgcaagc cgccagggg cgccgcagag
 601 cgcgtgcgcg caacggggac cactgtccgc tcgggcccgg gcgttgctgc cgtctgcaca
 661 cggtccgcgc gtcgctggaa gacctgggct gggccgattg ggtgctgtcg ccacgggagg
 721 tgcaagtgac catgtgcatc ggcgcgtgcc cgagccagtt ccgggcggca aacatgcacg
 781 cgcagatcaa gacgagcctg caccgcctga gcccgacac ggtgccagcg ccctgctgcg
 841 tgcccgccag ctacaatccc atggtgctca ttcaaaagac cgacaccggg gtgtcgctcc
 901 agacctatga tgacttgtta gccaaagact gccactgcat atgagcagtc ctggtccttc
 961 cactgtgcac ctgcgcgggg gaggcgacct cagttgtcct gccctgtgga atgggctcaa
1021 ggttcctgag acacccgatt cctgcccaaa cagctgtatt tatataagtc tgttatttat
1081 tattaattta ttggggtgac cttcttgggg actcgggggc tggtctgatg gaactgtgta
1141 tttatttaaa actctggtga taaaaataaa gctgtctgaa ctgttaaaaa aaaaaaaaa
1201 aa
```

By "OPN polynucleotide" is meant a polynucleotide encoding a OPN polypeptide. An exemplary OPN polynucleotide sequence is provided at NCBI Accession No. NM_001040060 (SEQ ID NO: 14). SEQ ID NO: 14 is provided below.

```
   1 ctccctgtgt tggtggagga tgtctgcagc agcatttaaa ttctgggagg gcttggttgt
  61 cagcagcagc aggaggaggc agagcacagc atcgtcggga ccagactcgt ctcaggccag
 121 ttgcagcctt ctcagccaaa cgccgaccaa ggaaaactca ctaccatgag aattgcagtg
 181 atttgctttt gcctcctagg catcacctgt gccataccag ttaaacaggc tgattctgga
 241 agttctgagg aaaagcagaa tgctgtgtcc tctgaagaaa ccaatgactt taaacaagag
 301 acccttccaa gtaagtccaa cgaaagccat gaccacatgg atgatatgga tgatgaagat
 361 gatgatgacc atgtggacag ccaggactcc attgactcga cgactctga tgatgtagat
 421 gacactgatg attctcacca gtctgatgag tctcaccatt ctgatgaatc tgatgaactg
 481 gtcactgatt ttcccacgga cctgccagca accgaagttt cactccagt tgtccccaca
 541 gtagacacat atgatggccg aggtgatagt gtggtttatg gactgaggtc aaaatctaag
 601 aagtttcgca gacctgacat ccagtaccct gatgctacag cgaggacat cacctcacac
 661 atggaaagcg aggagttgaa tggtgcatac aaggccatcc ccgttgccca ggacctgaac
```

```
 721 gcgccttctg attgggacag ccgtgggaag gacagttatg aaacgagtca gctggatgac 781 cagagtgctg aaacccacag ccacaagcag tccagattat ataagcggaa agccaatgat 841 gagagcaatg agcattccga tgtgattgat agtcaggaac tttccaaagt cagccgtgaa 901 ttccacagcc atgaatttca cagccatgaa gatatgctgg ttgtagaccc caaaagtaag 961 gaagaagata aacacctgaa atttcgtatt tctcatgaat agatagtgc atcttctgag 1021 gtcaattaaa aggagaaaaa atacaatttc tcactttgca tttagtcaaa agaaaaaatg 1081 ctttatagca aaatgaaaga gaacatgaaa tgcttctttc tcagtttatt ggttgaatgt 1141 gtatctattt gagtctggaa ataactaatg tgtttgataa ttagtttagt ttgtggcttc 1201 atggaaactc cctgtaaact aaaagcttca gggttatgtc tatgttcatt ctatagaaga 1261 aatgcaaact atcactgtat tttaatattt gttattctct catgaataga aatttatgta 1321 gaagcaaaca aaatactttt acccacttaa aaagagaata taacatttta tgtcactata 1381 atcttttgtt ttttaagtta gtgtatattt tgttgtgatt atcttttgt ggtgtgaata 1441 aatcttttat cttgaatgta ataagaattt ggtggtgtca attgcttatt tgttttccca 1501 cggttgtcca gcaattaata aaacataacc tttttactg cctaaaaaaa aaaaaaaaa
```

By "POSTN polynucleotide" is meant a polynucleotide encoding a POSTN polypeptide. An exemplary POSTN polynucleotide sequence is provided at GenBank Accession No. BC106709 (SEQ ID NO: 15). SEQ ID NO: 15 is provided below.

```
   1 agagactcaa gatgattccc tttttaccca tgttttctct actattgctg cttattgtta 61 accctataaa cgccaacaat cattatgaca agatcttggc tcatagtcgt atcaggggtc 121 gggaccaagg cccaaatgtc tgtgcccttc aacagatttt gggcaccaaa aagaaatact 181 tcagcacttg taagaactgg tataaaaagt ccatctgtgg acagaaaacg actgtgttat 241 atgaatgttg ccctggttat atgagaatgg aaggaatgaa aggctgccca gcagttttgc 301 ccattgacca tgtttatggc actctgggca tcgtgggagc caccacaacg cagcgctatt 361 ctgacgcctc aaaactgagg gaggagatcg agggaaaggg atccttcact tactttgcac 421 cgagtaatga ggcttgggac aacttggatt ctgatatccg tagaggttg gagagcaacg 481 tgaatgttga attactgaat gctttacata gtcacatgat taataagaga atgttgacca 541 aggacttaaa aaatggcatg attattcctt caatgtataa caatttgggg cttttcatta 601 accattatcc taatggggtt gtcactgtta attgtgctcg aatcatccat gggaaccaga 661 ttgcaacaaa tggtgttgtc catgtcattg accgtgtgct tacacaaatt ggtacctcaa 721 ttcaagactt cattgaagca gaagatgacc tttcatcttt tagagcagct gccatcacat 781 cggacatatt ggaggccctt ggaagagacg tcacttcac actctttgct cccaccaatg 841 aggcttttga gaaacttcca cgaggtgtcc tagaaaggat catgggagac aaagtggctt 901 ccgaagctct tatgaagtac cacatcttaa atactctcca gtgttctgag tctattatgg 961 gaggagcagt ctttgagacg ctggaaggaa atacaattga gataggatgt acggtgaca 1021 gtataacagt aaatggaatc aaaatggtga acaaaagga tattgtgaca ataatggtg 1081 tgatccattt gattgatcag gtcctaattc ctgattctgc caaacaagtt attgagctgg 1141 ctggaaaaca gcaaaccacc ttcacggatc ttgtggccca attaggcttg gcatctgctc 1201 tgaggccaga tggagaatac actttgctgg cacctgtgaa taatgcattt tctgatgata 1261 ctctcagcat ggatcagcgc ctccttaaat taattctgca gaatcacata ttgaaagtaa
```

```
1321 aagttggcct taatgagctt tacaacgggc aaatactgga aaccatcgga ggcaaacagc 1381 tcagagtctt cgtatatcgt acagctgtct gcattgaaaa ttcatgcatg agaaaggga 1441 gtaagcaagg gagaaacggt gcgattcaca tattccgcga gatcatcaag ccagcagaga 1501 aatccctcca tgaaaagtta aaacaagata agcgctttag caccttcctc agcctacttg 1561 aagctgcaga cttgaaagag ctcctgacac aacctggaga ctggacatta tttgtgccaa 1621 ccaatgatgc ttttaaggga atgactagtg aagaaaaaga aattctgata cgggacaaaa 1681 atgctcttca aaacatcatt ctttatcacc tgacaccagg agttttcatt ggaaaaggat 1741 ttgaacctgg tgttactaac attttaaaga ccacacaagg aagcaaaatc tttctgaaag 1801 aagtaaatga tacacttctg gtgaatgaat tgaaatcaaa agaatctgac atcatgacaa 1861 caaatggtgt aattcatgtt gtagataaac tcctctatcc agcagacaca cctgttggaa 1921 atgatcaact gctggaaata cttaataaat taatcaaata catccaaatt aagtttgttc 1981 gtggtagcac cttcaaagaa atccccgtga ctgtctataa gccaattatt aaaaaataca 2041 ccaaaatcat tgatggagtg cctgtggaaa taactgaaaa agagacacga gaagaacgaa 2101 tcattacagg tcctgaaata aaatacacta ggatttctac tggaggtgga gaaacagaag 2161 aaactctgaa gaaattgtta caagaagagg tcaccaaggt caccaaattc attgaaggtg 2221 gtgatggtca tttatttgaa gatgaagaaa ttaaaagact gcttcaggga gacacacccg 2281 tgaggaagtt gcaagccaac aaaaaagttc aaggatctag aagacgatta agggaaggtc 2341 gttctcagtg aaaatccaaa aaccagaaaa aaatgtttat acaaccctaa gtcaataacc 2401 tgaccttaga aaattgtgag agccaagttg acttcaggaa ctgaaacatc agcac
```

By "SPON1 polynucleotide" is meant a polynucleotide encoding a SPON1 polypeptide. An exemplary SPON1 polynucleotide sequence is provided at NCBI Accession No. NM_006108 (SEQ ID NO: 16). SEQ ID NO:16 is provided below.

```
  1 gcaaaatcag ccctccctcc tcccgctcct tcgccgcggc cctcccctcc tcgcgctgct 61 ctcgttcgct tggctcagct cagctcagct cagcgcagct ccgcggccgc caagccgagg 121 cgggcacggt ctccgagtcg cggacgccag ctccgagctc cctctctccg ccgcgcctcc 181 gccaggtcgc gccttcgtcg ggaccacttc gggcaggagt cgcgtggcga aggcctgcgg 241 ccgcggcaca aagttggggg ccgcgaagat gaggctgtcc ccggcgcccc tgaagctgag 301 ccggactccg gcactgctgg ccctggcgct gccctggcc gcggcgctgg ccttctccga 361 cgagaccctg acaaagtgc ccaagtcaga gggctactgc agccgtatcc tgcgcgccca 421 gggcacgcgg cgcgagggct acaccgagtt cagcctccgc gtggagggcg acccgacttt 481 ctacaagccg ggaaccagct accgcgtaac actttcagct gctcctccct cctacttcag 541 aggattcaca ttaattgccc tcagagagaa cagagagggt gataaggaag aagaccatgc 601 tgggaccttc cagatcatag acgaagaaga aactcagttt atgagcaatt gccctgttgc 661 agtcactgaa agcactccac ggaggaggac ccggatccag gtgttttgga tagcaccacc 721 agcgggaaca ggctgcgtga ttctgaaggc cagcatcgta caaaaacgca ttatttattt 781 tcaagatgag ggctctctga ccaagaaact tgtgaacaa gattccacat tgatggggt 841 gactgacaaa cccatcttag actgctgtgc ctgcggaact gccaagtaca gactcacatt 901 ttatgggaat tggtccgaga agacacaccc aaaggattac cctcgtcggg ccaaccactg 961 gtctgcgatc atcggaggat cccactccaa gaattatgta ctgtgggaat atgaggata
```

-continued

```
1021 tgccagcgaa ggcgtcaaac aagttgcaga attgggctca cccgtgaaaa tggaggaaga
1081 aattcgacaa cagagtgatg aggtcctcac cgtcatcaaa gccaaagccc aatggccagc
1141 ctggcagcct ctcaacgtga gagcagcacc ttcagctgaa ttttccgtgg acagaacgcg
1201 ccatttaatg tccttcctga ccatgatggg ccctagtccc gactggaacg taggcttatc
1261 tgcagaagat ctgtgcacca aggaatgtgg ctgggtccag aaggtggtgc aagacctgat
1321 tccctgggac gctggcaccg acagcggggt gacctatgag tcacccaaca aacccaccat
1381 tccccaggag aaaatccggc ccctgaccag cctggaccat cctcagagtc ctttctatga
1441 cccagagggt gggtccatca ctcaagtagc cagagttgtc atcgagagaa tcgcacggaa
1501 gggtgaacaa tgcaatattg tacctgacaa tgtcgatgat attgtagctg acctggctcc
1561 agaagagaaa gatgaagatg acacccctga aacctgcatc tactccaact ggtccccatg
1621 gtccgcctgc agctcctcca cctgtgacaa aggcaagagg atgcgacagc gcatgctgaa
1681 agcacagctg gacctcagcg tcccctgccc tgacacccag gacttccagc cctgcatggg
1741 ccctggctgc agtgacgaag acggctccac ctgcaccatg tccgagtgga tcacctggtc
1801 gccctgcagc atctcctgcg gcatgggcat gaggtcccgg gagaggtatg tgaagcagtt
1861 cccggaggac ggctccgtgt gcacgctgcc cactgaggaa acgagaagt gcacggtcaa
1921 cgaggagtgc tctcccagca gctgcctgat gaccgagtgg ggcgagtggg acgagtgcag
1981 cgccacctgc ggcatgggca tgaagaagcg gcaccgcatg atcaagatga ccccgcaga
2041 tggctccatg tgcaaagccg agacatcaca ggcagagaag tgcatgatgc cagagtgcca
2101 caccatccca tgcttgctgt ccccatggtc cgagtggagt gactgcagcg tgacctgcgg
2161 gaagggcatg cgaacccgac agcggatgct caagtctctg gcagaacttg agactgcaa
2221 tgaggatctg gagcaggtgg agaagtgcat gctccctgaa tgccccattg actgtgagct
2281 caccgagtgg tcccagtggt cggaatgtaa caagtcatgt gggaaaggcc acgtgattcg
2341 aacccggatg atccaaatgg agcctcagtt tggaggtgca ccctgcccag agactgtgca
2401 gcgaaaaaag tgccgcatcc gaaaatgcct tcgaaatcca tccatccaaa agctacgctg
2461 gagggaggcc cgagagagcc ggcggagtga gcagctgaag gaagagtctg aaggggagca
2521 gttcccaggt tgtaggatgc cccatggac ggcctggtca aatgcacca aactgtgcgg
2581 aggtggaatt caggaacgtt acatgactgt aagaagaga ttcaaaagct cccagtttac
2641 cagctgcaaa gacaagaagg agatcagagc atgcaatgtt catccttgtt agcaagggta
2701 cgagttcccc agggctgcac tctagattcc agagtcacca atggctggat tatttgcttg
2761 tttaagacaa tttaaattgt gtacgctagt tttcattttt gcagtgtggt tcgcccagta
2821 gtcttgtgga tgccagagac atcctttctg aatacttctt gatgggtaca ggctgagtgg
2881 ggcgccctca cctccagcca gcctcttcct gcagaggagt agtgtcagcc accttgtact
2941 aagctgaaac atgtccctct ggagcttcca cctggccagg gaggacggag actttgacct
3001 actccacatg gagaggcaac catgtctgga agtgactatg cctgagtccc agggtgcggc
3061 aggtaggaaa cattcacaga tgaagacagc agattcccca cattctcatc tttggcctgt
3121 tcaatgaaac cattgtttgc ccatctcttc ttagtggaac tttaggtctc ttttcaagtc
3181 tcctcagtca tcaatagttc ctggggaaaa acagagctgg tagacttgaa gaggagcatt
3241 gatgttgggt ggcttttgtt ctttcactga gaaattcgga atacatttgt ctcaccctg
3301 atattggttc ctgatgcccc cccaacaaaa ataaataaat aaattatggc tgctttattt
3361 aaatataagg tagctagttt ttacacctga gataaataat aagcttagag tgtattttc
```

-continued
```
3421 ccttgctttt gggggttcag aggagtatgt acaattcttc tgggaagcca gccttctgaa 3481 cttttggta ctaaatcctt attggaacca agacaaagga agcaaaattg gtctctttag 3541 agaccaattt gcctaaattt taaaatcttc ctacacacat ctagacgttc aagtttgcaa 3601 atcagttttt agcaagaaaa catttttgct atacaaacat tttgctaagt ctgcccaaag 3661 cccccccaat gcattccttc aacaaaatac aatctctgta ctttaaagtt attttagtca 3721 tgaaatttta tatgcagaga gaaaaagtta ccgagacaga aaacaaatct aagggaaagg 3781 aatattatgg gattaagctg agcaagcaat tctggtggaa agtcaaacct gtcagtgctc 3841 cacaccaggg ctgtggtcct cccagacatg cataggaatg gccacaggtt tacactgcct 3901 tcccagcaat tataagcaca ccagattcag ggagactgac caccaaggga tagtgtaaaa 3961 ggacattttc tcagttgggt ccatcagcag tttttcttcc tgcatttatt gttgaaaact 4021 attgtttcat ttcttctttt ataggcctta ttactgctta atccaaatgt gtaccattgg 4081 tgagacacat acaatgctct gaatacacta cgaatttgta ttaaacacat cagaatattt 4141 ccaaatacaa catagtatag tcctgaatat gtacttttaa cacaagagag actattcaat 4201 aaaaactcac tgggtctttc atgtctttaa gctaagtaag tgttcagaag gttcttttt 4261 atattgtcct ccacctccat cattttcaat aaaagatagg gcttttgctc ccttgttctt 4321 ggagggacca ttattacatc tctgaactac ctttgtatcc aacatgtttt aaatccttaa 4381 atgaattgct ttctcccaaa aaaagcacaa tataaagaaa cacaagattt aattattttt 4441 ctacttgggg ggaaaaaagt cctcatgtag aagcacccac ttttgcaatg ttgttctaag 4501 ctatctatct aactctcagc ccatgataaa gttccttaag ctggtgattc ctaatcaagg 4561 acaagccacc ctagtgtctc atgtttgtat ttggtcccag ttgggtacat tttaaaatcc 4621 tgattttgga gacttaaaac caggttaatg gctaagaatg ggtaacatga ctcttgttgg 4681 attgttattt tttgtttgca atggggaatt tataagaagc atcaagtctc tttcttacca 4741 aagtcttgtt aggtggttta tagttctttt ggctaacaaa tcattttgga aataaagatt 4801 ttttactaca aaaatgaaat ttgtttggac ttccacttga gacagtaaag agagtattag 4861 acacccagta aaaactgcca tataaagaag ttgtaattgt ttgttgtgta tgtatttttt 4921 tcaatgccaa accagctgtg atccaattta catccacatt ttaggtccaa cagcaagaag 4981 ttcagagaga gatttcccaa ccagacattg ggtcactcac tggtcacctt gccagtgcat 5041 tttattagaa gggaatctgt tgtagcaaat gggaataaac ctgggtttct atagacccag 5101 aactgaaaaa ataaacatcg tgctgttttt aatttgaaaa aaaaaaaaa aaaa
```

By "anti-CA19-9 antibody" is meant an antibody that selectively binds a CA19-9 polysaccharide.

By "anti-CEACAM-1 antibody" is meant an antibody that selectively binds a CEACAM-1 polypeptide.

By "anti-HSP27 antibody" is meant an antibody that selectively binds a HSP27 polypeptide.

By "anti-MIA antibody" is meant an antibody that selectively binds a MIA polypeptide.

By "anti-MIC-1 antibody" is meant an antibody that selectively binds a MIC-1 polypeptide.

By "anti-SPON1 antibody" is meant an antibody that selectively binds a SPON1 polypeptide.

By "disease" is meant any condition or disorder that damages or interferes with the normal function of a cell, tissue, or organ. Examples of diseases include pancreatic cancer.

By "effective amount" is meant the amount of a required to ameliorate the symptoms of a disease relative to an untreated patient. The effective amount of active compound(s) used to practice the present invention for therapeutic treatment of a disease varies depending upon the manner of administration, the age, body weight, and general health of the subject. Ultimately, the attending physician or veterinarian will decide the appropriate amount and dosage regimen. Such amount is referred to as an "effective" amount.

By "fragment" is meant a portion of a polypeptide or nucleic acid molecule. This portion contains, preferably, at least 10%, 20%, 30%, 40%, 50%, 60%, 70%, 80%, or 90% of the entire length of the reference nucleic acid molecule or polypeptide. A fragment may contain 10, 20, 30, 40, 50, 60, 70, 80, 90, or 100, 200, 300, 400, 500, 600, 700, 800, 900, or 1000 nucleotides or amino acids.

"Hybridization" means hydrogen bonding, which may be Watson-Crick, Hoogsteen or reversed Hoogsteen hydrogen bonding, between complementary nucleobases. For example, adenine and thymine are complementary nucleobases that pair through the formation of hydrogen bonds.

"Diagnostic" means identifying the presence or nature of a pathologic condition, i.e., pancreatic cancer. Diagnostic methods differ in their sensitivity and specificity. The "sensitivity" of a diagnostic assay is the percentage of diseased individuals who test positive (percent of "true positives"). Diseased individuals not detected by the assay are "false negatives." Subjects who are not diseased and who test negative in the assay, are termed "true negatives." The "specificity" of a diagnostic assay is 1 minus the false positive rate, where the "false positive" rate is defined as the proportion of those without the disease who test positive. While a particular diagnostic method may not provide a definitive diagnosis of a condition, it suffices if the method provides a positive indication that aids in diagnosis.

By "marker" is meant any protein or polynucleotide having an alteration in expression level or activity that is associated with a disease or disorder. The term "biomarker" is used interchangeably with the term "marker."

The term "measuring" means methods which include detecting the presence or absence of marker(s) in the sample, quantifying the amount of marker(s) in the sample, and/or qualifying the type of biomarker. Measuring can be accomplished by methods known in the art and those further described herein, including but not limited to immunoassay. Any suitable methods can be used to detect and measure one or more of the markers described herein. These methods include, without limitation, ELISA and bead-based immunoassays (e.g., monoplexed or multiplexed bead-based immunoassays, magnetic bead-based immunoassays).

As used herein, "obtaining" as in "obtaining an agent" includes synthesizing, purchasing, or otherwise acquiring the agent.

The terms "polypeptide," "peptide" and "protein" are used interchangeably herein to refer to a polymer of amino acid residues. The terms apply to amino acid polymers in which one or more amino acid residue is an analog or mimetic of a corresponding naturally occurring amino acid, as well as to naturally occurring amino acid polymers. Polypeptides can be modified, e.g., by the addition of carbohydrate residues to form glycoproteins. The terms "polypeptide," "peptide" and "protein" include glycoproteins, as well as non-glycoproteins.

By "reduces" is meant a negative alteration of at least 10%, 25%, 50%, 75%, or 100%.

By "reference" is meant a standard or control condition.

A "reference sequence" is a defined sequence used as a basis for sequence comparison. A reference sequence may be a subset of or the entirety of a specified sequence; for example, a segment of a full-length cDNA or gene sequence, or the complete cDNA or gene sequence. For polypeptides, the length of the reference polypeptide sequence will generally be at least about 16 amino acids, preferably at least about 20 amino acids, more preferably at least about 25 amino acids, and even more preferably about 35 amino acids, about 50 amino acids, or about 100 amino acids. For nucleic acids, the length of the reference nucleic acid sequence will generally be at least about 50 nucleotides, preferably at least about 60 nucleotides, more preferably at least about 75 nucleotides, and even more preferably about 100 nucleotides or about 300 nucleotides or any integer thereabout or therebetween.

"Immunoassay" is an assay that uses an antibody to specifically bind an antigen (e.g., a marker). The immunoassay is characterized by the use of specific binding properties of a particular antibody to isolate, target, and/or quantify the antigen.

The term "antibody," as used in this disclosure, refers to an immunoglobulin or a fragment or a derivative thereof, and encompasses any polypeptide comprising an antigen-binding site, regardless of whether it is produced in vitro or in vivo. The term includes, but is not limited to, polyclonal, monoclonal, monospecific, polyspecific, non-specific, humanized, single-chain, chimeric, synthetic, recombinant, hybrid, mutated, and grafted antibodies. Unless otherwise modified by the term "intact," as in "intact antibodies," for the purposes of this disclosure, the term "antibody" also includes antibody fragments such as Fab, $F(ab')_2$, Fv, scFv, Fd, dAb, and other antibody fragments that retain antigen-binding function, i.e., the ability to bind, for example, PD-L1, specifically. Typically, such fragments would comprise an antigen-binding domain.

The terms "antigen-binding domain," "antigen-binding fragment," and "binding fragment" refer to a part of an antibody molecule that comprises amino acids responsible for the specific binding between the antibody and the antigen. In instances, where an antigen is large, the antigen-binding domain may only bind to a part of the antigen. A portion of the antigen molecule that is responsible for specific interactions with the antigen-binding domain is referred to as "epitope" or "antigenic determinant." An antigen-binding domain typically comprises an antibody light chain variable region (VI.) and an antibody heavy chain variable region (VH), however, it does not necessarily have to comprise both. For example, a so-called Fd antibody fragment consists only of a VH domain, but still retains some antigen-binding function of the intact antibody.

Binding fragments of an antibody are produced by recombinant DNA techniques, or by enzymatic or chemical cleavage of intact antibodies. Binding fragments include Fab, Fab', $F(ab')_2$, Fv, and single-chain antibodies. An antibody other than a "bispecific" or "bifunctional" antibody is understood to have each of its binding sites identical. Digestion of antibodies with the enzyme, papain, results in two identical antigen-binding fragments, known also as "Fab" fragments, and a "Fc" fragment, having no antigen-binding activity but having the ability to crystallize. Digestion of antibodies with the enzyme, pepsin, results in the a $F(ab')_2$ fragment in which the two arms of the antibody molecule remain linked and comprise two-antigen binding sites. The $F(ab')_2$ fragment has the ability to crosslink antigen. "Fv" when used herein refers to the minimum fragment of an antibody that retains both antigen-recognition and antigen-binding sites. "Fab" when used herein refers to a fragment of an antibody that comprises the constant domain of the light chain and the CHI domain of the heavy chain.

The term "mAb" refers to monoclonal antibody. Antibodies of the invention comprise without limitation whole native antibodies, bispecific antibodies; chimeric antibodies; Fab, Fab', single chain V region fragments (scFv), fusion polypeptides, and unconventional antibodies.

By "specifically binds" is meant a compound or antibody that recognizes and binds a polypeptide of the invention, but which does not substantially recognize and bind other molecules in a sample, for example, a biological sample, which naturally includes a polypeptide of the invention.

As used herein, the term "sensitivity" is the percentage of subjects with a particular disease.

As used herein, the term "specificity" is the percentage of subjects correctly identified as having a particular disease i.e., normal or healthy subjects. For example, the specificity is calculated as the number of subjects with a particular disease as compared to non-cancer subjects (e.g., normal healthy subjects).

Nucleic acid molecules useful in the methods of the invention include any nucleic acid molecule that encodes a polypeptide of the invention or a fragment thereof. Such nucleic acid molecules need not be 100% identical with an endogenous nucleic acid sequence, but will typically exhibit substantial identity. Polynucleotides having "substantial identity" to an endogenous sequence are typically capable of hybridizing with at least one strand of a double-stranded nucleic acid molecule. Nucleic acid molecules useful in the methods of the invention include any nucleic acid molecule that encodes a polypeptide of the invention or a fragment thereof. Such nucleic acid molecules need not be 100% identical with an endogenous nucleic acid sequence, but will typically exhibit substantial identity. Polynucleotides having "substantial identity" to an endogenous sequence are typically capable of hybridizing with at least one strand of a double-stranded nucleic acid molecule. By "hybridize" is meant pair to form a double-stranded molecule between complementary polynucleotide sequences (e.g., a gene described herein), or portions thereof, under various conditions of stringency. (See, e.g., Wahl, G. M. and S. L. Berger (1987) Methods Enzymol. 152:399; Kimmel, A. R. (1987) Methods Enzymol. 152:507).

For example, stringent salt concentration will ordinarily be less than about 750 mM NaCl and 75 mM trisodium citrate, preferably less than about 500 mM NaCl and 50 mM trisodium citrate, and more preferably less than about 250 mM NaCl and 25 mM trisodium citrate. Low stringency hybridization can be obtained in the absence of organic solvent, e.g., formamide, while high stringency hybridization can be obtained in the presence of at least about 35% formamide, and more preferably at least about 50% formamide. Stringent temperature conditions will ordinarily include temperatures of at least about 30° C., more preferably of at least about 37° C., and most preferably of at least about 42° C. Varying additional parameters, such as hybridization time, the concentration of detergent, e.g., sodium dodecyl sulfate (SDS), and the inclusion or exclusion of carrier DNA, are well known to those skilled in the art. Various levels of stringency are accomplished by combining these various conditions as needed. In a preferred: embodiment, hybridization will occur at 30° C. in 750 mM NaCl, 75 mM trisodium citrate, and 1% SDS. In a more preferred embodiment, hybridization will occur at 37° C. in 500 mM NaCl, 50 mM trisodium citrate, 1% SDS, 35% formamide, and 100 .mu.g/ml denatured salmon sperm DNA (ssDNA). In a most preferred embodiment, hybridization will occur at 42° C. in 250 mM NaCl, 25 mM trisodium citrate, 1% SDS, 50% formamide, and 200 µg/ml ssDNA. Useful variations on these conditions will be readily apparent to those skilled in the art.

For most applications, washing steps that follow hybridization will also vary in stringency. Wash stringency conditions can be defined by salt concentration and by temperature. As above, wash stringency can be increased by decreasing salt concentration or by increasing temperature. For example, stringent salt concentration for the wash steps will preferably be less than about 30 mM NaCl and 3 mM trisodium citrate, and most preferably less than about 15 mM NaCl and 1.5 mM trisodium citrate. Stringent temperature conditions for the wash steps will ordinarily include a temperature of at least about 25° C., more preferably of at least about 42° C., and even more preferably of at least about 68° C. In a preferred embodiment, wash steps will occur at 25° C. in 30 mM NaCl, 3 mM trisodium citrate, and 0.1% SDS. In a more preferred embodiment, wash steps will occur at 42 C in 15 mM NaCl, 1.5 mM trisodium citrate, and 0.1% SDS. In a more preferred embodiment, wash steps will occur at 68° C. in 15 mM NaCl, 1.5 mM trisodium citrate, and 0.1% SDS. Additional variations on these conditions will be readily apparent to those skilled in the art. Hybridization techniques are well known to those skilled in the art and are described, for example, in Benton and Davis (Science 196: 180, 1977); Grunstein and Hogness (Proc. Natl. Acad. Sci., USA 72:3961, 1975); Ausubel et al. (Current Protocols in Molecular Biology, Wiley Interscience, New York, 2001); Berger and Kimmel (Guide to Molecular Cloning Techniques, 1987, Academic Press, New York); and Sambrook et al., Molecular Cloning: A Laboratory Manual, Cold Spring Harbor Laboratory Press, New York.

By "substantially identical" is meant a polypeptide or nucleic acid molecule exhibiting at least 50% identity to a reference amino acid sequence (for example, any one of the amino acid sequences described herein) or nucleic acid sequence (for example, any one of the nucleic acid sequences described herein). Preferably, such a sequence is at least 60%, more preferably 80% or 85%, and more preferably 90%, 95% or even 99% identical at the amino acid level or nucleic acid to the sequence used for comparison.

Sequence identity is typically measured using sequence analysis software (for example, Sequence Analysis Software Package of the Genetics Computer Group, University of Wisconsin Biotechnology Center, 1710 University Avenue, Madison, Wis. 53705, BLAST, BESTFIT, GAP, or PILEUP/ PRETTYBOX programs). Such software matches identical or similar sequences by assigning degrees of homology to various substitutions, deletions, and/or other modifications. Conservative substitutions typically include substitutions within the following groups: glycine, alanine; valine, isoleucine, leucine; aspartic acid, glutamic acid, asparagine, glutamine; serine, threonine; lysine, arginine; and phenylalanine, tyrosine. In an exemplary approach to determining the degree of identity, a BLAST program may be used, with a probability score between $e^{-3}$ and $e^{-100}$ indicating a closely related sequence.

By "subject" is meant a mammal, including, but not limited to, a human or non-human mammal, such as a bovine, equine, canine, ovine, or feline.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, the terms "treat," treating," "treatment," and the like refer to reducing or ameliorating a disorder and/or symptoms associated therewith. It will be appreciated that, although not precluded, treating a disorder or condition does not require that the disorder, condition or symptoms associated therewith be completely eliminated.

Unless specifically stated or obvious from context, as used herein, the term "or" is understood to be inclusive. Unless specifically stated or obvious from context, as used herein, the terms "a", "an", and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

BRIEF DESCRIPTION OF THE DRAWINGS

FIGS. 2A-2F are plots showing calibration curves of the 6-plex immunoassay. Calibration curves of OPN, MIA, CEACAM-1, MIC-1, SPON1, and HSP27 (shown in FIGS. 2A-2F, respectively) in the 6-plex immunoassay were generated using the 5 parameter (5PL) logistic regression model. "A.U." refers to arbitrary units.

FIGS. 3A-3G are scatter plots of 7 serum biomarker levels in this cohort. Only serum levels of biomarkers demonstrating significant differences between pancreatitis or intraductal papillary mucinous neoplasm (IPMN) and pancreatic ductal adenocarcinoma (PDAC) early stage (or benign and PDAC) are asterisked (Mann-Whitney U test). Bars indicate median value. *, $p<0.05$; , $p<0.01$; *, $p<0.001$; *, $p<0.0001$.

FIGS. 5A-5F are comparisons of the multiplex immunoassay and monoplex immunoassay. A-F, correlations of the 6-plex immunoassay and their respective monoplex immunoassay for measurements of OPN, MIA, CEACAM-1, MIC-1, SPON1 and HSP27.

FIGS. 6A-6G are an analysis of biomarkers in sera from PDAC patients, benign conditions, and healthy controls. A-F, expressions of OPN, MIA, CEACAM-1, MIC-1, SPON1, HSP27 and CA19-9 in PDAC patients, benign conditions, and healthy controls. Only serum levels of biomarkers demonstrating significant differences between pancreatitis or IPMN and PDAC early stage (or benign and PDAC) are asterisked (Mann-Whitney U test). Bars indicate median value. *, $p<0.05$; , $p<0.01$; *, $p<0.001$; ****, $p<0.0001$.

FIGS. 8A-8G. Scatter plots of 7 serum biomarker levels in all samples. A-F, there were significant differences of OPN, MIA, CEACAM-1, MIC-1, SPON1 & CA19-9 serum levels between normal and PDAC (all $p<0.0001$, except MIA at $p=0.043$). There were also significant differences of OPN, CEACAM-1, MIC-1 & CA19-9 serum levels between benign and PDAC (all $p<0.0001$, except OPN at $p=0.021$). Mann-Whitney U test was used for the comparisons. Bars indicate median value. *, $p<0.05$; , $p<0.01$; *, $p<0.001$; ****, $p<0.0001$.

DETAILED DESCRIPTION OF THE INVENTION

Figure 1A:
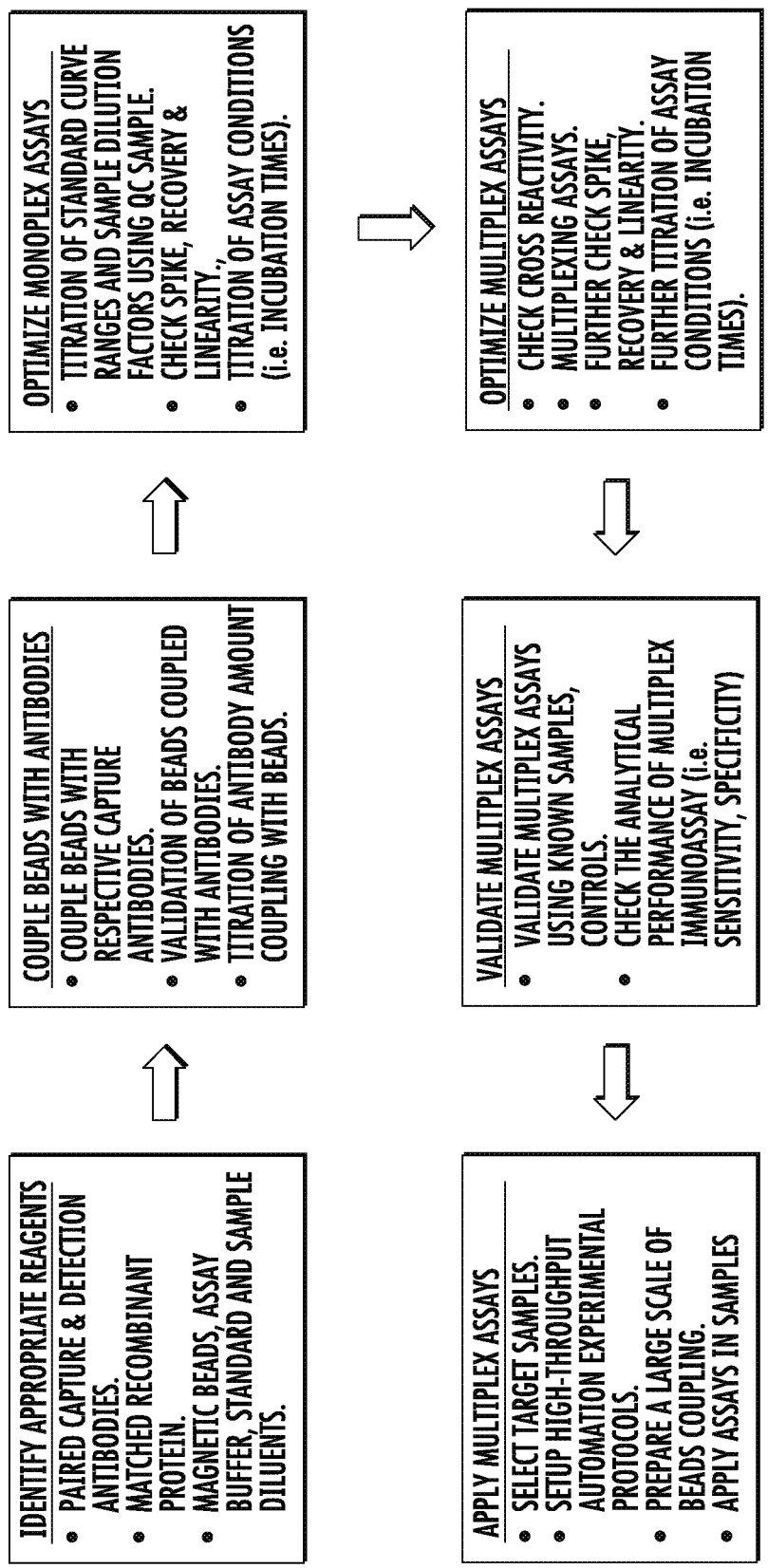
FIGS. 1A-1B are a general view of magnetic bead-based multiplex immunoassay development and application. A, a flowchart of multiplex immunoassay development and application. B, a workflow of mangetic bead-based multiplex immunoassay.

The invention features compositions and methods that are useful for early detection of pancreatic cancer. The invention is based, at least in part, on the discovery of biomarkers (e.g., MIC-1, CEACAM-1, MIA, SPON1) that complement CA19-9, whereby the panel comprising CA19-9 and complementary biomarkers of the invention improve accuracy of detection of pancreatic cancer.

Pancreatic cancer is the 4th leading cause of cancer death in the United States. The majority of patients present with unresectable disease leading a median survival of 6 months and an overall 5-year survival of <5%. The early detection of this disease is critical because surgery at an early stage is the most promising therapy that could greatly improve the prognosis of patients.

Development and Validation of a 6-Plex Immunoassay

Customized magnetic bead-based multiplex immunoassays were developed for the selected candidate serum biomarkers using a Bio-Plex 200 suspension array system. Magnetic bead-based monoplex immunoassays were first developed for OPN, MIA, CEACAM-1, MIC-1, SPON1 and HSP27 using pooled normal human sera. The cross-reactivity studies through single-detection and mutiplexed-detection antibody experiments indicated that the degree of cross-reactivity across the 6 immunoassays was generally <1%, based on the measurements in response to high concentrations of the recombinant proteins at first dilution point (except SPON1 at the third dilution because only 1.4% of sera with SPON1 exceed the third dilution) of the standard curve (Table 2). About 1.3-3.3% of nonspecific cross-reactions were observed in SPON1 antibody against other proteins. But, it should be noted that majority of these nonspecific cross-reactions were observed at recombinant protein concentrations that exceed physiological levels, thereby reducing the chance of cross-reactivity in physiological human serum samples.

By mixing the capture antibody-coupled beads and detection antibodies used in the monoplex immunoassays, a 6-plex immunoassay of OPN, MIA, CEACAM-1, MIC-1, SPON1 and HSP27 was developed and evaluated. The calibration curves of the 6-plex immunoassay generated using the 5PL logistic regression models are shown in FIG. 2A-F. The 6-plex immunoassay results correlated significantly with their respective monoplex immunoassay results (FIG. 5A-F and Table 3), suggesting that the 6-plex immunoassay was comparable to the monoplex immunoassays in protein quantifications. Furthermore, there were significant correlations of OPN and HSP27 protein measurements using the the 6-plex immunoassay compared with using the commercial ELISA kits (Table 3).

The analytical performance of the 6-plex immunoassay is shown in Table 3, with recovery of 89-104% (standard curve points and QCs), intra-assay precision of 2.1-15.4% (QCs) and inter-assay precision of 3.7-21.5% (QCs). The 6-plex immunoassay exhibited wide dynamic concentration ranges the calibration curves covered (median at 227-fold) defined by LLOQ and ULOQ, and low LOBs for target protein quantifications.

Application of the 6-Plex Immunoassay in the Detection of PDAC

Figure 8E:
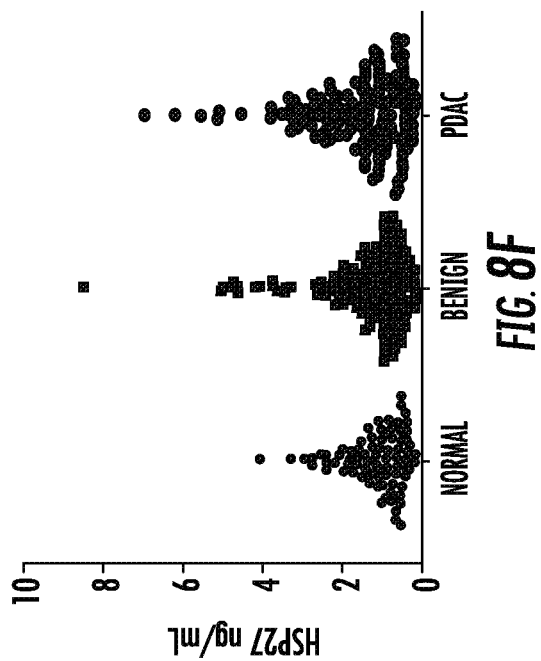
Figure 8F:
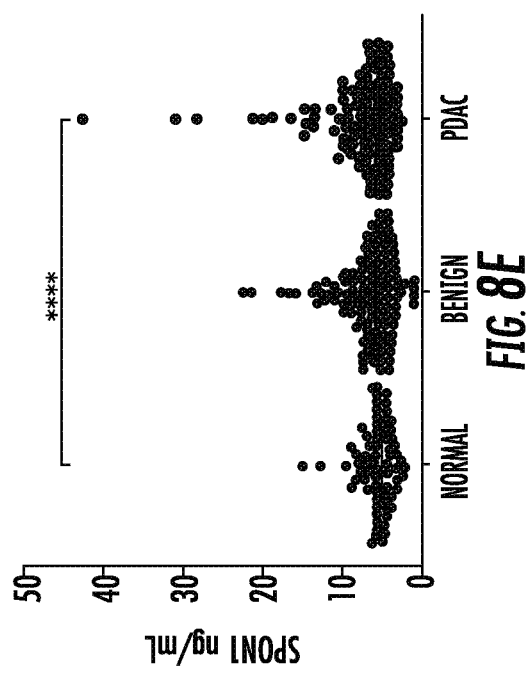
Figure 8G:
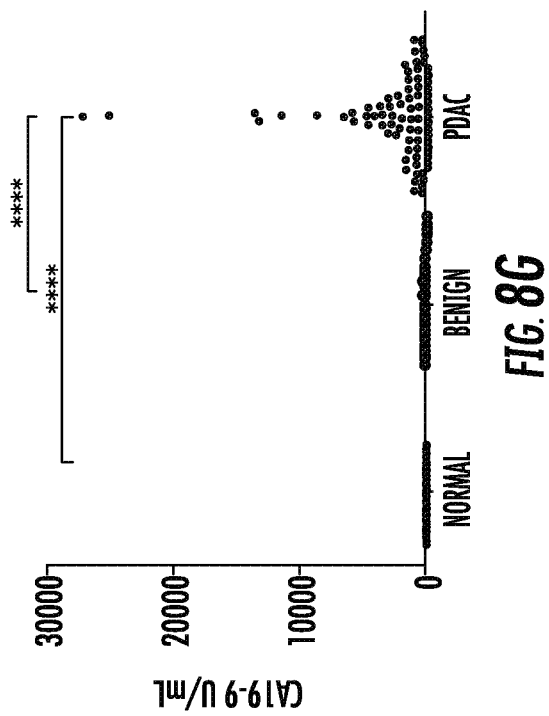
Figure 9A:
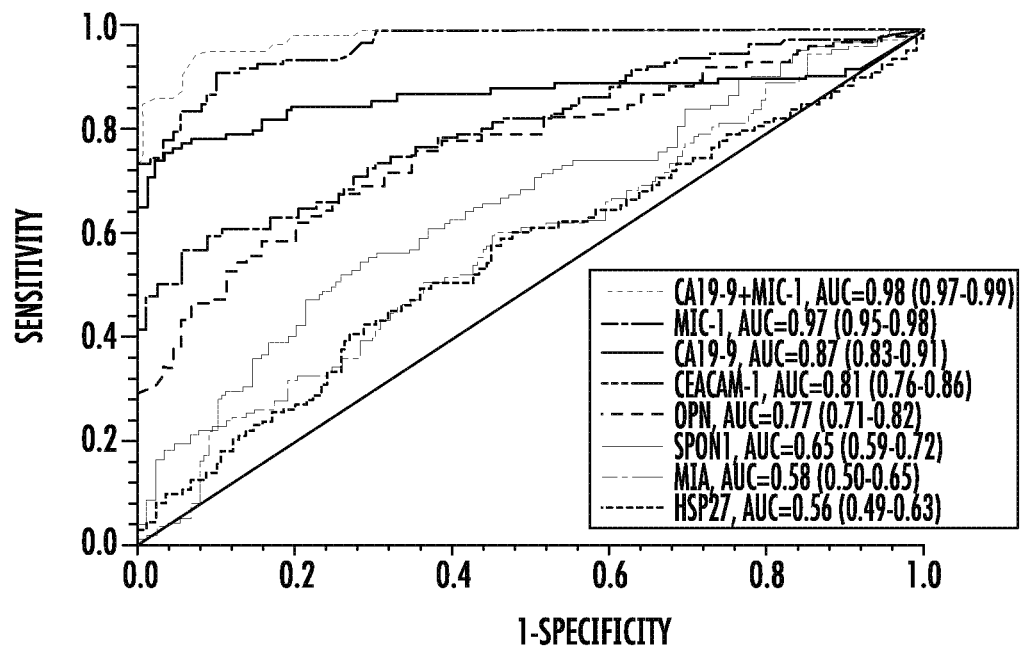
FIGS. 9A-9B are the diagnostic performances of 7 serum biomarkers in detection of PDAC. Diagnostic performances of CA19-9, OPN, MIA, CEACAM-1, MIC-1, SPON1 & HSP27 as individual markers or the combination of two best biomarkers (CA19-9 & MIC-1) in differentiating patients with PDAC versus healthy controls (A) or benign conditions (B). ROC curves with AUCs are presented along with their 95% CI in brackets.
Figure 9B:
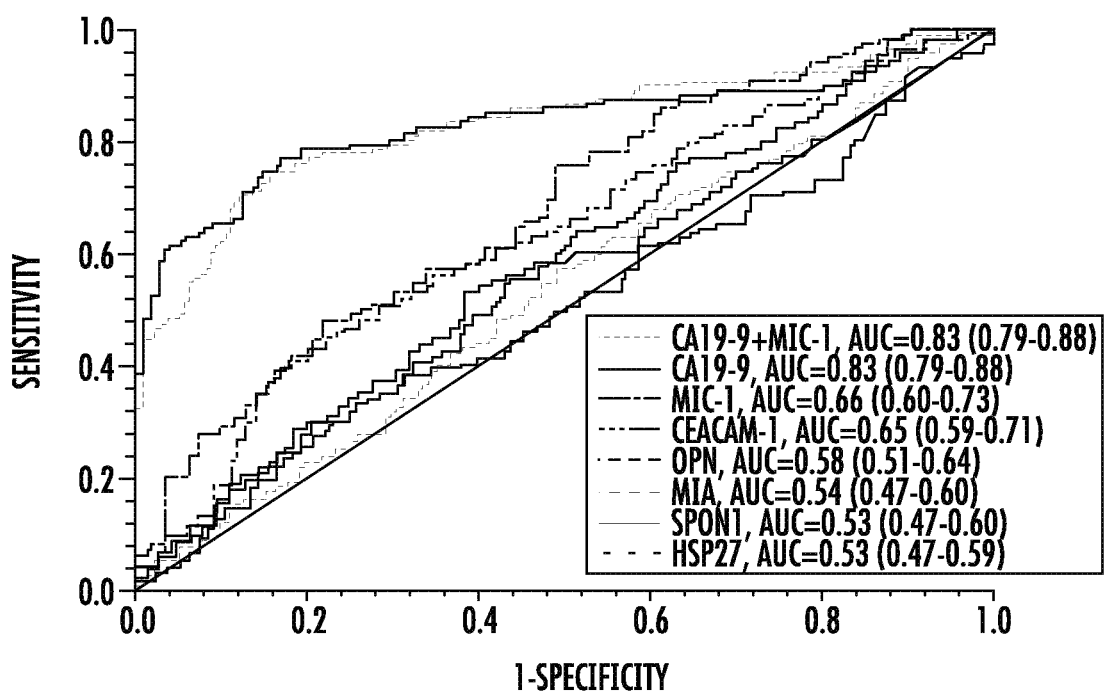

The developed 6-plex immunoassay was applied to analyze the target protein levels in sera of 189 patients diagnosed with PDAC, 131 patients with benign pancreatic conditions, and 89 healthy controls (Table 1). The performances of the individual markers were compared to CA19-9 in discriminating PDAC versus healthy controls or benign conditions (FIG. 6, FIGS. 8-9, and Table 5). Scrum levels of OPN, CEACAM-1, MIC-1 SPON1 & CA19-9 were significantly increased in PDAC patients compared to healthy controls (all at p<0.0001), but MIA was significantly decresed in PDAC patients compared to healthy controls (p=0.043) (FIG. 8). Serum levels of OPN, CEACAM-1, MIC-1 & CA19-9 were also significantly increased in PDAC patients compared to benign conditions (all p<0.0001, except OPN at p=0.021) (FIG. 8). Individually, the best biomarkers to separate PDAC patients from healthy controls or benign conditions on the ROC analysis were MIC-1 (AUC=0.97, [0.95-0.98]), CA19-9 (0.87, [0.83-0.91]), CEACAM-1 (0.81, [0.76-0.86]) & OPN (0.77, [0.71-0.82]) or CA19-9 (0.83, [0.79-0.88]), MIC-1 (0.66, [0.60-0.73]), CEACAM-1 (0.65, [0.59-0.71]) & OPN (0.58, [0.51-0.64]), respectively (FIG. 9). The combination of CA19-9 with other biomarkers did not show obvious improvement in discriminating PDAC from benign conditions; however the combination of CA19-9 and MIC-1 significantly improve the diagnostic performance of CA19-9 alone in detection of PDAC from healthy controls (only the combination of CA19-9 & MIC-1 on the ROC analysis were shown in Supplement FIG. 2; other combinations of individual biomarkers not shown).

Serum levels of individual biomarkers were further analyzed in different subgroups consisting of 89 healthy controls, 68 chronic pancreatitis, 63 IPMN, 97 PDAC early stage, and 92 PDAC late stage patients (FIG. 6). Demonstrating as the most interesting findings in this study, serum levels of CA19-9, MIC-1 & CEACAM-1 were significantly increased in PDAC early stage compared to chronic pancreatitis patients (CA19-9 at p<0.0001, MIC-1 at p<0.01, and CEACAM-1 at p<0.05) (FIG. 6). Serum levels of CA19-9, MIC-1, CEACAM-1 & OPN were also significantly increased in PDAC early stage compared to IPMN patients (CA19-9 & MIC-1 at p<0.0001, CEACAM-1 at p<0.001, and OPN at p=0.01) (FIG. 4). Individually, the best biomarkers to separate PDAC early stage from pancreatitis or IPMN based on the ROC analysis were CA19-9 (AUC-0.77, [0.70-0.84]), MIC-1 (0.64, [0.55-0.73]), CEACAM-1 (0.60, [0.51-0.69]) & MIA (0.57, [0.49-0.66]) or CA19-9 (AUC=0.81, [0.74-0.88]), MIC-1 (0.73, [0.65-0.81]), CEACAM-1 (0.67, [0.59-0.75]) & OPN (0.64, [0.55-0.73]), respectively (FIG. 5). Logistic regression modeling and ROC analysis selected a five-marker panel of CA19-9, MIC-1, CEACAM-1, MIA & OPN with an AUC=0.84 (0.78-0.90) for PDAC early stage versus pancreatitis or AUC=0.86 (0.80-0.91) for PDAC early stage versus IPMN, which significantly improved the individual biomarker performance (FIG. 7).

In the present invention, the inventors identified a five-marker panel of CA19-9, MIC-1, CEACAM-1, MIA & OPN showing strong diagnostic performances and significant complementarities of these markers with CA19-9 in the detection of early stage PDAC from healthy controls and benign pancreatic conditions. These results provide an advanced validation on the utilities of these serum biomarkers in early detection of PDAC. MIC-1 belongs to transforming growth factor-β superfamily, originally identified in activated macrophages and was found overexpressed in several cancer types. MIC-1 may have anticancer functions, as its promoter region is a target for p53. Koopmann et al reported that serum MIC-1 outperforms CA19-9 in the differention of patients with resectable pancreatic cancer from healthy controls with an AUC=0.99 (MIC-1) versue 0.78 (CA19-9) but not from chronic pancreatitis (0.81 versue 0.74). CEACAM-1 is a member of of the human carcinoembryonic antigen (CEA) family. The CEACAM subgroup members belong to the immunoglobulin superfamily of adhesion molecules. CEACAMI is expressed in a number of epithelia, granulocytes, and lymphocytes, and the expression of CEACAM-1 was also reported in different cancer types. CEACAM-1 plays an important role in the regulation of tumor growth, angiogenesis, and immune modulation. OPN is a glycophosphoprotein normally produced and secreted into most body fluids by osteoblasts, arterial smooth muscle cells, various epithelia, activated T cells and macrophages, and was often found overexpressed in different cancer types. OPN is most likely related to tumorigenesis, cancer cell proliferation and progression, migration and invasion, protection from apoptosis, and enhancement of metastatic ability. MIA is a small secreted protein coded by a single copy gene on chromosome 19q13.31-q13.33 and acts as an autocrine growth factor. MIA is strongly expressed by malignant melanoma cells and interacts with extracellular matrix proteins. Its overexpression promotes the metastatic behaviour of malignant melanoma. MIA was found overexpressed in pancreatic cancer and has the potential of promoting the invasiveness of pancreatic cancer cells, but its serum level were not significantly different between healthy donors and pancreatic cancer patients.

In the present invention, a 6-plex immunoassay of OPN, MIA, CEACAM-1, MIC-1, SPON1 and HSP27 was in-house developed, validated, and applied to a set of serum samples of PDAC patients, benign pancreatic conditions and healthy controls to evaluate their performances individually or in combination on their capacity to complement CA19-9 in early detection of pancreatic cancer. The assay was characterized by LOB/LLOQ, cross-reactivity, recovery, intra-and inter-assay precision; and demonstrated wide dynamic ranges for the target protein measurements that significantly correlated with their respective monoplex assays and/or commercial ELISAs. The assay shows advantages over traditional ELISA and other antibody-based approaches in both multiplexing and flexibility. It measures 6 candidate proteins in only 12.5 μL of serum, and could include more candidate proteins into the panel as soon as appropriate pairs of capture and detection antibodies become available. It is important to note a few general considerations for the development of a multiplex immunoassay of human serum biomarkers. First, due to the different abundances of the candidate proteins in human serum, the effective biological range of each protein must be considered to ensure the fluorescence signal falling into the dynamic range of the assay. A more sensitive assay is needed for one protein with low abundance in the 6-plex immunoassay such as MIA, while a less sensitive assay may be required for another protein which may be of high abundance in the same multiplex immunoassay such as OPN. The sensitivity of each assay may be affected by the affinity/amount of the capture antibody and the amount of capture beads used for that protein. Second, antibody characteristics such as affinity and specificity are critical for the performance of a multiplex immunoassay. All pairs of capture and detection antibodies used in this study have been tested as compatible in the sandwich ELISA for human serum samples. The majority of the capture antibodies used in this study were monoclonal antibodies which are potentially more specific than polyclonal antibodies. All of the detection antibodies except SPON1 used in this study were commercially available biotinylated antibodies. Third, the performance of the multiplex immunoassays is more analyte and sample matrix dependent compared to monoplex immunoassays. Improper storage and non-optimal sample dilutions of serum samples can influence concentration measurements of some selected proteins in a complex sample matrix. It is vital to properly store serum samples at −80° C. prior to the analysis and avoid repeated freeze-thawing of serum samples.

In summary, a magnetic bead-based multiplex immunoassay was developed demonstrating sufficient analytical performance to evaluate serum biomarkers that may complement CA19-9 in early detection of PDAC. The biomarker panels identified in this study warrant additional clinical validation to determine their role in early detection of pancreatic cancer, which could lead to earlier intervention and better outcomes.

Pancreatic Cancer Treatment

The present invention provides methods of selecting a subject for pancreatic cancer treatment. Pancreatic cancer treatment includes, without limitation, surgery and/or administration of chemotherapeutic agent(s) to the subject. In one embodiment, the pancreatic cancer treatment is surgery. Chemotherapeutic agents suitable for treating pancreatic cancer include, without limitation, gemcitabine, 5-fluorouracil, irinotecan, oxaliplatin, paclitaxel, capecitabine, cisplatin, and docetaxel. Pancreatic cancer treatment comprising chemotherapeutic methods of (which include prophylactic treatment) in general comprise administration of a therapeutically effective amount of a chemotherapeutic agent to a subject (e.g., animal, human) in need thereof, including a mammal, particularly a human.

As used herein, the terms "treat," "treating," "treatment," and the like refer to reducing or ameliorating a disorder and/or symptoms associated therewith. It will be appreciated that, although not precluded, treating a disorder or condition does not require that the disorder, condition or symptoms associated therewith be completely eliminated.

As used herein, the terms "prevent," "preventing," "prevention," "prophylactic treatment" and the like refer to reducing the probability of developing a disorder or condition in a subject, who does not have, but is at risk of or susceptible to developing a disorder or condition.

Such treatment (surgery and/or chemotherapy) will be suitably administered to subjects, particularly humans, suffering from, having, susceptible to, or at risk for pancreatic cancer or disease, disorder, or symptom thereof. Determination of those subjects "at risk" can be made by any objective or subjective determination by a diagnostic test or opinion of a subject or health care provider (e.g., genetic test, enzyme or protein marker, a marker (as defined herein), family history, and the like). In particular embodiments, determination of subjects susceptible to or having a pancreatic cancer is determined by measuring levels of at least one of the markers of the invention (e.g., CA19-9, MIA, MIC-1, CEACAM-1,OPN, SPON1, HSP27, POSTN, or LGALS3BP). In particular embodiments, a subject determined susceptible to or having a pancreatic cancer is selected for surgery.

Diagnostics

The present invention provides a number of diagnostic assays that are useful for early detection of pancreatic cancer in a subject. Current existing serum markers for pancreatic cancer such as CA19-9 lack the necessary sensitivity and specificity. Accordingly, the present invention provides other markers (e.g., MIA, MIC-1, CEACAM-1,OPN, SPON1, HSP27, POSTN, LGALS3BP) which are useful individually, in any combination with each other, or in any combination with CA19-9 for the detection of pancreatic cancer.

The presence or absence of the herein disclosed marker(s) is measured in a biological sample from a subject. Biological samples that are used to evaluate the presence or absence of the herein disclosed markers include without limitation blood, serum, plasma, urine. In one embodiment, the biological sample is serum.

While the examples provided below describe specific methods of detecting levels of these markers, the skilled artisan appreciates that the invention is not limited to such methods. The biomarkers of this invention can be detected by any suitable method. For example, marker levels are quantifiable by any standard method, such methods include, but are not limited to real-time PCR, Southern blot, PCR, mass spectroscopy, and/or antibody binding.

The methods described herein can be used individually or in combination for a more accurate detection of the biomarkers (e.g., immunoassay, mass spectrometry, and the like). The accuracy of a diagnostic assay can be characterized by a Receiver Operating Characteristic curve ("ROC curve"). An ROC is a plot of the true positive rate against the false positive rate for the different possible cutpoints of a diagnostic test. An ROC curve shows the relationship between sensitivity and specificity. That is, an increase in sensitivity will be accompanied by a decrease in specificity. The closer the curve follows the left axis and then the top edge of the ROC space, the more accurate the test. Conversely, the closer the curve comes to the 45-degree diagonal of the ROC graph, the less accurate the test. The area under the ROC is a measure of test accuracy. The accuracy of the test depends on how well the test separates the group being tested into those with and without the disease in question. An area under the curve (referred to as "AUC") of 1 represents a perfect test, while an area of 0.5 represents a less useful test. In certain embodiments, biomarkers and diagnostic methods of the present invention have an AUC greater than 0.50. In other embodiments, biomarkers and diagnostic methods of the present invention have an AUC greater than 0.60. In other embodiments, biomarkers and diagnostic methods of the present invention have an AUC greater than 0.70. Exemplary combinations of markers (or panels of biomarkers) of the invention include, without limitation, the combination CA19-9 and MIA; the combination CA19-9 and SPON1; the combination CA19-9 and MIC-1; and, the combination CA19-9 and CEACAM-1. Exemplary combinations of markers (or panels of biomarkers) of the invention include, without limitation, the combination CA19-9, HSP27, and MIA1. Exemplary combinations of markers (or panels of biomarkers) of the invention include, without limitation, the combination CA19-9, CEACAM-1, MIC-1, SPON1 and MIA.

In particular embodiments, the biomarkers of the invention (e.g., CA19-9, MIA, MIC-1, CEACAM-1, OPN, SPON1, HSP27, POSTN, LGALS3BP) are measured by immunoassay. Immunoassay typically utilizes an antibody (or other agent that specifically binds the marker) to detect the presence or level of a biomarker in a sample. Antibodies can be produced by methods well known in the art, e.g., by immunizing animals with the biomarkers. Biomarkers can be isolated from samples based on their binding characteristics. Alternatively, if the amino acid sequence of a polypeptide biomarker is known, the polypeptide can be synthesized and used to generate antibodies by methods well known in the art.

This invention contemplates traditional immunoassays including, for example, Western blot, sandwich immunoassays including ELISA and other enzyme immunoassays, fluorescence-based immunoassays, and chemiluminescence. Other forms of immunoassay include magnetic immunoassay, radioimmunoassay, and real-time immunoquantitative PCR (iqPCR).

Immunoassays can be carried out on solid substrates (e.g., chips, beads, microfluidic platforms, membranes) or on any other forms that supports binding of the antibody to the marker and subsequent detection. A single marker may be detected at a time or a multiplex format may be used. Multiplex immunoanalysis may involve planar microarrays (protein chips) and bead based microarrays (suspension arrays).

In particular embodiments, the immunoassay is carried out using multiplexed bead assays. In particular embodiments, the immunoassay is carried out using magnetic bead-based multiplexed assays. Multiplexed bead assays use a series of spectrally discrete particles that are used to capture and quantitate soluble analytes. The analyte is then measured by detection of a fluorescence-based emission and flow cytometric analysis. Multiplexed bead assays generate data that is comparable to ELISA based assays, but in a multiplexed or simultaneous fashion. Concentration of unknowns is calculated for the cytometric bead array as with any sandwich format assay, i.e., through the use of known standards and by plotting unknowns against a standard curve. Further, multiplexed bead assays allow quantification of soluble analytes in samples never previously considered due to sample volume limitations. In addition to the quantitative data, powerful visual images are generated revealing unique profiles or signatures that provide the user with additional information at a glance.

In particular embodiments, subjects are characterized as having an increased level of CA19-9. In particular embodiments, subjects are characterized as having an increased level of MIA. In particular embodiments, subjects are characterized as having an increased level of MIC-1. In particular embodiments, subjects are characterized as having an increased level of CEACAM-1. In particular embodiments, subjects are characterized as having an increased level of OPN. In particular embodiments, subjects are characterized as having an increased level of SPON1.

In particular embodiments, subjects are characterized as having an increased level of CA19-9 and at least one of the markers selected from the group consisting of: MIA, MIC-1, CEACAM-1, OPN, SPON1, HSP27, POSTN, and LGALS3BP. In particular embodiments, subjects are characterized as having increased levels of CA19-9 and MIA. In particular embodiments, subjects are characterized as having increased levels of CA19-9 and MIC-1. In particular embodiments, subjects are characterized as having increased levels of CA19-9 and CEACAM-1. In particular embodiments, subjects are characterized as having increased levels of CA19-9 and SPON1.

In particular embodiments, subjects are characterized as having an increased level of the combination of markers CA19-9, HSP27, and MIA1. In particular embodiments, subjects are characterized as having an increased level of the combination of markers CA19-9, CEACAM-1, MIC-1, SPON1 and MIA.

In particular embodiments, the level of a marker is compared to a reference. In one embodiment, the reference is the level of marker present in a control sample obtained from a patient that does not have a pancreatic cancer. In some examples of the disclosed methods, when the level of expression of a biomarker(s) is assessed, the level is compared with the level of expression of the biomarker(s) in a reference standard. By reference standard is meant the level of expression of a particular biomarker(s) from a sample or subject lacking a pancreatic cancer, at a selected stage of pancreatic cancer or other pancreatic condition (e.g., pancreatitis, intraductal papillary mucinous neoplasm (IPMN), early stage or late stage pancreatic ductal adenocarcinoma (PDAC)) or in the absence of a particular variable such as a therapeutic agent. Alternatively, the reference standard comprises a known amount of biomarker. Such a known amount correlates with an average level of subjects lacking a cancer, at a selected stage of pancreatic cancer or pancreatic condition, or in the absence of a particular variable such as a therapeutic agent. A reference standard also includes the expression level of one or more biomarkers from one or more selected samples or subjects as described herein. For example, a reference standard includes an assessment of the expression level of one or more biomarkers in a sample from a subject that does not have a pancreatic cancer, is at a selected stage of progression of a pancreatic cancer, or has not received treatment for a pancreatic cancer. Another exemplary reference standard includes an assessment of the expression level of one or more biomarkers in samples taken from multiple subjects that do not have a pancreatic cancer, are at a selected stage of progression of a pancreatic cancer (e.g., pancreatitis, intraductal papillary mucinous neoplasm (IPMN), early stage or late stage pancreatic ductal adenocarcinoma (PDAC)), or have not received treatment for pancreatic cancer.

In one embodiment, the invention provides a method of monitoring treatment progress. The method includes the step of determining a level of diagnostic marker ("Marker") (e.g., CA19-9, MIA, MIC-1, CEACAM-1, OPN, SPON1, HSP27, POSTN, LGALS3BP) or diagnostic measurement (e.g., screen, assay) in a subject suffering from or susceptible to a disorder or symptoms thereof associated with pancreatic cancer, in which the subject has been administered a therapeutic amount of a compound herein sufficient to treat the disease or symptoms thereof. The level of Marker determined in the method can be compared to known levels of Marker in either healthy normal controls or in other afflicted patients to establish the subject's disease status. In some embodiments, a second level of Marker in the subject is determined at a time point later than the determination of the first level, and the two levels are compared to monitor the course of disease or the efficacy of the therapy. In certain preferred embodiments, a pre-treatment level of Marker in the subject is determined prior to beginning treatment according to this invention; this pre-treatment level of Marker can then be compared to the level of Marker in the subject after the treatment commences, to determine the efficacy of the treatment.

Kits

The invention provides kits for detecting a pancreatic cancer in a subject and/or characterizing a pancreatic cancer status in a subject. A diagnostic kit of the invention provides a reagent (e.g., an antibody or antigen binding fragment thereof that selectively bind a marker of the invention) for measuring relative expression of a marker (e.g., CA19-9, MIA, MIC-1, CEACAM-1, OPN, SPON1, HSP27, POSTN, LGALS3BP). In other embodiments, the kit further includes reagents suitable for CA19-9, MIA, MIC-1, CEACAM-1, OPN, SPON1, HSP27, POSTN, or LGALS3BP immunoassay.

In one embodiment, the kit includes a diagnostic composition comprising a capture reagent detecting a CA19-9 polysaccharide and a capture reagent detecting at least one marker selected from the group consisting of a MIA polynucleotide or polypeptide, a MIC-1 polynucleotide or polypeptide, a CEACAM-1 polynucleotide or polypeptide, a OPN polynucleotide or polypeptide, a SPON1 polynucleotide or polypeptide, a HSP27 polynucleotide or polypeptide, a POSTN polynucleotide or polypeptide, and a LGALS3BP polynucleotide or polypeptide. In one embodiment, the capture reagent detecting a CA19-9 polysaccharide is an anti-CA19-9 antibody or an antigen-binding fragment thereof. In one embodiment, the capture reagents are fixed to a substrate. In one embodiment, the substrate is a magnetic bead. In one embodiment, the kit includes a diagnostic composition comprising an anti-CA19-9 antibody or an antigen-binding fragment thereof and at least one antibody or antigen-binding fragment thereof selected from: an anti-MIC-1 antibody, an anti-CEACAM-1 antibody, an anti-MIA antibody, and an anti-SPON1 antibody. In one embodiment, the kit includes a diagnostic composition comprising an anti-CA19-9 antibody or an antigen-binding fragment thereof, an anti-HSP27 antibody or an antigen-binding fragment thereof, and an anti-MIA antibody or an antigen-binding fragment thereof. In one embodiment, the kit includes a diagnostic composition comprising an anti-CA19-9 antibody or an antigen-binding fragment thereof, an anti-CEACAM-1 antibody or an antigen-binding fragment thereof, an anti-MIC-1 antibody or an antigen-binding fragment thereof, an anti-SPON1 antibody or an antigen-binding fragment thereof, and an anti-MIA antibody or an antigen-binding fragment thereof.

The kits may be in combination with a therapeutic composition comprising an chemotherapeutic agent suitable for treating pancreatic cancer. In one embodiment, the kit includes a diagnostic composition and a therapeutic composition comprising a chemotherapeutic agent.

In some embodiments, the kit comprises a sterile container which contains a therapeutic composition; such containers can be boxes, ampoules, bottles, vials, tubes, bags, pouches, blister-packs, or other suitable container forms known in the art. Such containers can be made of plastic, glass, laminated paper, metal foil, or other materials suitable for holding medicaments.

If desired, the kit further comprises instructions for administering the therapeutic combinations of the invention. In particular embodiments, the instructions include at least one of the following: description of the therapeutic agent; dosage schedule and administration for enhancing anti-tumor activity; precautions; warnings; indications; counter-indications; over dosage information; adverse reactions; animal pharmacology; clinical studies; and/or references. The instructions may be printed directly on the container (when present), or as a label applied to the container, or as a separate sheet, pamphlet, card, or folder supplied in or with the container.

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", second edition (Sambrook, 1989); "Oligonucleotide Synthesis" (Gait, 1984); "Animal Cell Culture" (Freshney, 1987); "Methods in Enzymology" "Handbook of Experimental Immunology" (Weir, 1996); "Gene Transfer Vectors for Mammalian Cells" (Miller and Calos, 1987); "Current Protocols in Molecular Biology" (Ausubel, 1987); "PCR: The Polymerase Chain Reaction", (Mullis, 1994); "Current Protocols in Immunology" (Coligan, 1991). These techniques are applicable to the production of the polynucleotides and polypeptides of the invention, and, as such, may be considered in making and practicing the invention. Particularly useful techniques for particular embodiments will be discussed in the sections that follow.

The following examples are put forth so as to provide those of ordinary skill in the art with a complete disclosure and description of how to make and use the assay, screening, and therapeutic methods of the invention, and are not intended to limit the scope of what the inventors regard as their invention.

EXAMPLES/METHODS

Example 1: Development of Magnetic Bead-based Multiplex Immunoassay Comprising a Three Marker Panel of CA19-9, HSP27, and MIA to Evaluate Serum Biomarkers for the Early Detection of Pancreatic Cancer Pancreatic cancer is the 4th leading cause of cancer death in the United States. The majority of patients present with unresectable disease leading a median survival of 6 months and an overall 5-year survival of <5%. The early detection of this disease is critical because surgery at an early stage is the most promising therapy that could greatly improve the prognosis of patients. The current existing serum markers such as CA19-9 lack the necessary sensitivity and specificity. Multiplex immunoassay simultaneously measuring multiple analytes in the same sample using minimum volume allows evaluation of serum biomarker panels that can potentially complement CA19-9 in early detection of pancreatic cancer. The study described herein is aimed at developing magnetic bead-based multiplex immunoassays to evaluate serum biomarkers for the early detection of pancreatic cancer.

Curated results from PUBMED database search using a combination of terms "pancreatic cancer, pancreatic neoplasm, PANIN, pancreatic adenocarcinoma, sensitivity, and fold change" were analyzed. Candidate biomarkers were selected using a weighted scoring system based on 1) fold changes and number of publications, or 2) sensitivity/specificity and study sample sizes. Magnetic bead-based multiplex immunoassays were developed for the selected candidate serum biomarkers using a Bio-Plex 200 suspension array system (Bio-Rad). Briefly, monoplex assays of individual candidates were first developed, cross-reactivity checked, and multiplex assays validated and optimized. All of these proteins plus HE4 (Roche) and CA19-9 (Tosoh) were analyzed in sera of patients diagnosed with pancreatic ductal adenocarcinoma (PDAC: IB/IIA/IIB, n=10; IV, n=10), benign pancreatic conditions including intraductal papillary mucinous neoplasm (IPMN, n=10) and chronic pancreatitis (n=10), and healthy controls (n=19). The performances of these candidate markers were evaluated individually or in combination on their capacity to complement CA19-9 in early detection of pancreatic cancer.

The biomarkers evaluated included 1) a 5-plex assay of OPN, CEACAM-1, MIC-1, MIA, and SPON1; 2) a 2-plex assay of POSTN and HSP27; and 3) a monoplex assay of LGALS3BP. These assays were all in-house developed with negligible crossreactivity, recovery of 75-119%, and intra-assay or inter-assay precision of 0.3-9.6% or 0-18%, respectively. LOD or LLOQ was 0.179 ng/mL or 0.181 ng/ml (OPN), 0.101 ng/mL or 0.213 ng/ml (CEACAM-1), 0.001 ng/ml or 0.046 ng/mL (MIC-1), 0.009 ng/mL or 0.016 ng/ml (MIA), 0.041 ng/ml or 0.191 ng/ml (SPON1), 0.094 ng/mL or 0.767 ng/ml (POSTN), 0.005 ng/ml or 0.062 ng/ml (HSP27), and 0.035 ng/ml or 0.289 ng/ml (LGALS3BP). Individually, the best biomarkers (AUC in ROC analysis, 95% CI) to separate PDAC from benign pancreatic conditions were CA19-9 (0.9425, [0.85-1.00]), CEACAM (0.845, [0.71-0.98]), MIC (0.79, [0.65-0.93]), and SPON1 (0.68, [0.51-0.85]). However, stepwise backward logistic regression selected a three marker panel of CA19-9, HSP27, and MIA (p-values: <3E-9, <0.03, <0.01, respectively) with an AUC=0.99 [0.97-1.00]. Probably due to the small sample size, the improvement over CA19-9 alone is not statistically significantly.

The multiplex immunoassay workflow provides sufficient analytical performance to evaluate serum biomarker panels that complement CA19-9 in early detection of pancreatic cancer.

Figure 1B:
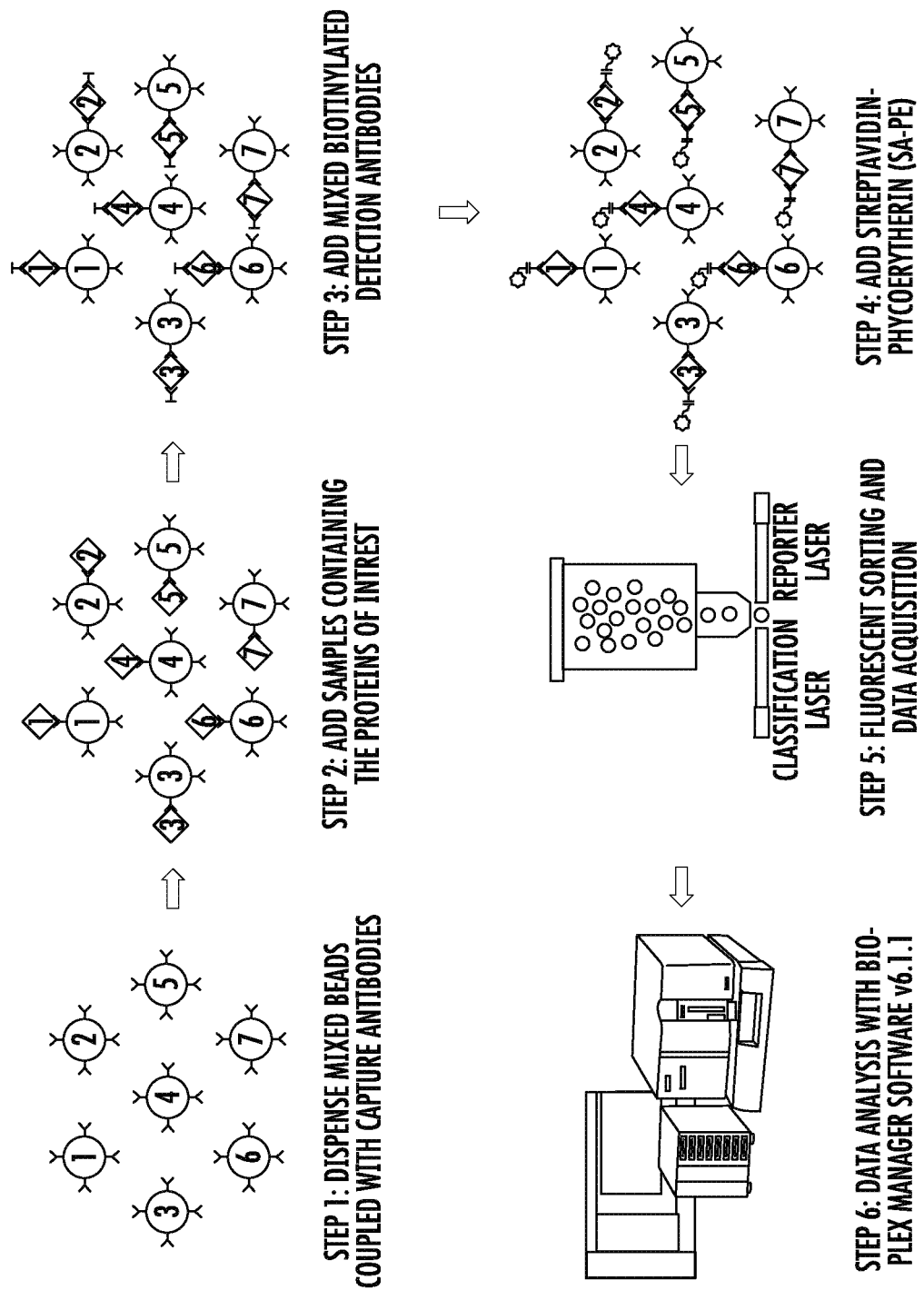
Figure 3A:
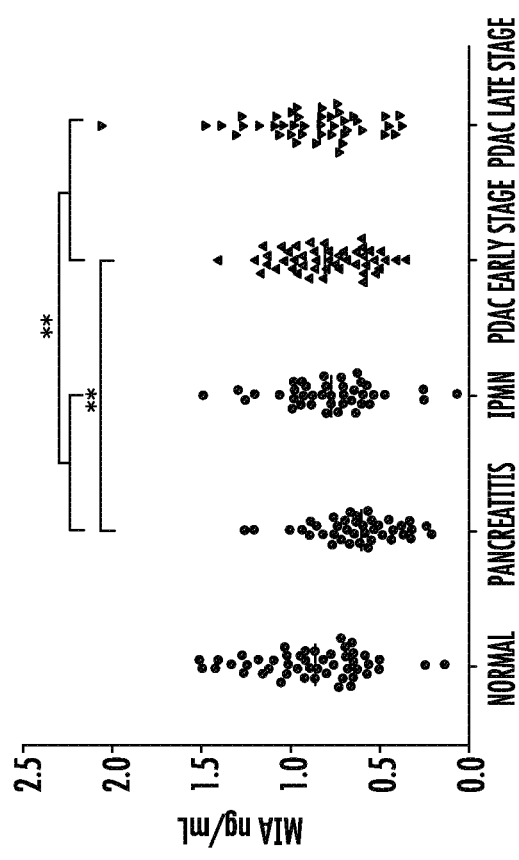
Figure 3B:
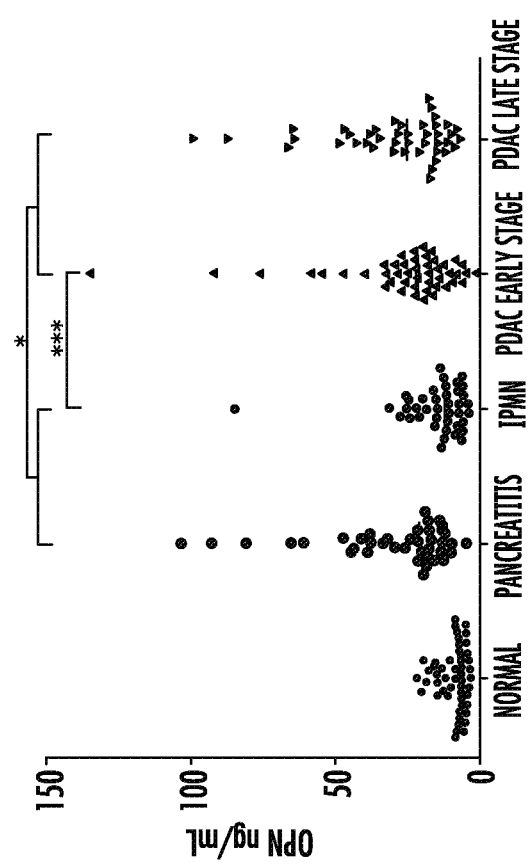
Figure 3C:
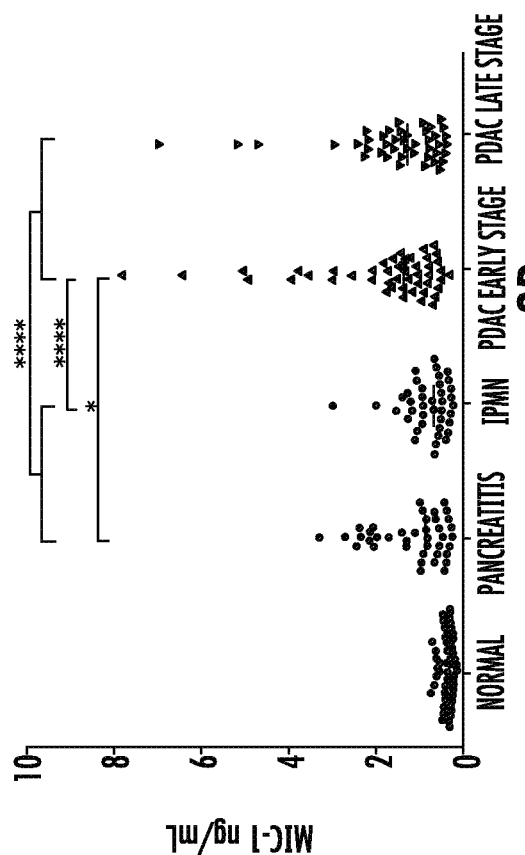
Figure 3D:
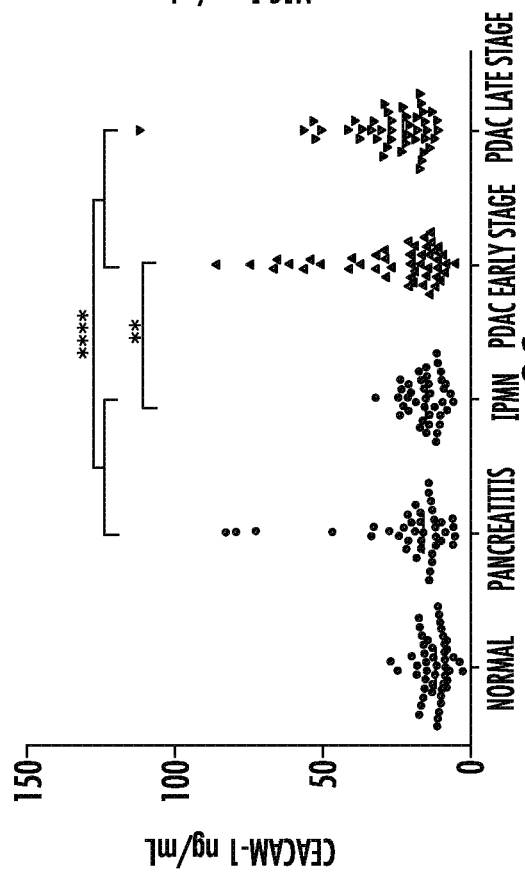

Example 2: Development of Magnetic Bead-Based Multiplex Immunoassay Comprising a Five Marker Panel of CA19-9, MIA, SPON1, MIC-1 and CEACAM-1 to Evaluate Serum Biomarkers for the Early Detection of Pancreatic Cancer Curated results from PUBMED database search using a combination of terms "pancreatic cancer, pancreatic neoplasm, PANIN, pancreatic adenocarcinoma, sensitivity, and fold change" were analyzed. Candidate biomarkers were selected using a weighted scoring system based on 1) fold changes and number of publications, or 2) sensitivity/specificity and study sample sizes. Magnetic bead-based multiplex immunoassays were developed for the selected candidate serum biomarkers using a Bio-Plex 200 suspension array system (Bio-Rad). Briefly, monoplex assays of individual candidates were first developed, cross-reactivity checked, and multiplex assays validated and optimized (FIG. 1). All of these proteins plus CA19-9 (Tosoh) were analyzed in sera of patients diagnosed with pancreatic ductal adenocarcinoma (PDAC: IA/IB/IIA/IIB, 11/13/10/13; III/IV, 3/40), benign pancreatic conditions including intraductal papillary mucinous neoplasm (IPMN, 40) and chronic pancreatitis (40), and healthy controls (49). The performances of these candidate markers were evaluated individually or in combination on their capacity to complement CA19-9 in early detection of pancreatic cancer.

Figure 4A:
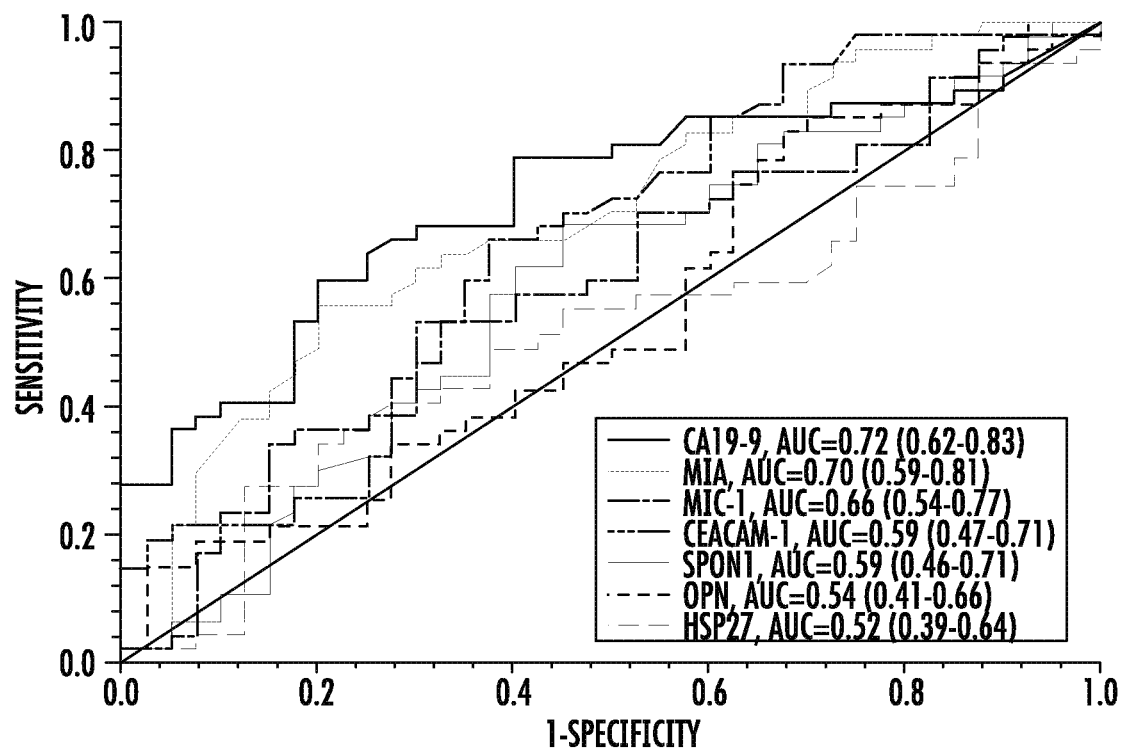
FIGS. 4A-4D are plots showing diagnostic performances of CA19-9, OPN, MIA, CEACAM-1, MIC-1, SPON1 and HSP27 as individual markers (FIGS. 4A and 4C) and their complementary (FIGS. 4B and 4D) in differentiating patients with pancreatic ductal adenocarcinoma (PDAC) early stage versus pancreatitis (FIGS. 4A and 4B) or intraductal papillary mucinous neoplasm (IPMN) (FIGS. 4C and 4D). Receiver operating characteristic (ROC) curves with areas under the curve (AUCs) are presented along with their 95% confidence interval (CI) in brackets. Logistic regression modeling and ROC analysis selected a five-marker panel of CA19-9, CEACAM-1, MIC-1, SPON1 & MIA with an AUC=0.86 (0.79-0.94) for pancreatitis versus PDAC early stage or AUC=0.88 (0.81-0.95) for IPMN versus PDAC early stage, which significantly improved the individual biomarker performance (p value: 0.0094, 0.0003, 0.0018, 0.0001 & 0.0008 for pancreatitis versus PDAC early stage; and 0.0276, 0.0001, 0.0117, <0.0001 & <0.0001 for IPMN versus PDAC early stage; Delong test).
Figure 4B:
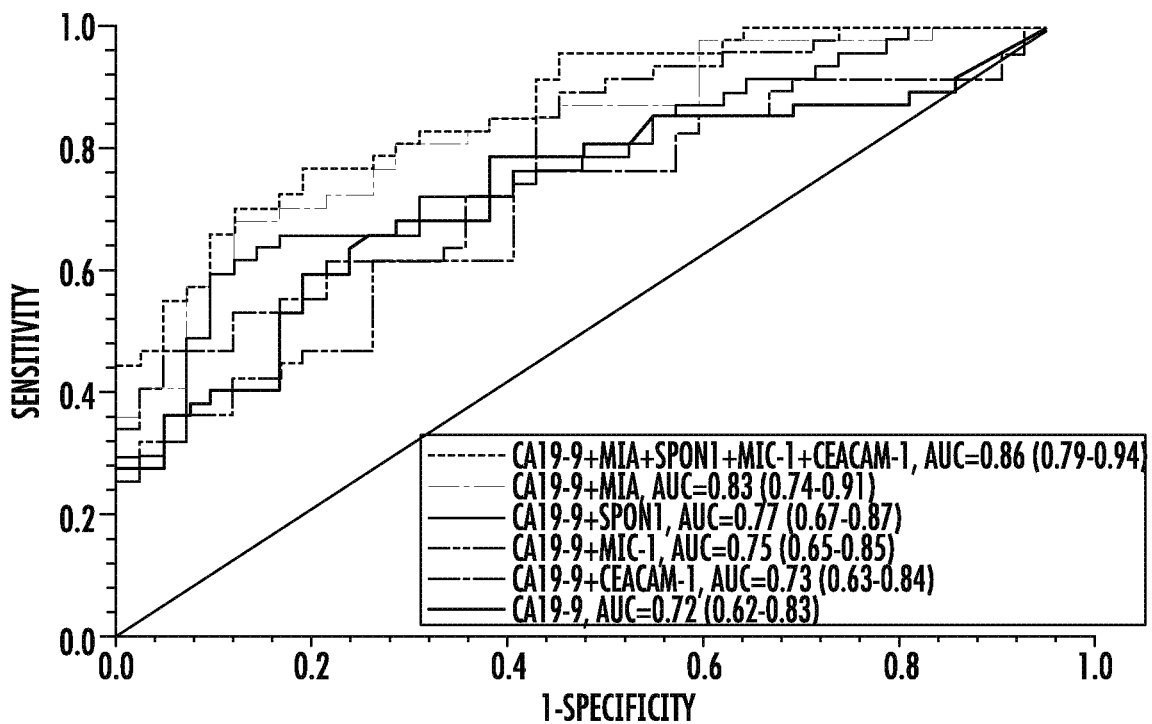
Figure 4C:
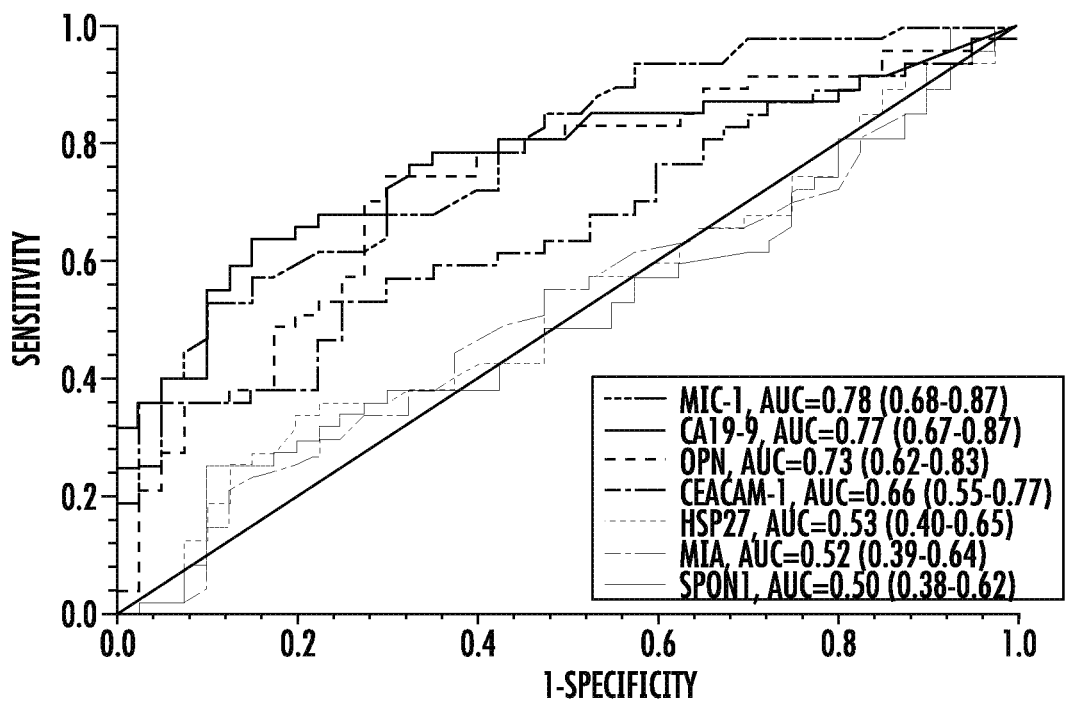
Figure 4D:
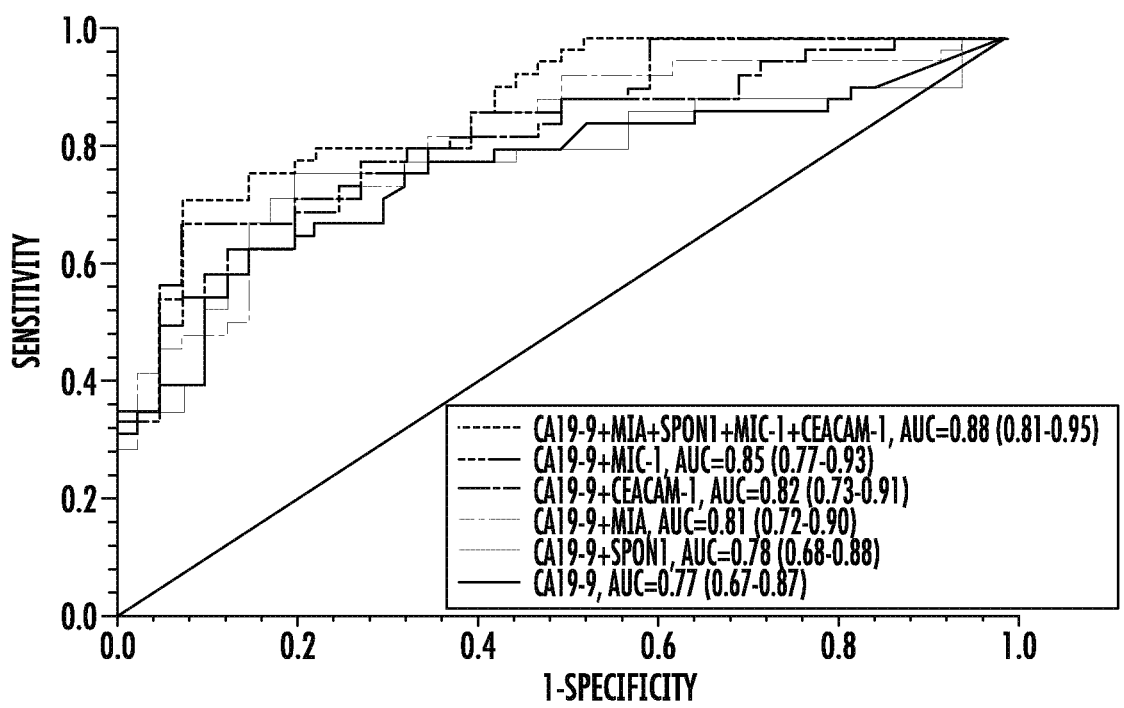
Figure 6A:
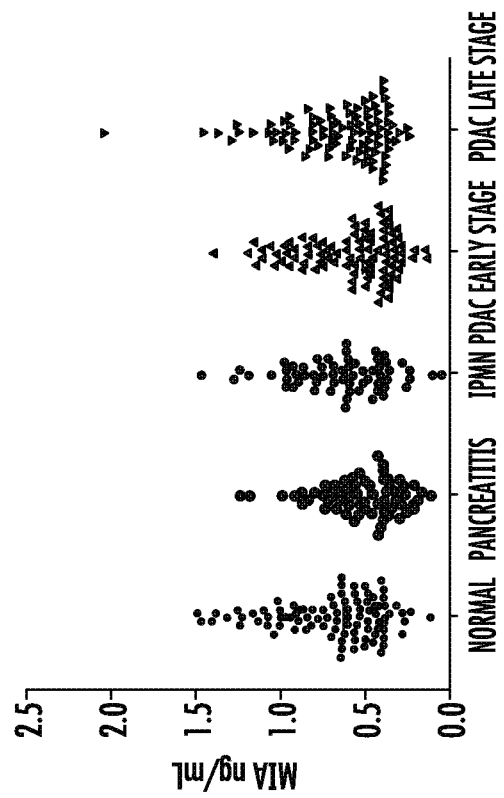
Figure 6B:
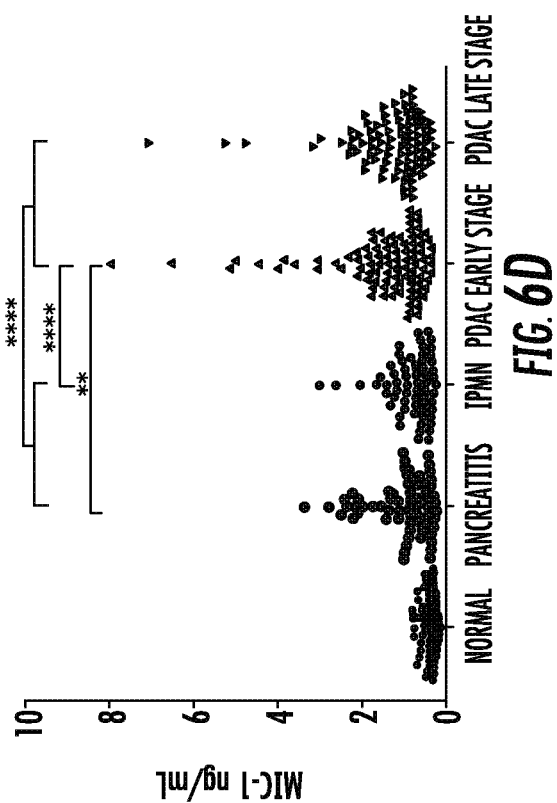
Figure 6C:
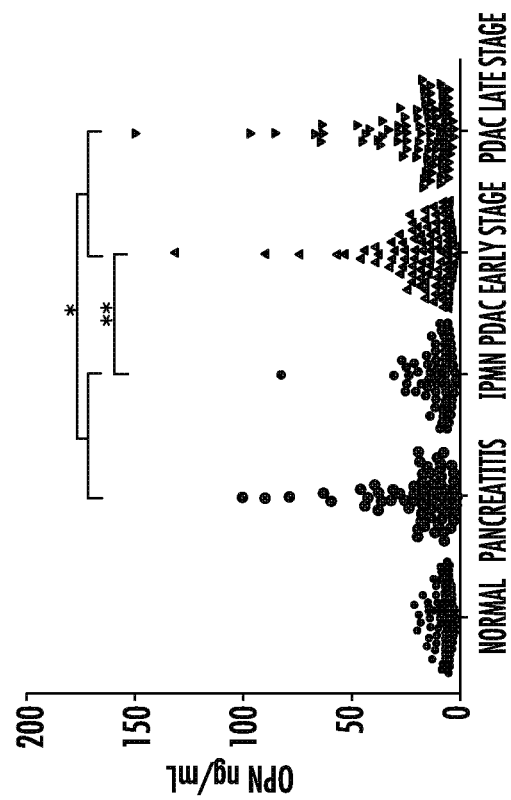
Figure 6D:
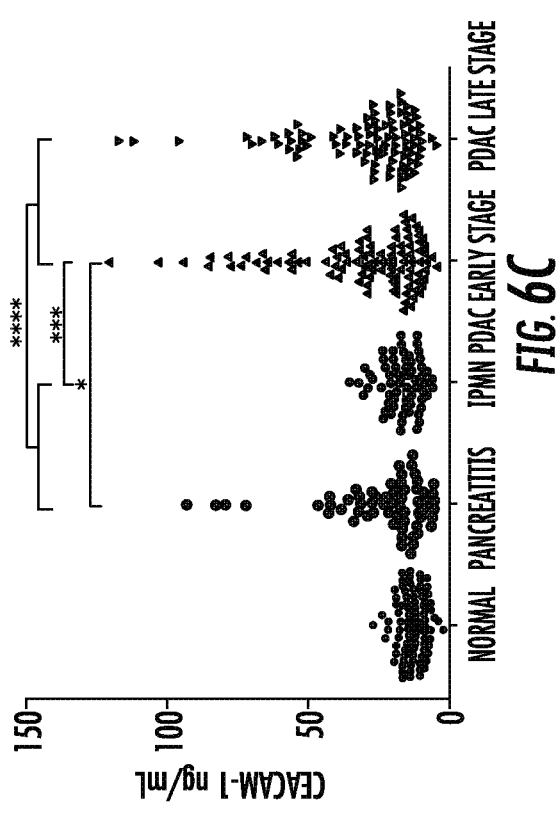
Figure 7A:
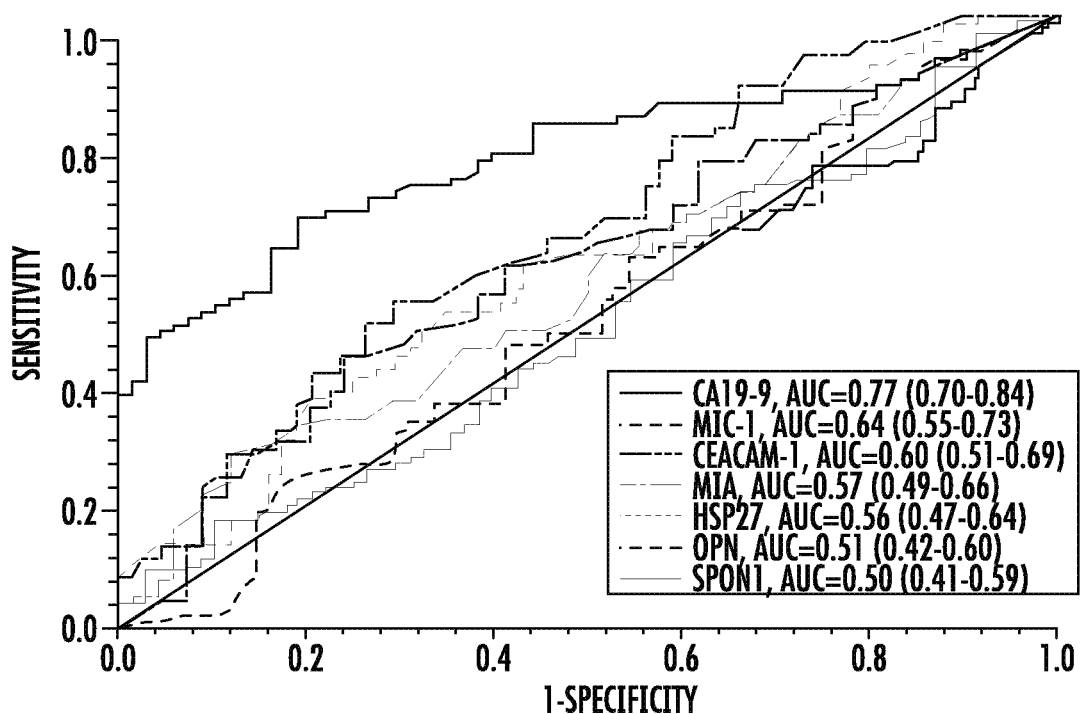
FIGS. 7A-7D are the diagnostic performances of individual or combination of serum biomarkers in detection of PDAC early stage. Diagnostic performances of CA19-9, OPN, MIA, CEACAM-1, MIC-1, SPON1 & HSP27 as individual markers (A&C) and their complementary (B&D) in differentiating patients with PDAC early stage versus pancreatitis (A&B) or IPMN (C&D). ROC curves with AUCs are presented along with their 95% CI in brackets. Logistic regression modeling and ROC analysis selected a five-marker panel of CA19-9, MIC-1, CEACAM-1, MIA & OPN with an AUC=0.84 (0.78-0.90) for pancreatitis versus PDAC early stage or AUC-0.86 (0.80-0.91) for IPMN versus PDAC early stage, which significantly improved the individual biomarker performance.
Figure 7B:
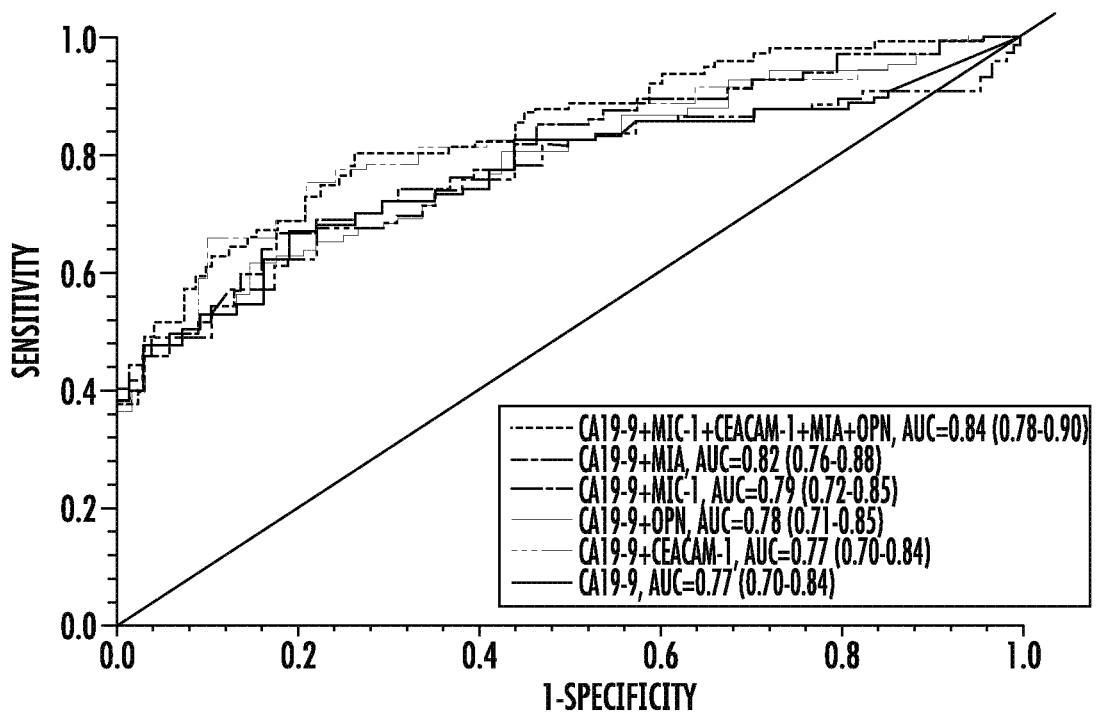
Figure 7C:
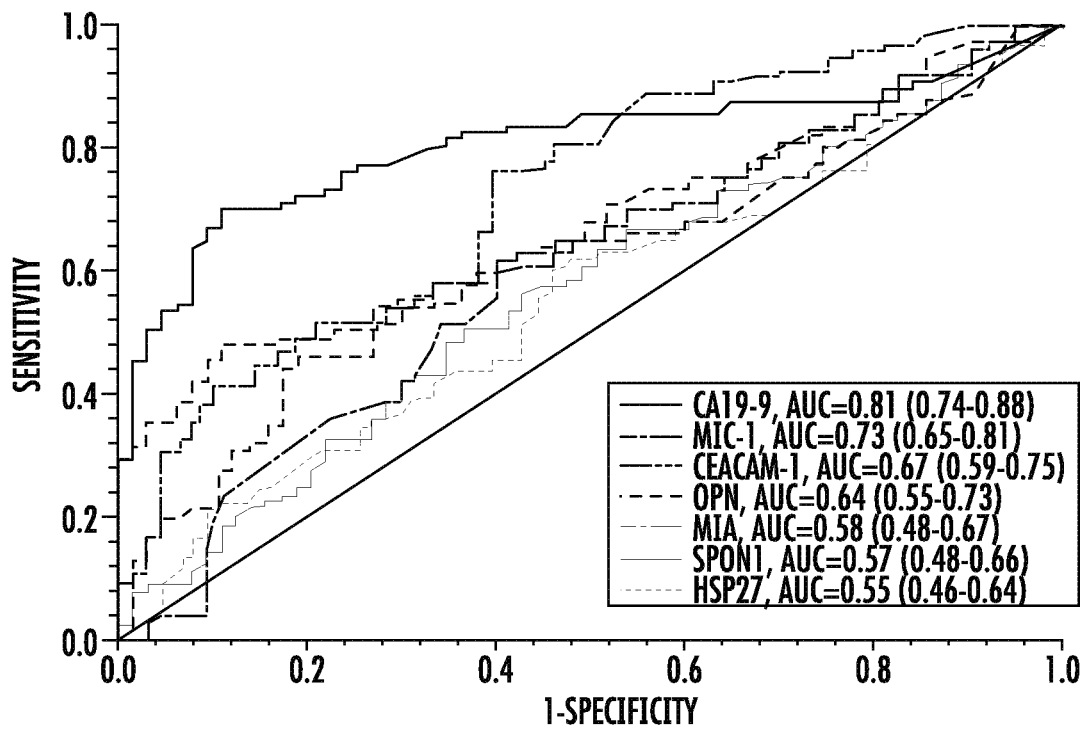
Figure 7D:
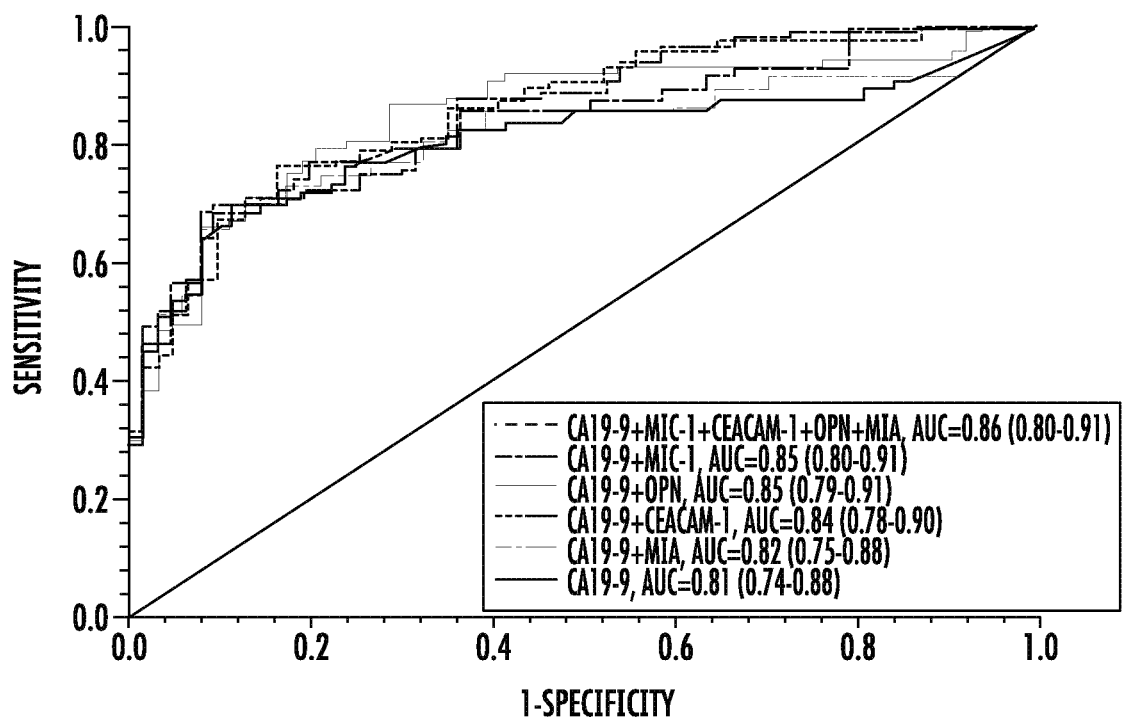

A 6-plex immunoassay of OPN, MIA, CEACAM-1, MIC-1, SPON1, and HSP27 was in-house developed with negligible cross-reactivity, recovery of 89-101%, and intra-assay or inter-assay precision of 3.5-11.6% or 6.1-17.3% for calibrators, respectively (Table 6). LOD or LLOQ was 0.053 ng/ml or 0.156 ng/ml (OPN), 0.054 ng/mL or 0.141 ng/ml (CEACAM-1), 0.002 ng/ml or 0.012 ng/ml (MIC-1), 0.002 ng/mL or 0.007 ng/ml (MIA), 0.011 ng/ml or 0.058 ng/mL (SPON1), and 0.004 ng/mL or 0.012 ng/ml (HSP27) (Table 3). The 6-plex assay demonstrated wide dynamic ranges for the target measurements, and was significant correlated with their respective monoplex assays (p<0.05) and/or commercial ELISAs (p<0.01) (FIGS. 2A-2F; FIGS. 3A-3G). Individually, the best biomarkers (AUC in ROC analysis, 95% CI) to separate PDAC early stage from pancreatitis or IPMN based on the ROC analysis were CA19-9 (0.72, [0.62-0.83]), MIA (0.70, [0.59-0.81]), MIC-1 (0.66, [0.54-0.77]) & CEACAM-1 (0.59, [0.47-0.71]) or MIC-1 (0.78, [0.68-0.87]), CA19-9 (0.77, [0.67-0.87]), OPN (0.73, [0.62-0.83]) & CEACAM-1 (0.66, [0.55-0.77]), respectively (FIGS. 4A and 4C). However, logistic regression modeling and ROC analysis selected a five-marker panel of CA19-9, CEACAM-1, MIC-1, SPON1 & MIA with an AUC-0.86 (0.79-0.94) for pancreatitis versus PDAC early stage or AUC=0.88 (0.81-0.95) for IPMN versus PDAC early stage, which significantly improved the individual biomarker performance (p value: 0.0094, 0.0003, 0.0018, 0.0001 & 0.0008 for pancreatitis versus PDAC early stage; and 0.0276, 0.0001, 0.0117, <0.0001 & <0.0001 for IPMN versus PDAC early stage; Delong test) (FIGS. 4B and 4D).

The multiplex immunoassay workflow provides sufficient analytical performance to evaluate serum biomarker panels that complement CA19-9 in early detection of pancreatic cancer. The biomarker panels identified in this study warrant further validation with a larger number of patient samples.

Patient Specimens

A total of 409 archived serum samples obtained from 189 patients with histologically diagnosed pancreatic ductal adenocarcinoma (PDAC) [mean (SD) age, 65 (10) years; M/F, 81/108] from January 2007 to October 2015, 131 patients with benign pancreatic conditions [57 (15) years; 71/60] from February 2007 to October 2015, and 89 healthy controls without a history of pancreatic diseases [35 (14) years; 45/44] from either April 2013 or August 2015 were collected at the Johns Hopkins Medical Institutions (JHMI) with institutional approval. Among 189 patients with PDAC, there are 97 early stage [IA/IB/IIA/IIB, 13/19/17/48; 65 (10) years; 34/63] and 92 late stage [III/IV, 19/73; 64 (10) years; 47/45] diseases. Among 131 patients with benign pancreatic conditions, there are 63 intraductal papillary mucinous neoplasm (IPMN) [64 (12) years; 24/39] and 68 chronic pancreatitis [51 (15) years; 47/21]. Detailed clinicopathologic characteristics of the study cohort, including diagnosis, age, sex and anatomic stage, were shown in Table 1. All serum samples were obtained before treatment and before surgery, and stored at −80° C. until analysis.

Reagents and Antibodies

All of the recombinant proteins and antibodies were purchased from R&D Systems (Minneapolis, MN)), except the detection antibody for SPON1 which was biotinylated in-house. Majority of the antibodies except those for OPN and SPON1 were from the DuoSet ELISA kits (R&D), which have been commercially tested as an appropriate pair of antibodies for the development of sandwich ELISAs to measure natural and recombinant human proteins in cell culture supernatants. Antibodies of OPN and SPONI were also compatible for the ELISA applications. Detailed information for the recombinant proteins and antibodies are shown in Table 4. Magnetic COOH beads, amine coupling kits, and Bio-Plex Pro Reagent kits were purchased from Bio-Rad Laboratories (Hercules, CA). NHS and Sulfo-NHS, EDC, EZ-Link™ Sulfo-NHS-Biotin, and Zeba™ Spin Desalting Columns were purchased from Thermo Scientific (Rockford, IL). Human serum CA19-9 level was measured using a commercial kit from Tosoh Bioscience LLC (King of Prussia, PA). The human osteopontin ELISA kit (ABIN414433) and human heat shock protein 27 ELISA kit (ab113334) were purchased from Antibodies-Online (Atlanta, GA) or Abcam (Cambridge, MA), respectively.

Conjugation of Antibodies to Microspheres

The capture antibodies for OPN, MIA, CEACAM-1, MIC-1, SPON1 and HSP27 were respectively coupled to magnetic beads of different regions using the Bio-Rad amine coupling kit according to the manufacturer's instructions. The use of differentially detectable beads of the different regions enables the simultaneous identification and quantification of multiple analytes in the same sample and the individual immunoassays therefore could be multiplexed. The optimal amounts of capture antibodies for one coupling reaction were used at either 6 µg for OPN, MIA, CEACAM-1, MIC-1 and HSP27 or 9 µg for SPON1, after the titration. The coupled beads were counted using a Coulter Z2 counter, validated using biotinylated rabbit anti-mouse (B8520) or rabbit anti-goat (B7014) IgG antibodies (Sigma-Aldrich, St. Louis, MO), and stored in storage buffer at 4° C. in the dark.

Multiplex Immunoassay

The magnetic bead-based multiplex immunoassay was developed for the selected candidate serum biomarkers using a Bio-Plex 200 suspension array system (Bio-Rad, Hercules, CA). The general workflow of multiplex immunoassay is shown in FIG. 1. The monoplex immunoassays of individual candidates were first developed using the Bio-Plex Pro Reagent kit. Briefly, 2500 coupled beads were incubated with 50 µl of a sample diluted in sample diluent for 1 hour. The beads were washed and incubated with 25 µl of the detection antibody diluted in the detection antibody diluent for 30 minutes. The beads were then washed again and incubated with 50 µl of 2 µg/mL streptavidin-phycoerytherin (SA-PE) diluted in the assay buffer for 10 minutes. The beads were finally washed and suspended in 125 µl of the assay buffer for the analysis by the Bio-Plex 200 system. All assays were carried out at room temperature and protected from light. All washing steps were performed with the washing buffer with an automated plate washer (Bio-Plex Pro™ II wash station, Bio-Rad). The calibration curves were established using 9 calibrators in 2-fold dilution series and used to determine the protein concentrations. Two pooled normal human sera (one from JHMI Biomarker Reference laboratory of the National Cancer Institute's Early Detection Research Network and the other S7023 from Sigma-Aldrich) were used for the optimization of the assay conditions.

Before multiplexing the individual assays, assay specificity was examined by performing single-detection and multiplexed-detection antibody cross-reactivity studies to detect the fluorescence signals in response to high concentrations of the recombinant proteins at the first dilution point of the standard curve (except SPONI at the third dilution). The single detection antibody study was conducted by testing an individual detection antibody in the presence of multiplexed capture beads and a single antigen, which evaluates the specificity of a capture antibody. The multiplexed-detection antibody study was conducted by testing multiplexed detection antibodies in the presence of multiplexed capture beads and a single antigen, which evaluates the specificity of a detection antibody and to some degree the specificity of the capture antibody. Cross-reactivity was defined as the percentage of nonspecific cross-reacting signal detected relative to the specific signal for that analyte.

For the multiplex immunoassay, the capture beads and the detection antibodies were prepared by mixing the 2500 coupled beads and the detection antibodies used in the monoplex assays. The final concentrations of the detection antibodies in the multiplex assay were used at 0.4 µg/mL for OPN and CEACAM-1 or 2 µg/mL for SPON1 or 0.2 µg/mL for MIA and HSP27 or 0.0125 µg/mL for MIC-1, respectively, after the titration. The calibration curve was established using 9 calibrators in 2-fold dilution series derived from a mixture of the highest standard points of 7 recombinant proteins. The highest standards of 7 recombinant proteins in the multiplex assay were used at 40, 1.5, 20, 3, 15 and 3 ng/ml for OPN, MIA, CEACAM-1, MIC-1, SPON1 and HSP27, respectively. To assess the correlations of the developed immunoassays in protein quantifications, the multiplex immunoassays were compared to the monoplex immunoassays by measuring 4 dilutions of individual recombinant proteins based on their respective calibration curves. The correlations of the developed multiplex immunoassays and commercial ELISA kits in serum OPN or HSP27 protein quantifications were also determined in 7 or 13 patient sera, respectively. The multiplex immunoassay was carried out using the Bio-Plex Pro Reagent kit in the same procedures as those in the monoplex assays described above. The serum samples were 4-fold diluted in the sample diluent in the multiplex immunoassay. Two quality controls (QC) were prepared by diluting the mixture of the highest standards of 6 recombinant proteins at either 3-fold (QC1) or 30-fold (QC2). Two pooled human sera with the known CA19-9 measurements at either high or low levels were used as the calibrators. The multiplex immunoassay was performed in duplicate on 13×96-well Bio-Plex flat bottom plates with a calibration curve, 2 doses of QCs and 2 doses of calibrators in each plate. All samples were randomized with regard to their plate locations.

Data acquisition and primary data analysis were performed on the Bio-Plex 200 system in combination with Bio-Plex Manager Software version 6.1.1 by use of a 5-parametric (5-PL) nonlinear logistic regression curve fitting model (Bio-Rad). According to Bio-Rad Bio-Plex multiplex immunoassay handout (rad.com/en-us/applications-technologies/bio-plex-multiplex-immunoassays), in this study, the assay sensitivity (limit of black, LOB) was defined as the concentration of analyte corresponding to the median fluorescent intensity (MFI) of the background plus two standard deviations (SD) of the mean background MFI. The assay reproducibility was assessed in both intra-and inter-assay precisions. Intra-assay precision was calculated as the coefficient of variance (% CV) on the duplicates of two QCs or two calibrators on a single assay plate. Inter-assay precision was calculated as the % CV from 6 independent assays. The assay accuracy (recovery percentage) was calculated as the percentage of the observed concentration relative to the expected concentration of each standard point or QC. The assay working dynamic range was defined as the range between the lower limit of quantification (LLOQ) and the upper limit of quantification (ULOQ) in which an assay is both precise (intra-assay % CV≤10% and inter-assay % CV≤15%) and accurate (80-120% recovery).

Data Analysis

The nonparametric Mann-Whitney U test was used to compare serum biomarker levels between PDAC patients, benign pancreatic conditions and healthy controls, with a p-value less than 0.05 considered significant. Receiver operator characteristic (ROC) analysis was performed and the area under the curve (AUC) was calculated separately for each of 7 biomarkers and the combinations of biomarkers. Delong test was used to compare the AUCs. Pearson correlation coefficients were determined to assess correlation of the measurements between the multiplex and monoplex immunoassays or commercial ELISA kits. Logistic regression analysis (both backward stepwise and forward stepwise) was performed to select the panels of biomarkers with the highest performance. The Statistica 12 (StatSoft) and GraphPad Prism 6 (GraphPa Software) were used for statistical analysis.

TABLE 1

Clinicopathologic characteristics of the study cohort.

| Variables | Number (%) |
| --- | --- |
| Total | 409 |
| Healthy control | 89 (21.8) |

TABLE 1-continued

Clinicopathologic characteristics of the study cohort.

| Variables | Number (%) |
| --- | --- |
| Age (year) | |
| Mean ± SD | 35 ± 14 |
| Range | 21-67 |
| Gender | |
| Male | 45 (50.6) |
| Female | 44 (49.4) |
| Benign conditions | 131 (32) |
| Age (year) | |
| Mean ± SD | 57 ± 15 |
| Range | 13-89 |
| Gender | |
| Male | 71 (54.2) |
| Female | 60 (45.8) |
| Chronic pancreatitis | 68 (51.9) |
| IPMN | 63 (48.1) |
| PDAC | 189 (46.2) |
| Age (year) | |
| Mean ± SD | 65 ± 10 |
| Range | 30-92 |
| Gender | |
| Male | 81 (42.9) |
| Female | 108 (57.1) |
| Early stage | 97 (51.3) |
| IA/IB/IIA/IIB | 13/19/17/48 |
| Late stage | 92 (48.7) |
| III/IV | 19/73 |

NOTE:
IPMN, intraductal papillary mucinous neoplasm.

TABLE 2

Assay specificity of the 6-plex immunoassay. Percentage of cross-reactivity (single-detection/multiplexed-detection antibody) was calculated based on fluorescence signals detected in response to high concentrations of the recombinant proteins at the $1^{st}$ dilution point (at $3^{rd}$ for SPON1) of the standard curve in single-detection and multiplexed-detection antibody cross-reactivity studies (both with multiplexed beads and single antigen).

| Target | OPN | MIA | CEACAM-1 | MIC-1 | SPON1 | HSP27 |
| --- | --- | --- | --- | --- | --- | --- |
| OPN | | 0.0/0.0 | 0.0/0.0 | 0.0/0.0 | 0.0/0.0 | 0.0/0.0 |
| MIA | 0.3/0.1 | | 0.4/0.0 | 0.1/0.1 | 0.3/0.0 | 0.1/0.1 |
| CEACAM-1 | 0.0/0.3 | 0.2/0.0 | | 0.0/0.2 | 0.0/0.0 | 0.0/0.0 |
| MIC-1 | 0.0/0.0 | 0.0/0.0 | 0.0/0.0 | | 0.0/0.0 | 0.0/0.0 |
| SPON1 | 2.4/2.1 | 1.7/1.3 | 2.0/2.0 | 2.7/2.4 | | 3.3/3.3 |
| HSP27 | 0.1/0.1 | 0.2/0.1 | 0.2/0.1 | 0.2/0.1 | 0.7/0.7 | |

TABLE 3

Analytical performance of the 6-plex immunoassay. QC1, high control. QC2, low control. LOD, limit of detection. LLOQ, lower limit of quantitation. ULOQ, upper limit of quantification. The correlation of 6-plex vs monoplex was examined on 4 doses of individual recombinant proteins. The correlation of 6-plex vs the commercial ELISA kit was examined on 7 (OPN) or 13 (HSP27) patient sera.

| | Mean (pg/mL) | | Intra-assay Precision (% CV) | | Inter-assay Precision (% CV) | | LOD (pg/mL) | LLOQ (pg/mL) | ULOQ (pg/mL) | Replicates* (% CV) | 6-plex vs Monoplex, Pearson R/p value | 6-plex vs ELISA, Pearson R/p value |
| --- | --- | --- | --- | --- | --- | --- | --- | --- | --- | --- | --- | --- |
| | QC1 | QC2 | QC1 | QC2 | QC1 | QC2 | | | | | | |
| OPN | 13448.3 | 1228.3 | 2.1 | 5.1 | 3.7 | 4.2 | 52.5 | 155.7 | 34728.7 | 3.4 | 0.9987/0.0013 | 0.8945/0.0066 |
| MIA | 481.7 | 48.3 | 8.6 | 10.0 | 4.4 | 8.4 | 2.3 | 6.7 | 1541.1 | 9.2 | 0.9888/0.0112 | ND** |
| CEACAM-1 | 6141.7 | 658.3 | 9.3 | 6.6 | 8.6 | 16.3 | 53.7 | 140.7 | 20118.4 | 7.5 | 0.9715/0.0285 | ND |

TABLE 3-continued

Analytical performance of the 6-plex immunoassay. QC1, high control. QC2, low control. LOD, limit of detection. LLOQ, lower limit of quantitation. ULOQ, upper limit of quantification. The correlation of 6-plex vs monoplex was examined on 4 doses of individual recombinant proteins. The correlation of 6-plex vs the commercial ELISA kit was examined on 7 (OPN) or 13 (HSP27) patient sera.

|  | Mean (pg/mL) | | Intra-assay Precision (% CV) | | Inter-assay Precision (% CV) | | LOD (pg/mL) | LLOQ (pg/mL) | ULOQ (pg/mL) | Replicates* (% CV) | 6-plex vs Monoplex, Pearson R/p value | 6-plex vs ELISA, Pearson R/p value |
| --- | --- | --- | --- | --- | --- | --- | --- | --- | --- | --- | --- | --- |
|  | QC1 | QC2 | QC1 | QC2 | QC1 | QC2 |  |  |  |  |  |  |
| MIC-1 | 963.3 | 93.3 | 8.1 | 10.3 | 21.5 | 18.8 | 1.5 | 11.6 | 2327.0 | 5.1 | 0.9996/0.0004 | ND |
| SPON1 | 4746.7 | 473.3 | 4.3 | 2.7 | 5.0 | 6.8 | 10.7 | 58.1 | 15032.7 | 6.3 | 0.9675/0.0325 | ND |
| HSP27 | 933.3 | 88.3 | 15.4 | 12.6 | 14.5 | 13.2 | 4.4 | 11.7 | 3000.6 | 9.0 | 0.9997/0.0003 | 0.9254/<0.00001 |

*mean of % CV for replicates in all samples for each protein.
**ND, not determined.

TABLE 4

6-plex immunoassay recombinant proteins and antibodies.

| Target | Recombinant Protein Cat. # | Capture Antibody Cat. # | Capture Antibody Host | Detection Antibody Cat. # | Detection Antibody Host |
| --- | --- | --- | --- | --- | --- |
| OPN | 1433-OP-050 | MAB14332 | Mouse | BAF1433 | Goat |
| MIA | DY2050 | DY2050 | Mouse | DY2050 | Goat |
| CEACAM-1 | DY2244 | DY2244 | Mouse | DY2244 | Goat |
| MIC-1 | DY957 | DY957 | Mouse | DY957 | Goat |
| SPON1 | 3135-SP/CF | AF3135 | Goat | AF3135* | Goat |
| HSP27 | DY1580 | DY1580 | Goat | DY1580 | Rabbit |

NOTE:
*all of the recombinant proteins and antibodies were purchased from R&D Systems, except detection antibody of SPON1 was biotinylated in-house.

TABLE 5

Statistics of individual biomarkers in healthy controls, benign conditions and PDAC patients.
(NOTE: all biomarkers are at ng/ml, except CA19-9 at U/ml.

| Biomarker | Subgroup | Number | Min | Max | Median | Mean |
| --- | --- | --- | --- | --- | --- | --- |
| OPN | Healthy Control | 89 | 2.14 | 21.66 | 6.88 | 7.93 |
|  | Chronic Pancreatitis | 68 | 0.76 | 103.56 | 13.59 | 20.68 |
|  | IPMN | 63 | 2.28 | 84.75 | 8.51 | 12.05 |
|  | PDAC early stage | 97 | 2.03 | 135.26 | 14.19 | 18.99 |
|  | PDAC late stage | 92 | 2.31 | 154.05 | 14.53 | 21.48 |
| MIA | Healthy Control | 89 | 0.12 | 1.50 | 0.63 | 0.69 |
|  | Chronic Pancreatitis | 68 | 0.12 | 1.24 | 0.48 | 0.51 |
|  | IPMN | 62 | 0.05 | 1.48 | 0.62 | 0.64 |
|  | PDAC early stage | 97 | 0.14 | 1.40 | 0.51 | 0.59 |
|  | PDAC late stage | 92 | 0.24 | 2.05 | 0.58 | 0.66 |
| CEACAM-1 | Healthy Control | 89 | 2.33 | 26.86 | 12.66 | 13.01 |
|  | Chronic Pancreatitis | 68 | 5.15 | 93.21 | 16.83 | 22.88 |
|  | IPMN | 63 | 5.65 | 35.40 | 16.06 | 17.01 |
|  | PDAC early stage | 97 | 4.82 | 120.85 | 21.19 | 31.16 |
|  | PDAC late stage | 92 | 4.58 | 117.79 | 22.63 | 29.74 |
| MIC-1 | Healthy Control | 89 | 0.11 | 0.77 | 0.26 | 0.32 |
|  | Chronic Pancreatitis | 68 | 0.22 | 3.35 | 0.86 | 1.02 |
|  | IPMN | 63 | 0.25 | 3.01 | 0.69 | 0.83 |
|  | PDAC early stage | 96 | 0.35 | 7.93 | 1.14 | 1.51 |
|  | PDAC late stage | 92 | 0.20 | 7.05 | 1.01 | 1.30 |
| SPON1 | Healthy Control | 89 | 1.87 | 14.90 | 4.70 | 5.02 |
|  | Chronic Pancreatitis | 68 | 1.00 | 17.46 | 5.92 | 6.42 |
|  | IPMN | 63 | 0.60 | 21.82 | 5.15 | 5.87 |
|  | PDAC early stage | 97 | 1.95 | 42.76 | 5.81 | 7.24 |
|  | PDAC late stage | 92 | 2.09 | 21.14 | 5.85 | 6.46 |

TABLE 5-continued

Statistics of individual biomarkers in healthy controls, benign conditions and PDAC patients.
(NOTE: all biomarkers are at ng/ml, except CA19-9 at U/ml.

| Biomarker | Subgroup | Number | Min | Max | Median | Mean |
|---|---|---|---|---|---|---|
| HSP27 | Healthy Control | 89 | 0.22 | 4.20 | 0.86 | 1.16 |
|  | Chronic Pancreatitis | 68 | 0.22 | 4.83 | 0.97 | 1.26 |
|  | IPMN | 63 | 0.10 | 8.62 | 0.90 | 1.34 |
|  | PDAC early stage | 97 | 0.15 | 7.10 | 1.20 | 1.51 |
|  | PDAC late stage | 92 | 0.15 | 5.22 | 1.13 | 1.33 |
| CA19-9 | Healthy Control | 89 | 1.00 | 71.60 | 11.00 | 15.55 |
|  | Chronic Pancreatitis | 68 | 1.00 | 203.20 | 20.10 | 32.24 |
|  | IPMN | 63 | 1.00 | 386.90 | 16.80 | 26.85 |
|  | PDAC early stage | 97 | 1.00 | 27027.80 | 90.60 | 824.71 |
|  | PDAC late stage | 92 | 1.00 | 25110.70 | 354.75 | 1638.68 |

TABLE 6

Assay specificity of the 6-plex immunoassay. Percentage of cross-reactivity (single-detection/multiplexed-detection antibody) was calculated based on fluorescence signals detected in response to high concentrations of the recombinant proteins at the 1$^{st}$ dilution point (except SPON1 at 3$^{rd}$ because only 1.4% of sera with SPON1 exceed STD3) of the standard curve in single-detection and multiplexed-detection antibody cross-reactivity studies (both with multiplexed beads and single antigen).

| Target | OPN | MIA | CEACAM-1 | MIC-1 | SPON1 | HSP27 |
|---|---|---|---|---|---|---|
| OPN |  | 0.0/0.0 | 0.0/0.0 | 0.0/0.0 | 0.0/0.0 | 0.0/0.0 |
| MIA | 0.3/0.1 |  | 0.4/0.0 | 0.1/0.1 | 0.3/0.0 | 0.1/0.1 |
| CEACAM-1 | 0.0/0.3 | 0.2/0.0 |  | 0.0/0.2 | 0.0/0.0 | 0.0/0.0 |
| MIC-1 | 0.0/0.0 | 0.0/0.0 | 0.0/0.0 |  | 0.0/0.0 | 0.0/0.0 |
| SPON1 | 2.4/2.1 | 1.7/1.3 | 2.0/2.0 | 2.7/2.4 |  | 3.3/3.3 |
| HSP27 | 0.1/0.1 | 0.2/0.1 | 0.2/0.1 | 0.2/0.1 | 0.7/0.7 |  |

Other Embodiments

From the foregoing description, it will be apparent that variations and modifications may be made to the invention described herein to adopt it to various usages and conditions. Such embodiments are also within the scope of the following claims.

The recitation of a listing of elements in any definition of a variable herein includes definitions of that variable as any single element or combination (or subcombination) of listed elements. The recitation of an embodiment herein includes that embodiment as any single embodiment or in combination with any other embodiments or portions thereof.

All patents and publications mentioned in this specification are herein incorporated by reference to the same extent as if each independent patent and publication was specifically and individually indicated to be incorporated by reference.

What is claimed is:

1. A method of diagnosing and treating a subject having intraductal papillary mucinous neoplasm (IPMN), the method comprising:
   a) detecting in a blood or serum sample from a subject increased levels relative to a healthy subject of four or more markers selected from the group consisting of OPN, MIA, CEACAM-1, MIC-1, SPON1, HSP27, POSTN, and LGALS3BP, wherein the detected markers comprise at least MIA, HSP27, MIC1 and OPN, and
   b) determining the subject has intraductal papillary mucinous neoplasm (IPMN) based on the increased level of markers;
   c) treating the subject for intraductal papillary mucinous neoplasm (IPMN) which comprises surgery and optionally chemotherapy.

2. The method of claim 1, wherein the at least four markers include MIC-1, HSP27, OPN, CEACAM1 and MIA.

3. The method of claim 1, wherein the at least four markers include MIA, MIC-1, OPN, HSP27, SPON1, POSTN and LGALS3BP.

4. The method of claim 1, wherein the subject has an increased level of CA19-9 polysaccharide relative to a healthy subject.

5. The method of claim 1, wherein the subject is determined to have intraductal papillary mucinous neoplasm (IPMN) and not having pancreatic ductal adenocarcinoma (PDAC).

6. The method of claim 1, wherein treating the subject comprises surgery.

* * * * *

SEQUENCE LISTING

```
Sequence total quantity: 16
SEQ ID NO: 1            moltype = AA  length = 468
FEATURE                 Location/Qualifiers
source                  1..468
                        mol_type = protein
                        organism = Homo sapiens
SEQUENCE: 1
MGHLSAPLHR VRVPWQGLLL TASLLTFWNP PTTAQLTTES MPFNVAEGKE VLLLVHNLPQ    60
QLFGYSWYKG ERVDGNRQIV GYAIGTQQAT PGPANSGRET IYPNASLLIQ NVTQNDTGFY   120
TLQVIKSDLV NEEATGQFHV YPELPKPSIS SNNSNPVEDK DAVAFTCEPE TQDTTYLWWI   180
NNQSLPVSPR LQLSNGNRTL TLLSVTRNDT GPYECEIQNP VSANRSDPVT LNVTYGPDTP   240
TISPSDTYYR PGANLSLSCY AASNPPAQYS WLINGTFQQS TQELFIPNIT VNNSGSYTCH   300
ANNSVTGCNR TTVKTIIVTE LSPVVAKPQI KASKTTVTGD KDSVNLTCST NDTGISIRWF   360
FKNQSLPSSE RMKLSQGNTT LSINPVKRED AGTYWCEVFN PISKNQSDPI MLNVNYNALP   420
QENGLSPGAI AGIVIGVVAL VALIAVALAC FLHFGKTGRT TPMTHLTR                468

SEQ ID NO: 2            moltype = AA  length = 205
FEATURE                 Location/Qualifiers
source                  1..205
                        mol_type = protein
                        organism = Homo sapiens
SEQUENCE: 2
MTERRVPFSL LRGPSWDPFR DWYPHSRLFD QAFGLPRLPE EWSQWLGGSS WPGYVRPLPP    60
AAIESPAVAA PAYSRALSRQ LSSGVSEIRH TADRWRVSLD VNHFAPDELT VKTKDGVVEI   120
TGKHEERQDE HGYISRCFTR KYTLPPGVDP TQVSSSLSPE GTLTVEAPMP KLATQSNEIT   180
IPVTFESRAQ LGGPEAAKSD ETAAK                                         205

SEQ ID NO: 3            moltype = AA  length = 585
FEATURE                 Location/Qualifiers
source                  1..585
                        mol_type = protein
```

```
                                organism = Homo sapiens
SEQUENCE: 3
MTPPRLFWVW LLVAGTQGVN DGDMRLADGG ATNQGRVEIF YRGQWGTVCD NLWDLTDASV    60
VCRALGFENA TQALGRAAFG QGSGPIMLDE VQCTGTEASL ADCKSLGWLK SNCRHERDAG   120
VVCTNETRST HTLDLSRELS EALGQIFDSQ RGCDLSISVN VQGEDALGFC GHTVILTANL   180
EAQALWKEPG SNVTMSVDAE CVPMVRDLLR YFYSRRIDIT LSSVKCFHKL ASAYGARQLQ   240
GYCASLFAIL LPQDPSFQMP LDLYAYAVAT GDALLEKLCL QFLAWNFEAL TQAEAWPSVP   300
TDLLQLLLPR SDLAVPSELA LLKAVDTWSW GERASHEEVE GLVEKIRFPM MLPEELFELQ   360
FNLSLYWSHE ALFQKKTLQA LEFHTVPFQL LARYKGLNLT EDTYKPRIYT SPTWSAFVTD   420
SSWSARKSQL VYQSRRGPLV KYSSDYFQAP SDYRYYPYQS FQTPQHPSFL FQDKRVSWSL   480
VYLPTIQSCW NYGFSCSSDE LPVLGLTKSG GSDRTIAYEN KALMLCEGLF VADVTDFEGW   540
KAAIPSALDT NSSKSTSSFP CPAGHFNGFR TVIRPFYLTN SSGVD                  585

SEQ ID NO: 4           moltype = AA  length = 131
FEATURE                Location/Qualifiers
source                 1..131
                       mol_type = protein
                       organism = Homo sapiens
SEQUENCE: 4
MARSLVCLGV IILLSAFSGP GVRGGPMPKL ADRKLCADQE CSHPISMAVA LQDYMAPDCR    60
FLTIHRGQVV YVFSKLKGRG RLFWGGSVQG DYYGDLAARL GYFPSSIVRE DQTLKPGKVD   120
VKTDKWDFYC Q                                                       131

SEQ ID NO: 5           moltype = AA  length = 308
FEATURE                Location/Qualifiers
source                 1..308
                       mol_type = protein
                       organism = Homo sapiens
SEQUENCE: 5
MPGQELRTLN GSQMLLVLLV LSWLPHGGAL SLAEASRASF PGPSELHTED SRFRELRKRY    60
EDLLTRLRAN QSWEDSNTDL VPAPAVRILT PEVRLGSGGH LHLRISRAAL PEGLPEASRL   120
HRALFRLSPT ASRSWDVTRP LRRQLSLARP QAPALHLRLS PPPSQSDQLL AESSSARPQL   180
ELHLRPQAAR GRRRARARNG DHCPLGPGRC CRLHTVRASL EDLGWADWVL SPREVQVTMC   240
IGACPSQFRA ANMHAQIKTS LHRLKPDTVP APCCVPASYN PMVLIQKTDT GVSLQTYDDL   300
LAKDCHCI                                                           308

SEQ ID NO: 6           moltype = AA  length = 287
FEATURE                Location/Qualifiers
source                 1..287
                       mol_type = protein
                       organism = Homo sapiens
SEQUENCE: 6
MRIAVICFCL LGITCAIPVK QADSGSSEEK QNAVSSEETN DFKQETLPSK SNESHDHMDD    60
MDDEDDDDHV DSQDSIDSND SDDVDDTDDS HQSDESHHSD ESDELVTDFP TDLPATEVFT   120
PVVPTVDTYD GRGDSVVYGL RSKSKKFRRP DIQYPDATDE DITSHMESEE LNGAYKAIPV   180
AQDLNAPSDW DSRGKDSYET SQLDDQSAET HSHKQSRLYK RKANDESNEH SDVIDSQELS   240
KVSREFHSHE FHSHEDMLVV DPKSKEEDKH LKFRISHELD SASSEVN                287

SEQ ID NO: 7           moltype = AA  length = 779
FEATURE                Location/Qualifiers
source                 1..779
                       mol_type = protein
                       organism = Homo sapiens
SEQUENCE: 7
MIPFLPMFSL LLLLIVNPIN ANNHYDKILA HSRIRGRDQG PNVCALQQIL GTKKKYFSTC    60
KNWYKKSICG QKTTVLYECC PGYMRMEGMK GCPAVLPIDH VYGTLGIVGA TTTQRYSDAS   120
KLREEIEGKG SFTYFAPSNE AWDNLDSDIR RGLESNVNVE LLNALHSHMI NKRMLTKDLK   180
NGMIIPSMYN NLGLFINHYP NGVVTVNCAR IIHGNQIATN GVVHVIDRVL TQIGTSIQDF   240
IEAEDDLSSF RAAAITSDIL EALGRDGHFT LFAPTNEAFE KLPRGVLERI MGDKVASEAL   300
MKYHILNTLQ CSESIMGGAV FETLEGNTIE IGCDGDSITV NGIKMVNKKD IVTNNGVIHL   360
IDQVLIPDSA KQVIELAGKQ QTTFTDLVAQ LGLASALRPD GEYTLLAPVN NAFSDDTLSM   420
DQRLLKLILQ NHILKVKVGL NELYNGQILE TIGGKQLRVF VYRTAVCIEN SCMEKGSKQG   480
RNGAIHIFRE IIKPAEKSLH EKLKQDKRFS TFLSLLEAAD LKELLTQPGD WTLFVPTNDA   540
FKGMTSEEKE ILIRDKNALQ NIILYHLTPG VFIGKGFEPG VTNILKTTQG SKIFLKEVND   600
TLLVNELKSK ESDIMTTNGV IHVVDKLLYP ADTPVGNDQL LEILNKLIKY IQIKFVRGST   660
FKEIPVTVYK PIIKKYTKII DGVPVEITEK ETREERIITG PEIKYTRIST GGGETEETLK   720
KLLQEEVTKV TKFIEGGDGH LFEDEEIKRL LQGDTPVRKL QANKKVQGSR RRLREGRSQ    779

SEQ ID NO: 8           moltype = AA  length = 807
FEATURE                Location/Qualifiers
source                 1..807
                       mol_type = protein
                       organism = Homo sapiens
SEQUENCE: 8
MRLSPAPLKL SRTPALLALA LPLAAALAFS DETLDKVPKS EGYCSRILRA QGTRREGYTE    60
FSLRVEGDPD FYKPGTSYRV TLSAAPPSYF RGFTLIALRE NREGDKEEDH AGTFQIIDEE   120
ETQFMSNCPV AVTESTPRRR TRIQVFWIAP PAGTGCVILK ASIVQKRIIY FQDEGSLTKK   180
LCEQDSTFDG VTDKPILDCC ACGTAKYRLT FYGNWSEKTH PKDYPRRANH WSAIIGGSHS   240
KNYVLWEYGG YASEGVKQVA ELGSPVKMEE EIRQQSDEVL TVIKAKAQWP AWQPLNVRAA   300
```

```
PSAEFSVDRT RHLMSFLTMM GPSPDWNVGL SAEDLCTKEC GWVQKVVQDL IPWDAGTDSG   360
VTYESPNKPT IPQEKIRPLT SLDHPQSPFY DPEGGSITQV ARVVIERIAR KGEQCNIVPD   420
NVDDIVADLA PEEKDEDDTP ETCIYSNWSP WSACSSSTCD KGKRMRQRML KAQLDLSVPC   480
PDTQDFQPCM GPGCSDEDGS TCTMSEWITW SPCSISCGMG MRSRERYVKQ FPEDGSVCTL   540
PTEETEKCTV NEECSPSSCL MTEWGEWDEC SATCGMGMKK RHRMIKMNPA DGSMCKAETS   600
QAEKCMMPEC HTIPCLLSPW SEWSDCSVTC GKGMRTRQRM LKSLAELGDC NEDLEQVEKC   660
MLPECPIDCE LTEWSQWSEC NKSCGKGHVI RTRMIQMEPQ FGGAPCPETV QRKKCRIRKC   720
LRNPSIQKLR WREARESRRS EQLKEESEGE QFPGCRMRPW TAWSECTKLC GGGIQERYMT   780
VKKRFKSSQF TSCKDKKEIR ACNVHPC                                      807

SEQ ID NO: 9           moltype = DNA   length = 3470
FEATURE                Location/Qualifiers
source                 1..3470
                       mol_type = unassigned DNA
                       organism = Homo sapiens
SEQUENCE: 9
aaagctctgg gccccaggga ggaggctcag cacagagagt ggaaaacagc agaggtgaca   60
gagcagccgt gctcgaagcg ttcctggagc ccaagctctc ctccacaggt gaagacaggg   120
ccagcaggag acaccatggg gcacctctca gccccacttc acagagtgcg tgtaccctgg   180
caggggcttc tgctcacagc ctcacttcta accttctgga acccgccac cactgcccag    240
ctcactactg aatccatgcc attcaatgtt gcagagggga aggaggttct tctccttgtc   300
cacaatctgc cccagcaact ttttggctac agctggtaca aaggggaaag agtggatggc   360
aaccgtcaaa ttgtaggata tgcaatagga actcaacaag ctaccccagg gcccgcaaac   420
agcggtcgag agacaatata ccccaatgca tccctgctga tccagaacgt cacccagaat   480
gacacaggat tctacaccct acaagtcata aagtcagatc ttgtgaatga agaagcaact   540
ggacagttcc atgtatacc ggagctgccc aagccctcca tctccagcaa caactccaac    600
cctgtggagg acaaggatgc tgtggccttc acctgtgaac ctgagactca ggacacaacc   660
tacctgtggt ggataaacaa tcagagcctc ccggtcagtc ccaggctgca gctgtccaat   720
ggcaacagga ccctcactct actcagtgtc acaaggaatg acacaggacc ctatgagtgt   780
gaaatacaga acccagtgag tgcgaaccgc agtgacccag tcaccttgaa tgtcacctat   840
ggcccggaca cccccaccat ttccccttca gacaccatt accgtccagg gcaaacctc    900
agcctctcct gctatgcagc ctctaaccca cctgcacagt actcctggct tatcaatgga   960
acattccagc aaagcacaca agagctcttt atccctaaca tcactgtgaa taatagtgga  1020
tcctatacct gccacgccaa taactcagtc actggctgca acaggaccac agtcaagacg  1080
atcatagtca ctgagctaag tccagtagta gcaaagcccc aaatcaaagc cagcaagacc  1140
acagtcacag gagataagga ctctgtgaac ctgacctgct ccacaaatga cactggaatc  1200
tccatccgtt ggttcttcaa aaaccagagt ctcccgtcct cggagaggat gaagctgtcc  1260
cagggcaaca ccaccctcag cataaaccct gtcaagaggg aggatgctgg gacgtattgg  1320
tgtgaggtct tcaaccaat cagtaagaac caaagcgacc ccatcatgct gaacgtaaac    1380
tataatgctc taccaagaa aaatggcctc tcacctgggg ccattgctgg cattgtgatt  1440
ggagtagtgg ccctggttgc tctgatagca gtagccctgg catgttttct gcatttcggg  1500
aagaccggca ggaccactcc aatgaccac ctaacaagat gaatgaagtt acttattcta    1560
ccctgaactt tgaagcccag caacccacac aaccaactc agcctcccca tccctaacag    1620
ccacagaaat aatttattca gaagtaaaaa agcagtaatg aaacctgtcc tgctcactgc  1680
agtgctgatg tatttcaagt ctctcaccct catcactagg agattccttt ccctgtagg   1740
ggtagagggg tggggacaga aacaactttc tcctactctt ccttcctaat aggcatctcc  1800
aggctgcctg gtcactgccc ctctctcagt gtcaatagat gaaagtacat tgggagtctg  1860
taggaaaccc aaccttcttg tcattgaaat ttggcaaagc tgactttggg aaagagggac  1920
cagaacttcc cctcccttcc ccttttccca acctggactt gttttaaact tgcctgttca  1980
gagcactcat tccttcccac ccccagtcct gtcctatcac tctaattcgg atttgccata  2040
gccttgaggt tatgtccttt tccattaagt acatgtgcca ggaaacaaga gagagagaa   2100
gtaaaggcag taatgccttc tcctatttct ccaaagcctt gtgtgaactc accaaacaca  2160
agaaaatcaa atatataacc aatagtgaaa tgccacacct ttgtccactg tcagggttgt  2220
ctacctgtag gatcagggtc taagcacctt ggtgcttagc tagaataca cctaatcctc    2280
ctggcaagcc tgtcttcaga gaacccacta gaagcaacta ggaaaatcac ttgccaaaat  2340
ccaaggcaat tcctgatgga aaatgcaaaa gcacatatat gttttaatat ctttatgggc  2400
tctgttcaag gcagtgctga gagggagggg ttatagcttc aggagggaac cagcttctga  2460
taaacacaat ctgctaggaa cttgggaaag gaatcagaga gctgcccttc agcgattatt  2520
taaattattg ttaaagaata cacaatttgg ggtattggga ttttttctcc tttttctctg  2580
acattccacc atttttaattt ttgtaactgc ttatttatgt gaaagggtt attttttactt  2640
agcttagcta tgtcagccaa tccgattgcc ttaggtgaaa gaaaccaccg aaatccctca  2700
ggtcccttgg tcaggagcct ctcaagattt ttttgtcag aggctccaaa tagaaaataa    2760
gaaaaggttt tcttcattca tggctagagc tagatttaac tcagtttcta ggcacctcag  2820
accaatcatc aactaccatt ctattccatg tttgcacctg tgcatttct gtttgccccc    2880
attcactttg tcaggaaacc ttggcctctg ctaaggtgta tttggtcctt gagaagtggg  2940
agcaccctac agggacacta tcactcatgc tggtggcatt gtttacagct agaaagctgc  3000
actggtgcta atgcccttg gggaaatggg gctgtgagga ggaggattat aacttaggcc    3060
tagcctcttt taacgcctc tgaaatttat cttttcttct atggggtcta taaatgtatc   3120
ttataataaa aaggaaggac aggaggaaga caggcaaatg tacttctcac ccagtcttct  3180
acacagatgg aatctctttg gggctaagag aaaggtttta ttctatattg cttacctgat  3240
ctcatgttag gcctaagagg cttttctccag gaggattagc ttggagtct ctatactcag   3300
gtacctcttt cagggttttc taaccctgac acggactgtg catactttcc ctcatccatg  3360
ctgtgctgtg ttatttaatt tttcctggct aagatcatgt ctgaattatg tatgaaaatt  3420
attctatgtt tttataataa aaataatata tcagacatcg aaaaaaaaaa             3470

SEQ ID NO: 10          moltype = DNA   length = 764
FEATURE                Location/Qualifiers
source                 1..764
                       mol_type = unassigned DNA
```

```
                        organism = Homo sapiens
SEQUENCE: 10
ggcacgagga gcagagtcag ccagcatgac cgagcgccgc gtccccttct cgctcctgcg    60
gggcccagc tggacccct tccgcgactg gtacccgcat agccgcctct tcgaccaggc    120
cttcgggctg ccccggctgc cggaggagtg gtcgcagtgg ttaggcggca gcagctggcc   180
aggctacgtg cgcccctgc ccccgccgc catcgagagc cccgcagtgg ccgcgcccgc   240
ctacagccgc gcgctcagcc ggcaactcag cagcggggtc tcggagatcc ggcacactgc   300
ggaccgctgg cgcgtgtccc tggatgtcaa ccacttcgcc ccggacgagc tgacggtcaa   360
gaccaaggat ggcgtggtgg agatcaccgg caagcacgag gagcggcagg acgagcatgg   420
ctacatctcc cggtgcttca cgcggaaata cacgctgccc cccgtgtgg accccaccca   480
agttcctcc tccctgtccc ctgagggcac actgaccgtg gaggcccca tgcccaagct    540
agccacgcag tccaacgaga tcaccatccc agtcaccttc gagtcgcggg cccagcttgg   600
gggcccagaa gctgcaaaat ccgatgagac tgccgcaag taaagcctta gcccggatgc    660
ccaccctgc tgccgccact ggctgtgcct cccccgccac ctgtgtgttc ttttgataca   720
tttatcttct gtttttctca aataaagttc aaagcaacca cctg                     764

SEQ ID NO: 11           moltype = DNA   length = 2277
FEATURE                 Location/Qualifiers
source                  1..2277
                        mol_type = unassigned DNA
                        organism = Homo sapiens
SEQUENCE: 11
aatcgaaagt agactctttt ctgaagcatt tcctgggatc agcctgacca cgctccatac    60
tgggagaggc ttctgggtca aaggaccagt ctgcagaggg atcctgtggc tggaagcgag   120
gaggctccac acgccgttg cagctaccgc agccaggatc tgggcatcca ggcacggcca   180
tgaccctcc gaggctcttc tgggtgtggc tgctggttgc aggaacccaa ggcgtgaacg   240
atggtgacat gcggctggcc gatggggggcg ccaccaacca gggccgcgtg gagatcttct   300
acagaggcca gtggggcact gtgtgtgaca acctgtggga cctgactgat gccagcgtcg   360
tctgccgggc cctgggcttc gagaacgcca cccaggctct gggcagagct gccttcgggc   420
aaggatcagg ccccatcatg ctggatgagg tccagtggga ggaaccgag gcctcactgg   480
ccgactgcaa gtccctgggc tggctgaaga gcaactgcag gcacgagaga gacgctggtg   540
tggtctgcac caatgaaacc aggagcaccc acaccctgga cctctccagg gagctctcgg   600
aggcccttgg ccagatcttt gacagccagc ggggctgcga cctgtccatc agcgtgaatg   660
tgcagggcga ggacgccctg ggcttctgtg gccacacggt catcctgact gccaacctgg   720
aggcccaggc cctgtggaag gagccgggca gcaatgtcac catgagtgtg gatgctggtg   780
gtgtgcccat ggtcagggac cttctcaggt acttctactc ccgaaggatt gacatcaccc   840
tgtcgtcagt caagtgcttc cacaagctgg cctctgccta ggggccagg cagctgcagg   900
gctactgcgc aagcctcttt gccatcctcc tcccccagga cccctcgttc cagatgccc   960
tggacctgta tgcctatgca gtggccacag gggacgccc gctggagaag ctctgcctac  1020
agttcctggc ctggaacttc gaggccttga cgcaggccga ggcctggccc agtgtcccca  1080
cagacctgct ccaactgctg ctgcccagga gcgacctggc ggtgcccagc gagctggccc  1140
tactgaaggc cgtggacacc tggagctggg gggagcgtgc ctcccatgag gaggtggagg  1200
gcttggtgga gaagatccgc ttccccatga tgctccctga gagctgcagt  1260
tcaacctgtc cctgtactgg agccacgagg ccctgttcca gaagaagact ctgcaggccc  1320
tggaattcca cactgtgccc ttccagttgc tggcccggta caaaggcctg aacctcaccg  1380
aggataccta caagccccgg atttacacct cgcccacctg gagtgccttt gtgacagaca  1440
gttcctggag tgcacggaag tcacaactgg tctatcagtc cagacggggg cctttggtca  1500
aatattcttc tgattacttc caagcccct ctgactacag atactacccc taccagtcct  1560
tccagactcc acaacacccc agcttcctct tccaggacaa gagggtgtcc tggtccctgg  1620
tctacctccc caccatccag agctgctgga actacgctt ctcctgctcc tcggacgagc  1680
tccctgtcct gggcctcacc aagtctggcg gctcagatcg caccattgcc tacgaaaaca  1740
aagccctgat gctctgcgaa gggctcttcg tggcagacgt caccgatttc gagggctgga  1800
aggctgcgat tccagtgcc ctggacacca acagctcgaa gagcacctcc tccttcccct  1860
gcccggcagg gcacttcaac ggcttccgca cggtcatccg ccccttctac ctgaccaact  1920
cctcaggtgt ggactagacg gcgtggccca agggtggtga gaaccggaga accccaggac  1980
gccctcactg caggctcccc tcctcggctt ccttcctctc tgcaatgacc ttcaacaacc  2040
ggccaccaga tgtcgcccta ctcacctgag cgctcagctt caagaaatta ctggaaggct  2100
tccactaggg tccaccagga gttctcccac cacctcacca gttccaggt ggtaagcacc   2160
aggacgccct cgaggttgct ctgggatccc ccacagccc ctggtcagtc tgcccttgtc  2220
actggtctga ggtcattaaa attacattga ggttcctaca aaaaaaaaaa aaaaaaa     2277

SEQ ID NO: 12           moltype = DNA   length = 529
FEATURE                 Location/Qualifiers
source                  1..529
                        mol_type = unassigned DNA
                        organism = Homo sapiens
SEQUENCE: 12
cttctgtggc cagagggggac agcggaggag cccagtccac gatgcccgg tccctggtgt     60
gccttggtgt catcatcttg ctgtctgcct tctccggacc tggtgtcagg ggtgtccta    120
tgcccaagct ggctgaccgg aagctgtgtg cggaccagga gtgcagccac cctatctcca   180
tggctgtggc ccttcaggac tacatggccc ccgactgccg attcctgacc attcaccggg   240
gccaagtggt gtatgtcttc tccaagctga agggccgtgg gcggctcttc tggggaggca   300
gcgttcaggg agattactat ggagatctgg ctgctcgcct gggctatttc cccagtagca   360
ttgtccgaga ggaccagacc ctgaaacctg gcaaagtcga tgtgaagaca gacaaatggg   420
atttctactg ccagtgagct cagcctaccg ctggccctgc cgttcccct ccttggcttt   480
atgcaaatac aatcagccca gtgcaaacgg aaaaaaaaaa aaaaaaaa              529

SEQ ID NO: 13           moltype = DNA   length = 1202
FEATURE                 Location/Qualifiers
```

| source | 1..1202 |
| --- | --- |
| | mol_type = unassigned DNA |
| | organism = Homo sapiens |

SEQUENCE: 13

```
gcggccgctg cacagccatg cccgggcaag aactcaggac gctgaatggc tctcagatgc   60
tcctggtgtt gctggtgctc tcgtggctgc cgcatggggg cgccctgtct ctggccgagg  120
cgagccgcgc aagtttcccg ggaccctcag agttgcacac cgaagactcc agattccgag  180
agttgcggaa acgctacgag gacctgctaa ccaggctgcg ggccaaccag agctgggaag  240
attcgaacac cgacctcgtc ccggcccctg cagtccggat actcacgcca gaagtgcggc  300
tgggatccgg cggccacctg cacctgcgta tctctcgggc cgcccttccc gaggggctcc  360
ccgaggcctc ccgccttcac cgggctctgt tccggctgtc cccgacggcg tcaaggtcgt  420
gggacgtgac acgacctctg cggcgtcagc tcagccttgc aagacccag cgcccgcgc    480
tgcacctgcg actgtcgccg ccgccgtcgc agtcggacca actgctggca gaatcttcgt  540
ccgcacgcc ccagctggag ttgcacttgc ggccgcaagc cgcagggg cgccgcagag     600
cgcgtgcgcg caacggggac cactgtccgc tcgggcccgg gcgttgctgc cgtctgcaca  660
cggtccgcgc gtcgctggaa gacctgggct gggccgattg ggtgctgtcg ccacgggagg  720
tgcaagtgac catgtgcatc ggcgcgtgcc cgagccagtt ccgggcggca aacatgcacg  780
cgcagatcaa gacgagcctg caccgcctga agcccgacac ggtgccagcg ccctgctgcg  840
tgcccgccag ctacaatccc atggtgctca ttcaaaagac cgacaccggg gtgtcgctcc  900
agacctatga tgacttgtta gccaaagact gccactgcat atgagcagtc ctggtccttc  960
cactgtgcac ctgcgcgggg gaggcgacct cagttgtcct gccctgtgga atgggctcaa 1020
ggttcctgag acacccgatt cctgcccaaa cagctgtatt tatataagtc tgttatttat 1080
tattaattta ttggggtgac cttcttgggg actcggggc tggtctgatg gaactgtgta  1140
tttatttaaa actctggtga taaaaataaa gctgtctgaa ctgttaaaaa aaaaaaaaa  1200
aa                                                                1202
```

| SEQ ID NO: 14 | moltype = DNA length = 1560 |
| --- | --- |
| FEATURE | Location/Qualifiers |
| source | 1..1560 |
| | mol_type = unassigned DNA |
| | organism = Homo sapiens |

SEQUENCE: 14

```
ctccctgtgt tggtggagga tgtctgcagc agcatttaaa ttctgggagg gcttggttgt   60
cagcagcagc aggaggaggc agagcacagc atcgtcggga ccagactcgt ctcaggccag  120
ttgcagcctt ctcagccaaa cgccgaccaa ggaaaactca ctaccatgga aattgcagtg  180
atttgctttt gcctcctagg catcacctgt gccataccag ttaaacaggc tgattctgga  240
agttctgagg aaaagcagaa tgctgtgtcc tctgaagaaa ccaatgactt taaacaagag  300
acccttccaa gtaagtccaa cgaaagccat gaccacatgg atgatatgga tgatgaagat  360
gatgatgacc atgtggacag ccaggactcc attgactgac acgactctga tgatgtagat  420
gacactgatg attctcacca gtctgatgag tctcaccatt ctgatgaatc tgatgaactg  480
gtcactgatt ttcccacgga cctgccagca accgaagttt tcactccagt tgtccccaca  540
gtagacacat atgatggccg aggtgatagt gtggtttatg gactgaggtc aaaatctaag  600
aagtttcgca gacctgacat ccagtaccct gatgctacag acgagacat cacctcacac   660
atggaaagcg aggagttgaa tggtgcatac aaggccatcc ccgttgccca ggacctgaac  720
gcgccttctg attgggacag ccgtgggaag gacagttatg aaacgagtca gctggatgac  780
cagagtgctg aaacccacag ccacaagcag tccagattat ataagcggaa agccaatgat  840
gagagcaatg agcattccga tgtgattgat agtcaggaac tttccaaagt cagccgtgaa  900
ttccacagcc atgaatttca cagccatgaa gatatgctgg ttgtagaccc caaaagtaag  960
gaagaagata acacctgaa atttcgtatt tctcatgaat tagatagtgc atcttctgag  1020
gtcaattaaa aggagaaaaa atacaatttc tcactttgca tttagtcaaa agaaaaaatg 1080
ctttatagca aaatgaaaga gaacatgaaa tgcttctttc tcagttttatt ggttgaatgt 1140
gtatctattt gagtctgaaa ataactaatg tgtttgataa ttagtttagt ttgtggcttc 1200
atggaaactc cctgtaaact aaaagcttca gggttatgtc tatgttcatt ctatagaaga 1260
aatgcaaact atcactgtat tttaatattt gttattctct catgaataga aatttatgta 1320
gaagcaaaca aaatacttt acccacttaa aaagagaata taacatttta tgtcactata  1380
atcttttgtt ttttaagtta gtgtatattt tgttgtgatt atcttttttgt ggtgtgaata 1440
aatcttttat cttgaatgta ataagaattt ggtggtgtca attgcttatt tgttttccca 1500
cggttgtcca gcaattaata aaacataacc ttttttactg cctaaaaaaa aaaaaaaaa  1560
```

| SEQ ID NO: 15 | moltype = DNA length = 2455 |
| --- | --- |
| FEATURE | Location/Qualifiers |
| source | 1..2455 |
| | mol_type = unassigned DNA |
| | organism = Homo sapiens |

SEQUENCE: 15

```
agagactcaa gatgattccc tttttaccca tgttttctct actattgctg cttattgtta   60
accctataaa cgccaacaat cattatgaca agatcttggc tcatagtcgt atcagggtc   120
gggaccaagg cccaaatgtc tgtgcccttc aacagatttt gggcaccaaa agaaatact   180
tcagcacttg taagaactgg tataaaaagt ccatctgtgg acagaaaacg actgtgttat  240
atgaatgttg ccctggttat atgagaatgg aaggaatgaa aggctgccca gcagttttgc  300
ccattgacca tgtttatggc actctgggca tcgtgggagc caccacaacg cagcgctatt  360
ctgacgcctc aaaactgagg gaggagatcg agggaaaggg atccttcact tactttgcac  420
cgagtaatga ggcttgggac aacttggatt ctgatatccg tagaggtttg gagagcaacg  480
tgaatgttga attactgaat gctttacata tgtacatgat aataagaga atgttgacca  540
aggacttaaa aaatggcatg attattcctt caatgtataa caatttgggg ctttccatta  600
accattatcc taatggggtt gtcactgtta attgtgctcg aatcatccat gggaaccaga  660
ttgcaacaaa tggtgttgtc catgtcattg accgtgtgct tacacaaatt ggtacctcaa  720
tccaagactt cattgaagca gaagatgacc tttcatcttt tagagcagct gccatacaat  780
cggacatatt ggaggccctt ggaagagacg gtcacttcac actctttgct cccaccaatg  840
```

-continued

```
aggcttttga gaaacttcca cgaggtgtcc tagaaaggat catgggagac aaagtggctt    900
ccgaagctct tatgaagtac cacatcttaa atactctcca gtgttctgag tctattatgg    960
gaggagcagt ctttgagacg ctggaaggaa atacaattga gataggatgt gacggtgaca   1020
gtataacagt aaatgaatc aaaatggtga acaaaaagga tattgtgaca aataatggtg    1080
tgatccattt gattgatcag gtcctaattc ctgattctgc caaacaagtt attgagctgg   1140
ctggaaaaca gcaaaccacc ttcacggatc ttgtggccca attaggcttg gcatctgctc   1200
tgaggccaga tggagaatac actttgctgg cacctgtgaa taatgcattt tctgatgata   1260
ctctcagcat ggatcagcgc ctccttaaat taattctgca gaatcacata ttgaaagtaa   1320
aagttggcct taatgagctt tacaacgggc aaatactgga aaccatcgga ggcaaacagc   1380
tcagagtctt cgtatatcgt acagctgtct gcattgaaaa ttcatgcatg cctgttggaa   1440
gtaagcaagg gagaaacggt gcgattcaca tattccgcga gatcatcaag ccagcagaga   1500
aatccctcca tgaaaagtta aaacaagata agcgctttag caccttcctc agcctacttg   1560
aagctgcaga cttgaaagag ctcctgacac aacctggaga ctggacatta tttgtgccaa   1620
ccaatgatgc ttttaaggga atgactagtg aagaaaaaga aattctgata cgggacaaaa   1680
atgctcttca aaacatcatt ctttatcacc tgacaccagg agttttcatt ggaaaaggat   1740
ttgaacctgg tgttactaac attttaaaga ccacacaagg aagcaaaatc tttctgaaag   1800
aagtaaatga tacacttctg gtgaatgaat tgaaatcaaa agaatctgac atcatgcaaa   1860
caaatggtgt aattcatgtt gtagataaac tcctctatcc agcagacaca cctgttggaa   1920
atgatcaact gctggaaata cttaataaat taatcaaata catccaaatt aagtttgttc   1980
gtggtagcac cttcaaagaa atccccgtga ctgtctataa gccaattatt aaaaaatacaa  2040
ccaaaatcat tgatggagtg cctgtggaaa taactgaaaa agagacacga gaagaacgaa   2100
tcattacagg tcctgaaata aaatacacta ggatttctac tggaggtgga gaaacagaag   2160
aaactctgaa gaaattgtta caagaagagg tcaccaaggt caccaaattc attgaaggtg   2220
gtgatggtca tttatttgaa gatgaagaaa ttaaaagact gcttcaggga gacacacccg   2280
tgaggaagtt gcaagccaac aaaaaagttc aaggatctag aagacgatta agggaaggtc   2340
gttctcagtg aaaattccaaa aaccagaaaa aaatgtttat acaaccctaa gtcaataacc   2400
tgaccttaga aaattgtgag agccaagttg acttcaggaa ctgaaacatc agcac         2455
```

SEQ ID NO: 16        moltype = DNA  length = 5154
FEATURE               Location/Qualifiers
source                1..5154
                         mol_type = unassigned DNA
                         organism = Homo sapiens
SEQUENCE: 16

```
gcaaaatcag ccctccctcc tcccgctcct tcgccgcggc cctccccctcc tcgcgctgct    60
ctcgttcgct tggctcagct cagctcagct cagcgcagct ccgcggccgc caagccgagg   120
cgggcacggt ctccgagtcg cggacgccag ctccgagctc cctctctccg ccgcgcctcc   180
gccaggtcgc gccttcgtcg ggaccacttc gggcaggagt cgcgtggcga aggcctgcgg   240
ccgcgcaca aagttggggg ccgcgaagat gaggctgccc ccggcgcccc tgaagctgag   300
ccggactccg gcactgctgg ccctggcgct gccctggcc gcggcgctgg ccttctccga   360
cgagaccctg gacaaagtgc caagtcaga gggctactgc agccgtatcc tgcgcgccca   420
gggcacgcgg cgcgagggct acaccgagtt cagcctccgc gtgagggcg accccgactt   480
ctacaagccg ggaaccagct accgcgtaac actttcgagt gctcctccct cctacttcag   540
aggattcaca ttaattgccc tcagagagaa cagagagggt gataaggaag aagaccatgc   600
tgggaccttc cagatcatag acgaagaaga aactcagtttt atgagcaatt gccctgttgc   660
agtcactgaa agcactccac ggaggaggac ccggatccag tgttttgga tagcaccacc    720
agcgggaaca ggctgcgtga ttctgaaggc cagcatccga caaaaacgca ttatttattt   780
tcaagatgag ggctctctga ccaagaaact ttgtgaacaa gattccacat ttgatggggt   840
gactgacaaa cccatcttag actgctgtgc ctgcggaact gccaagtaca gactcacatt   900
ttatgggaat tggtccgaga agacacaccc aaaggattac cctcgtcggg ccaaccactg   960
gtctgcgatc atcggaggat cccactccaa gaattatgta ctgtgggaat atggaggata  1020
tgccagcgaa ggcgtcaaac aagttgcaga attgggctca cccgtgaaaa tggaggaaga  1080
aattcgacaa cagagtgatg aggtcctcac cgtcatcaaa gccaaagccc aatgccagc   1140
ctggcagcct ctcaacgtga gagcagcacc ttcagctgaa ttttccgtgg acagaacgcg   1200
ccatttaatg tccttcctga ccatgatggg ccctagtccc gactggaacg taggcttatc   1260
tgcagaagat ctgtgcacca aggaatgtgg ctgggtccag aaggtggtgc aagacctgat   1320
tccctgggac gctggcaccg acagcggggt gacctatgag tcacccaaca acccaccat   1380
tccccaggag aaaatccggc ccctgaccag cctggaccat cctcagagtc ctttctatga   1440
cccagagggt gggtccatca ctcaagtagc cagagttgtc atcgagagaa tcgcacggaa   1500
gggtgaacaa tgcaatattg tacctgacaa tgtcgatgat attgtgactg acctggctcc   1560
agaagagaaa gatgaagatg acacccctga aacctgcatc tactcaact ggtccccatg   1620
gtccgcctgc agtcctcca cctgtgacaa aggcaagagg atgcgacagc gcatgctgaa   1680
agcacagctg gacctcagcg tccctgccc tgacacccag gacttccagc cctgcatggg   1740
ccctgcagc agtgacgaag acggctccac ctgcaccatg tccgagctgc gcaccctgcg   1800
gcctgcagc atctcctgcg gcatgggcat gaggtcccgg gagaggtatg tgaagcagtt   1860
ccggaggc ggctccgtgt gcacgctgcc cactgaggaa acggagagt gcacggtcaa   1920
cgaggagtgc tctcccagca gctgcctgat gaccgagtgg ggcgagtggg acgagtgcag   1980
cgccacctgc ggcatgggca tgaagaagcg gcacgcatg atcaagatga ccccgcaga   2040
tggctccatg tgcaaagccg agacatcaca ggcagagaac tgcatgatgc cagagtgcca   2100
caccatccca tgcttgctgt ccccatggtc cgagtgagt gactgcagcg tgacctgcgg   2160
gaagggcatg cgaaccccgac agcggatgct caagtctctg gcagaacttg gagactgcaa   2220
tgaggatctg gagcaggtgg agaagtgcat gctccctgaa tgcccattg actgtgagct   2280
caccgagtgg tcccagtggt cggaatgtaa caagtcatgt gggaaaggcc acgtgattcg   2340
aacccggatg atccaaatgg aaccctcagtt tgagggtgca ccctgcccag agactgtgga   2400
gcgaaaaaag tgccgcatcc gaaaatgcct tcgaaatccc atccaaa agctacgctg   2460
gagggaggcc cgagagagcc ggcggagtga gcagctgaag aagagtctg aagggcagca   2520
gttccaggtt gtaggatgc gcccatggac ggccggtca gaatgcacca aactgtgcgg   2580
aggtggaatt caggaacgtt acatgactgt aaagaagaga ttcaaaagct cccagtttac   2640
cagctgcaaa gacaagaagg agatcagagc atgcaatgtt catccttgtt agcaagggta  2700
```

```
cgagttcccc agggctgcac tctagattcc agagtcacca atggctggat tatttgcttg  2760
tttaagacaa tttaaattgt gtacgctagt tttcattttt gcagtgtggt tcgcccagta  2820
gtcttgtgga tgccagagac atcctttctg aatacttctt gatgggtaca ggctgagtgg  2880
ggcgccctca cctccagcca gcctcttcct gcagaggagt agtgtcagcc accttgtact  2940
aagctgaaac atgtccctct ggagcttcca cctggccagg gaggacggag actttgacct  3000
actccacatg gagaggcaac catgtctgga agtgactatg cctgagtccc agggtgcggc  3060
aggtaggaaa cattcacaga tgaagacagc agattcccca cattctcatc tttggcctgt  3120
tcaatgaaac cattgtttgc ccatctcttc ttagtggaac tttaggtctc ttttcaagtc  3180
tcctcagtca tcaatagttc ctggggaaaa acagagctgg tagacttgaa gaggagcatt  3240
gatgttgggt ggcttttgtt ctttcactga gaaattcgga atacatttgt ctcacccctg  3300
atattggttc ctgatgcccc cccaacaaaa ataaataaat aaattatggc tgctttattt  3360
aaatataagg tagctagttt ttacacctga gataaataat aagcttagag tgtattttc  3420
ccttgctttt gggggttcag aggagtatgt acaattcttc tgggaagcca gccttctgaa  3480
cttttggta ctaaatcctt attggaacca agacaaagga agcaaaattg gtctctttag  3540
agaccaattt gcctaaattt taaaatcttc ctacacacat ctagacgttc aagtttgcaa  3600
atcagttttt agcaagaaaa cattttgct atacaaacat tttgctaagt ctgcccaaag  3660
cccccccaat gcattccttc aacaaaatac aatctctgta ctttaaagtt attttagtca  3720
tgaaatttta tatgcagaga gaaaaagtta ccgagacaga aaacaaatct aagggaaagg  3780
aatattatgg gattaagctg agcaagcaat tctggtggaa agtcaaacct gtcagtgctc  3840
cacaccaggg ctgtggtcct cccagacatg cataggaatg gccacaggtt tacactgcct  3900
tcccagcaat tataagcaca ccagattcag ggagactgac caccaaggga tagtgtaaaa  3960
ggacattttc tcagttgggt ccatcagcag tttttcttcc tgcatttatt gttgaaaact  4020
attgtttcat ttcttctttt ataggcctta ttactgctta atccaaatgt gtaccattgg  4080
tgagacacat acaatgctct gaatacacta cgaatttgta ttaaacacat cagaatattt  4140
ccaaatacaa catagtatag tcctgaatat gtacttttaa cacaagagag actattcaat  4200
aaaaactcac tgggtctttc atgtcttaa gctaagtaag tgttcagaag gttctttttt  4260
atattgtcct ccacctccat cattttcaat aaaagatagg gcttttgctc ccttgttctt  4320
ggagggacca ttattacatc tctgaactac ctttgtatcc aacatgtttt aaatccttaa  4380
atgaattgct ttctcccaaa aaaagcacaa tataaagaaa cacaagattt aattattttt  4440
ctacttgggg ggaaaaaagt cctcatgtag aagcacccac ttttgcaatg ttgttctaag  4500
ctatctatct aactctcagc ccatgataaa gttccttaag ctggtgattc ctaatcaagg  4560
acaagccacc ctagtgtctc atgtttgtat ttggtcccag ttgggtacat tttaaaatcc  4620
tgattttgga gacttaaaac caggttaatg gctaagaatg ggtaacatga ctcttgttgg  4680
attgttattt tttgtttgca atggggaatt tataagaagc atcaagtctc tttcttacca  4740
aagtcttgtt aggtggttta tagttctttt ggctaacaaa tcattttgga aataaagatt  4800
ttttactaca aaaatgaaat ttgtttggac ttccacttga gacagtaaag agagtattag  4860
acacccagta aaaactgcca tataaagaag ttgtaattgt ttgttgtgta tgtatttttt  4920
tcaatgccaa accagctgtg atccaattta catccacatt ttaggtccaa cagcaagaag  4980
ttcagagaga gatttcccaa ccagacattg ggtcactcac tggtcacctt gccagtgcat  5040
tttattagaa gggaatctgt tgtagcaaat gggaataaac ctgggtttct atagacccag  5100
aactgaaaaa ataaacatcg tgctgttttt aatttgaaaa aaaaaaaaa aaaa          5154
```